(12) United States Patent
Kajita et al.

(10) Patent No.: US 6,778,097 B1
(45) Date of Patent: Aug. 17, 2004

(54) REMOTE RADIO OPERATING SYSTEM, AND REMOTE OPERATING APPARATUS, MOBILE RELAY STATION AND RADIO MOBILE WORKING MACHINE

(75) Inventors: Shigeo Kajita, Tokyo (JP); Katsusuke Awano, Tokyo (JP); Shoji Tozawa, Tokyo (JP); Hiroyasu Nishikawa, Tokyo (JP); Masatoshi Miki, Tokyo (JP)

(73) Assignee: Shin Caterpillar Mitsubishi Ltd., Tokyo (JP)

( * ) Notice: Subject to any disclaimer, the term of this patent is extended or adjusted under 35 U.S.C. 154(b) by 0 days.

(21) Appl. No.: 09/331,973

(22) PCT Filed: Sep. 2, 1998

(86) PCT No.: PCT/JP98/03926
§ 371 (c)(1),
(2), (4) Date: Jun. 29, 1999

(87) PCT Pub. No.: WO99/22079
PCT Pub. Date: May 6, 1999

(30) Foreign Application Priority Data

Oct. 29, 1997 (JP) .............................. 9-297565

(51) Int. Cl.[7] .......................... G08C 5/22; G08B 21/00; G01S 5/02; G06F 7/00; G06F 19/00

(52) U.S. Cl. .................. 340/825.69; 340/679; 340/683; 342/426; 455/15; 701/2; 701/50

(58) Field of Search ............................... 701/50, 28, 2; 340/679, 683, 825.69; 455/6, 15; 342/426

(56) References Cited

U.S. PATENT DOCUMENTS

| 4,041,470 A | 8/1977 | Slane et al. |
| 4,151,983 A | 5/1979 | Stock et al. |
| 4,223,312 A | * 9/1980 | Gammel ..................... 342/426 |
| 4,482,960 A | * 11/1984 | Pryor ............................. 172/3 |

(List continued on next page.)

FOREIGN PATENT DOCUMENTS

| CA | 1203605 | 4/1986 |
| CA | 1231160 | 1/1988 |
| CA | 2182374 | 9/1995 |
| CA | 2221101 | 11/1996 |

(List continued on next page.)

OTHER PUBLICATIONS

Supplementary European Search Report for EP 98 94 1680.

Primary Examiner—Brian Zimmerman
Assistant Examiner—Clara Yang
(74) Attorney, Agent, or Firm—Morrison & Foerster LLP

(57) ABSTRACT

The present invention relates to remote radio control technology, and a remote radio control system includes a radio movable working machine (1), a remote control apparatus (6A), and a movable repeater station (7). First bidirectional communication means (31, 71) having a high radio wave directionality and first automatic tracking means (32, 71A) are provided between the working machine (1) and the repeater station (7), and second bidirectional communication means (63, 76) having a high radio wave directionality, second automatic tracking means (63A, 76A), and emergency spread spectrum bidirectional communication means (64, 87) for enabling bidirectional communication between the remote control apparatus (6A) and the repeater station (7) when communication by the second bidirectional communication means (63, 76) is impossible are provided between the remote control apparatus (6A) and the repeater station (7). Consequently, even if communication between the working machine (1) and the movable repeater station (7) is disabled, each of the working machine (1) and the repeater station (7) is permitted to perform a minimum necessary operation, and any other person than those skilled in actual controlling operation of the working machine (1) can perform remote control easily.

41 Claims, 24 Drawing Sheets

U.S. PATENT DOCUMENTS

| | | | | |
|---|---|---|---|---|
| 4,578,815 A | * | 3/1986 | Persinotti | 177/1 |
| 4,621,375 A | | 11/1986 | Simnovec | |
| 4,831,539 A | * | 5/1989 | Hagenbuch | 4/243.1 |
| 5,012,335 A | * | 4/1991 | Cohodar | 348/158 |
| 5,371,901 A | * | 12/1994 | Reed et al. | 455/11.1 |
| 5,437,059 A | | 7/1995 | Murakami et al. | |
| 5,438,771 A | * | 8/1995 | Sahm et al. | 172/4.5 |
| 5,646,843 A | | 7/1997 | Gudat et al. | |
| 5,699,247 A | * | 12/1997 | Moriya et al. | 172/4.5 |
| 5,826,666 A | * | 10/1998 | Tozawa et al. | 172/2 |
| 6,285,857 B1 | * | 9/2001 | Javitt | 379/56.2 |

FOREIGN PATENT DOCUMENTS

| | | |
|---|---|---|
| CA | 2242755 | 6/1998 |
| CA | 2227681 | 8/1998 |
| JP | 7-221693 | 8/1995 |
| JP | HEI 7-281754 | 10/1995 |
| JP | 08 016235 A | 1/1996 |
| JP | 08 051673 A | 2/1996 |
| JP | 08 249262 A | 2/1996 |
| JP | HEI 8-065775 | 3/1996 |
| JP | 8-074296 | 3/1996 |
| JP | HEI 8-084375 | 3/1996 |
| JP | HEI 8-265625 | 10/1996 |
| JP | 8-275245 | 10/1996 |

* cited by examiner

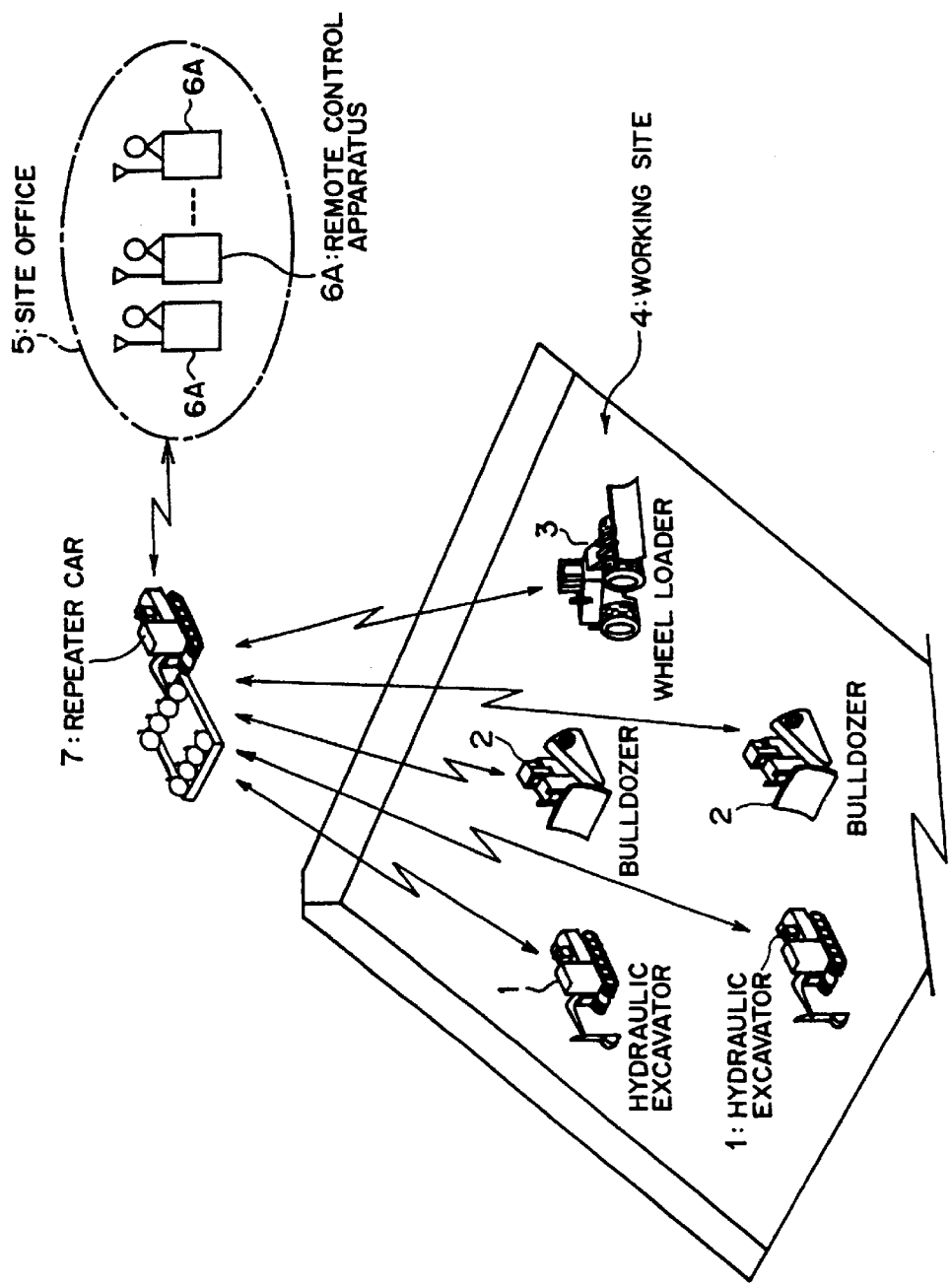

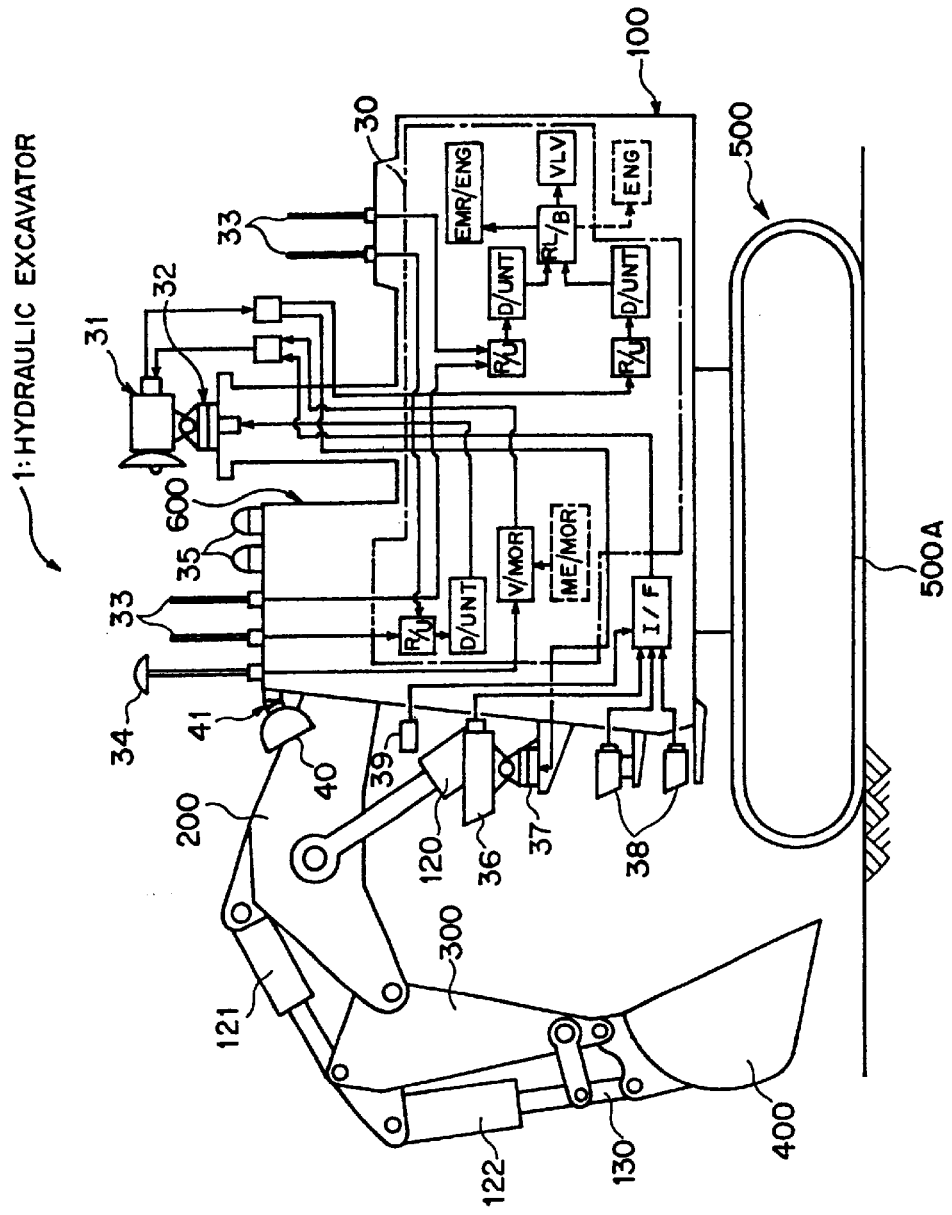

REMOTE RADIO OPERATING SYSTEM, AND REMOTE OPERATING APPARATUS, MOBILE RELAY STATION AND RADIO MOBILE WORKING MACHINE

TECHNICAL FIELD

This invention relates to a remote radio control system for remotely controlling a movable working machine such as a hydraulic excavator, a bulldozer or a dump truck by radio and relates further to a remote control apparatus, a movable repeater station and a radio movable working machine for implementing the remote radio control system.

BACKGROUND ART

In recent years, research and development on technology for remotely controlling a construction machine such as a hydraulic excavator, a bulldozer or a dump truck by radio have been performed energetically. Particularly in a working site which is very dangerous for a man to enter such as a site for restoration against natural calamities, a site for construction of a dam, a quarry or an iron mill, it is strongly expected to operate an unmanned construction machine by radio from a remote place so that various operations can be performed safely and efficiently.

Here, in such a comparatively small scale working site that a control operator (operator) can control a construction machine from a distance over which the construction machine can be observed, since the operator can perform a controlling operation while always observing an actual working condition of the construction machine, the construction machine may be remotely controlled in a so-called radio control (radio controlling) fashion. However, where construction machines must be controlled from a place from which the construction machines cannot be observed over a very wide range in working site such as a large scale site for restoration against natural calamities, a function for grasping actual working conditions of the construction machines is required.

Thus, it is a conventional countermeasure to mount, on a construction machine, a television camera for imaging a working condition of the construction machine in addition to a radio communication apparatus and provide an image imaged by the television camera to a remote control room (operator) on the real time basis by radio transmission so that remote control of the construction machine can be performed in such a manner as in a case wherein the construction machine can be observed or to further mount a sound collecting microphone on the construction machine to provide also operation sound of the construction machine such as engine sound or excavation sound to the working control room so that an actual working situation can be regenerated with fidelity in the working control room at the remote place to achieve improvement in efficiency of remote control.

Further, in such remote control technology as described above, also it has been proposed that remote controlling levers and buttons in the remote control room are disposed in a similar manner to operation levers and buttons in an actual cabin (operation control room) of the construction machine so as to provide a structure wherein operation environments in the remote control room are simulated to those in the actual cabin so that the operator can perform remote control of the construction machine in a manner (virtual reality) nearer to an actual operation feeling.

Furthermore, also a technique has been proposed wherein, in the remote control technique described above, a repeater car (movable repeater station) which repeats such various data such as an image, operation sound and operation control information to the construction machine as described above sent thereto from the construction machine is disposed between the remote control room and the construction machine described above so that the transmission distance of the various data mentioned above may be increased to allow accurate remote control of the construction machine also from a place spaced by a larger distance.

However, with such a conventional remote radio control technique as described above, if an abnormal condition or a failure occurs with a radio apparatus mounted on the construction machine or the repeater car and disables radio communication with the construction machine or the repeater car, then it becomes impossible to control the construction machine or the repeater car accurately, and consequently, not only it is impossible to continue working, but also there is the possibility that such a significant loss that the construction machine or the repeater car cannot be recovered and cannot be avoided to be left in a dangerous working site may occur.

Further, in a conventional technique, since a radio apparatus is mounted on an ordinary construction machine to allow remote radio control, an operator must perform, in a remote control room (particularly where it adopts virtual reality), quite same operations as those performed when the operator actually gets into the cabin of the construction machine and controls the construction machine must be performed. This is very advantageous to a skilled person having much experience in getting into and controlling the construction machine actually since it is very easy to handle, but is not necessarily advantageous to those who do not have much experience.

Particularly when a complicated work, a work for which accuracy or precision is required or a like work is to be performed, since more complicated and delicate control operations are required, only a person skilled in controlling operations of the actual construction machine can perform remote control of the construction machine after all.

The present invention has been made in view of such subjects as described above, and it is an object of the present invention to make it possible to perform, even when communication with a construction machine or a movable repeater station becomes impossible, such a minimum required work as to retract the construction machine or the repeater station to a safe place and to make it possible for remote control of a construction machine to be performed readily by any person other than those skilled in controlling operations of an actual construction machine.

DISCLOSURE OF INVENTION

To this end, a remote radio control system of the present invention is characterized in that it comprises a radio movable working machine capable of movably working by radio control in a working site, a remote control apparatus for operating the radio movable working machine by radio control, and a movable repeater station interposed between the remote control apparatus and the radio movable working machine for repeating a signal, that first bidirectional communication means having a high radio wave directionality and first automatic tracking means are provided between the radio movable working machine and the movable repeater station, and that second bidirectional communication means having a high radio wave directionality, second automatic tracking means, and emergency spread spectrum bidirectional communication means for enabling bidirectional communication between the remote control apparatus and the movable repeater station when communication by the second bidirectional communication means is impossible are provided between the remote control apparatus and the movable repeater station.

Meanwhile, another remote radio control system of the present invention is characterized in that it comprises a radio movable working machine capable of movably working by radio control in a working site, a remote control apparatus for operating the radio movable working machine by radio control, and a movable repeater station interposed between the remote control apparatus and the radio movable working machine for repeating a signal, that first bidirectional communication means having a high radio wave directionality and first automatic tracking means are provided between the radio movable working machine and the movable repeater station, that second bidirectional communication means having a high radio wave directionality and second automatic tracking means are provided between the remote control apparatus and the movable repeater station, and that the radio movable working machine includes a joint type arm mechanism connected at one end portion thereof for pivotal motion on a machine body and having a working member at the other end side thereof, the joint type arm mechanism including at least one pair of arm members connected to each other through a joint part, a cylinder type actuator mechanism including a plurality of cylinder type actuators which perform extension/contraction operations to drive the arm mechanism, and a semiautomatic control apparatus including angle detection means for detecting a posture of the arm mechanism as angle information, a reception section for receiving control target value information transmitted from the remote control apparatus through the movable repeater station, and control means for controlling the cylinder type actuators based on the control target value information received by the reception section and the angle information detected by the angle detection means so that the cylinder type actuators may exhibit predetermined extension/contraction displacements.

Here, in addition to the second bidirectional communication means and the second automatic tracking means, emergency spread spectrum bidirectional communication means for enabling bidirectional communication between the remote control apparatus and the movable repeater station when communication by the second bidirectional communication means is impossible may be provided between the remote control apparatus and the movable repeater station.

The semiautomatic control apparatus described above may include conversion means for converting the angle information obtained by the angle detection means into corresponding extension/contraction displacement information of the cylinder type actuators, and the control means described above may be constructed so as to control the cylinder type actuators based on the control target value information received by the reception section and the extension/contraction displacement information of the cylinder type actuators obtained by the conversion by the conversion means so that the cylinder type actuators may exhibit predetermined extension/contraction displacements.

Further, in addition to the first bidirectional communication means and the first automatic tracking means, emergency low radio wave directionality communication means having a radio wave directionality lower than the radio wave directionality of the first bidirectional communication means for enabling communication of a control signal from the movable repeater station to the radio movable working machine when communication by the first bidirectional communication means is impossible may be provided between the radio movable working machine and the movable repeater station.

A plurality of sets of the first bidirectional communication means and first automatic tracking means may be provided corresponding to a plural number of the radio movable working machines, and also a plurality of the emergency low radio wave directionality communication means may be provided corresponding to a plural number of the radio movable working machines.

It is to be noted that each of the first bidirectional communication means and the second bidirectional communication means preferably is simple radio communication means of a giga hertz band (for example, a several tens giga hertz band), and the emergency spread spectrum bidirectional communication means preferably is spread spectrum radio communication means of a desired frequency band, and besides the emergency low radio wave directionality communication means preferably is radio communication means of a megahertz band (for example, a several hundreds megahertz band).

Further, the remote control apparatus may include a camera apparatus for catching an image of the movable repeater station when communication by the second bidirectional communication means is impossible.

According to the present invention, a remote control apparatus for operating a radio movable working machine, which is capable of movably working in a working site by radio control, by radio control through a movable repeater station which repeats a signal, is characterized in that it comprises a high radio wave directionality bidirectional transmission/reception section for performing bidirectional communication having a high radio wave directionality with the movable repeater station, an automatic tracking apparatus for automatically tracking a movement of the movable repeater station, and an emergency spread spectrum bidirectional transmission/reception section for enabling bidirectional communication with the movable repeater station when communication by the high radio wave directionality bidirectional transmission/reception section is impossible.

Further, according to the present invention, a movable repeater station interposed between a radio movable working machine, which is capable of movably working in a working site by radio control, and a remote control apparatus, which operates the radio movable working machine by radio control, for repeating a signal, is characterized in that it comprises a first high radio wave directionality bidirectional transmission/reception section for performing bidirectional communication having a high radio wave directionality with the radio movable working machine, a first automatic tracking apparatus for automatically tracking a movement of the radio movable working machine, a second high radio wave directionality bidirectional transmission/reception section for performing bidirectional communication having a high radio wave directionality with the remote control apparatus, a response section for responding to an automatic tracking signal from a second automatic tracking apparatus provided on the remote control apparatus, and an emergency spread spectrum bidirectional transmission/reception section for enabling bidirectional communication with the remote control apparatus when communication by the second high radio wave directionality bidirectional transmission/reception section is impossible.

Here, the movable repeater station described above may further comprise an emergency low radio wave directionality transmission section having a radio wave directionality lower than the radio wave directionality of the first high radio wave directionality bidirectional transmission/reception section for enabling transmission of a control signal to the radio movable working machine when communication by the first high radio wave directionality bidirectional transmission/reception section is impossible.

Further, according to the present invention, a radio movable working machine connected to a remote control apparatus through a movable repeater station, which repeats a signal, using bidirectional radio communication means as a communication medium in such a manner that the radio movable working machine is capable of movably working in a working site by radio control, is characterized in that it comprises a high radio wave directionality bidirectional transmission/reception section for performing bidirectional communication having a high radio wave directionality with the movable repeater station, a response section for responding to an automatic tracking signal from an automatic tracking apparatus provided on the movable repeater station, a joint type arm mechanism connected at one end portion thereof to a machine body and having a working member at the other end side thereof, the joint type arm mechanism including at least one pair of arm members connected to each other by a joint part, a cylinder type actuator mechanism including a plurality of cylinder type actuators which perform extension/contraction operations to drive the arm mechanism, and a semiautomatic control apparatus including angle detection means for detecting a posture of the arm mechanism as angle information, and control means for controlling the cylinder type actuators based on control target value information from the remote control apparatus received by the high radio wave directionality bidirectional transmission/reception section and the angle information detected by the angle detection means so that the cylinder type actuators may exhibit predetermined extension/contraction displacements.

Here, the semiautomatic control apparatus may include conversion means for converting the angle information obtained by the angle detection means into corresponding extension/contraction information of the cylinder type actuators, and the control means may be constructed so as to control the cylinder type actuators based on the control target value information received by the high radio wave directionality bidirectional transmission/reception section and the extension/contraction displacement information of the cylinder type actuators obtained by the conversion by the conversion means so that the cylinder type actuators may exhibit predetermined extension/contraction displacements.

Further, the radio movable working machine may further comprise an emergency low radio wave directionality reception section having a radio wave directionality lower than the radio wave directionality of the high radio wave directionality bidirectional transmission/reception section for enabling reception of a control signal from the movable repeater station when communication by the high radio wave directionality bidirectional transmission/reception section is impossible.

Meanwhile, a further remote radio control system of the present invention is characterized in that it comprises a radio movable working machine capable of movably working in a working site by radio communication, a remote control apparatus for operating the radio movable working machine by radio communication, and bidirectional communication means, automatic tracking means and emergency low radio wave directionality communication means provided between the remote control apparatus and the radio movable working machine, the bidirectional communication means having a high radio wave directionality, the emergency low radio wave directionality communication means having a radio wave directionality lower than the radio wave directionality of the bidirectional communication means for enabling communication of a control signal from the remote control apparatus to the radio movable working machine when communication by the bidirectional communication means is impossible.

Further, a still further remote radio control system of the present invention is characterized in that it comprises a radio movable working machine capable of movably working in a working site by radio communication, and a remote control apparatus for operating the radio movable working machine by radio communication, that bidirectional communication means having a high radio wave directionality and automatic tracking means are provided between the remote control apparatus and the radio movable working machine, and that the radio movable working machine includes a joint type arm mechanism connected at one end portion thereof for pivotal motion on a machine body and having a working member at the other end side thereof, the joint type arm mechanism including at least one pair of arm members connected to each other through a joint part, a cylinder type actuator mechanism including a plurality of cylinder type actuators which perform extension/contraction operations to drive the arm mechanism, and a semiautomatic control apparatus including angle detection means for detecting a posture of the arm mechanism as angle information, a reception section for receiving control target value information transmitted from the remote control apparatus, and control means for controlling the cylinder type actuators based on the control target value information received by the reception section and the angle information detected by the angle detection means so that the cylinder type actuators may exhibit predetermined extension/contraction displacements.

Here, in addition to the bidirectional communication means and the automatic tracking means, emergency low radio wave directionality communication means having a radio wave directionality lower than the radio wave directionality of the bidirectional communication means for enabling communication of a control signal from the remote control apparatus to the radio movable working machine when communication by the bidirectional communication means is impossible may be provided between the remote control apparatus and the radio movable working machine.

The semiautomatic control apparatus may include conversion means for converting the angle information obtained by the angle detection means into corresponding extension/contraction displacement information of the cylinder type actuators, and the control means may be constructed so as to control the cylinder type actuators based on the control target value information received by the reception section and the extension/contraction displacement information of the cylinder type actuators obtained by the conversion by the conversion means so that the cylinder type actuators may exhibit predetermined extension/contraction displacements.

Further, a plurality of sets of the bidirectional communication means and automatic tracking means may be provided corresponding to a plural number of the radio movable working machines, and also a plurality of the emergency low radio wave directionality communication means may be provided corresponding to a plural number of the radio movable working machines.

The bidirectional communication means preferably is simple radio communication means of a giga hertz band (for example, a several tens giga hertz band), and the emergency low radio wave directionality communication means preferably is radio communication means of a megahertz band (for example, a several hundreds megahertz band).

The remote control apparatus may include a camera apparatus for catching an image of the radio movable working machine when communication by the bidirectional communication means is impossible.

Meanwhile, according to the present invention, a remote control apparatus for operating a radio movable working machine, which is capable of movably working in a working site by radio control, by radio control, is characterized in that it comprises a high radio wave directionality bidirectional transmission/reception section for performing bidirectional communication having a high radio wave directionality with the radio movable working machine, an automatic tracking apparatus for automatically tracking a movement of the radio movable working machine, and an emergency low radio wave directionality transmission section having a radio wave directionality lower than the radio wave directionality of the high radio wave directionality bidirectional transmission/reception section for enabling transmission of a control signal to the radio movable working machine when communication by the high radio wave directionality bidirectional transmission/reception section is impossible.

Further, according to the present invention, a radio movable working machine connected to a remote control apparatus using bidirectional radio communication means as a communication medium in such a manner that the radio movable working machine is capable of movably working in a working site by radio control, is characterized in that it comprises a high radio wave directionality bidirectional transmission/reception section for performing bidirectional communication having a high radio wave directionality with the remote control apparatus, a response section for responding to an automatic tracking signal from an automatic tracking apparatus provided on the remote control apparatus, a joint type arm mechanism connected at one end portion thereof to a machine body and having a working member at the other end side thereof, the joint type arm mechanism including at least one pair of arm members connected to each other by a joint part, a cylinder type actuator mechanism including a plurality of cylinder type actuators which perform extension/contraction operations to drive the arm mechanism, and a semiautomatic control apparatus including angle detection means for detecting a posture of the arm mechanism as angle information, and control means for controlling the cylinder type actuators based on control target value information from the remote control apparatus received by the high radio wave directionality bidirectional transmission/reception section and the angle information detected by the angle detection means so that the cylinder type actuators may exhibit predetermined extension/contraction displacements.

Here, the semiautomatic control apparatus may include conversion means for converting the angle information obtained by the angle detection means into corresponding extension/contraction information of the cylinder type actuators, and the control means may be constructed so as to control the cylinder type actuators based on the control target value information received by the high radio wave directionality bidirectional transmission/reception section and the extension/contraction displacement information of the cylinder type actuators obtained by the conversion by the conversion means so that the cylinder type actuators may exhibit predetermined extension/contraction displacements.

Further, the radio movable working machine may further comprise emergency low radio wave directionality reception section having a radio wave directionality lower than the radio wave directionality of the high radio wave directionality bidirectional transmission/reception section for enabling reception of a control signal from the remote control apparatus when communication in which the high radio wave directionality bidirectional transmission/reception section is used is impossible.

Accordingly, according to the present invention, even if bidirectional communication between the remote control apparatus and the movable repeater station (hereinafter referred to simply as "repeater station") is disabled by some trouble, since bidirectional communication between the remote control apparatus and the movable repeater station is enabled by the emergency spread spectrum bidirectional communication means, even upon emergency, it is possible to cause the radio movable working machine (hereinafter referred to simply as "working machine") to continue its working or to retract or recover the working machine to a safe place and the working efficiency in the working site can be improved significantly.

Further, even if bidirectional communication between the repeater station and the working machine is disabled, since at least a construction machine control signal can be transmitted to the working machine by the emergency low radio wave directionality communication means, at least it is possible to retract or recover the working machine to a safe place, and such a serious loss that the working machine cannot be avoided to be left in a dangerous working site which a person cannot enter can be prevented with certainty.

Furthermore, where a radio wave of a high radio wave directionality (simple radio means of a giga hertz band) is used between the remote control apparatus and the repeater station and between the repeater station and the working machine, very long distance communication is enabled for both of the remote control apparatus-repeater station and the repeater station-working machine. Consequently, even in such a working site that a dangerous zone which a person cannot enter extends over a wide range, the operator can control the working machine to perform working safely and with certainty.

Further, where the automatic tracking means described above is provided, even if the repeater station or the working machine moves, since stabilized communication can always be performed although a radio wave of a high directionality is used between the remote control apparatus and the repeater station and between the repeater station and the working machine, this contributes very much to improvement in reliability of the entire system.

Furthermore, where a plurality of sets of the bidirectional communication means and automatic tracking means are provided corresponding to the number of the working machines as described above, bidirectional communication with the individual working machines can be performed independently for each of the working machines, and consequently, the working machines can be controlled to perform works different from one another and the working efficiency can be further improved significantly to shorten the working period.

Further, where a plurality of the emergency low radio wave directionality communication means are provided corresponding to a plural number of the working machines, even if bidirectional communication between the repeater station and the working machines becomes impossible, since the working machines can be remotely controlled independently of one another, even upon emergency, all of the working machines in the working site can be retracted or recovered to a safe place with certainty.

Furthermore, where the semiautomatic control apparatus is provided on the working machine as described above, when the working machine is to be remotely controlled from the remote control apparatus, if a semiautomatic control mode is set from the remote control apparatus, then a desired work can be performed by the working machine efficiently with a high degree of accuracy. Accordingly, any other person than those skilled in an actual controlling operation of the working machine can perform remote control of the working machine very easily. Particularly where the working machine is remotely controlled while a two-dimensional image is observed, the burden of the controlling operation to the operator can be reduced significantly, and consequently, significant improvement in productivity can be achieved.

BRIEF DESCRIPTION OF THE DRAWINGS

FIG. 1 is a view schematically showing a construction of a remote radio control system as a first embodiment of the present invention;

FIG. 2 is a view schematically showing a hydraulic excavator according to the first embodiment;

BEST MODE FOR CARRYING OUT THE INVENTION (A) Description of the First Embodiment
(A1) Description of the Construction of the Entire Remote Radio Control System FIG. 1 is a view schematically showing a construction of a remote radio control system as a first embodiment of the present invention. As shown in FIG. 1, the remote radio control system (which may sometimes be referred to simply as "system") of the present embodiment includes various unmanned construction machines (radio movable working machines) such as hydraulic excavators 1, bulldozers 2 and a wheel loader 3 which can movably work in a working site 4 by radio control, and remote control apparatus (fixed station) 6A fixedly installed in a site office 5 or the like for remotely controlling the construction machines 1 to 3 by radio.

Figure 3A:
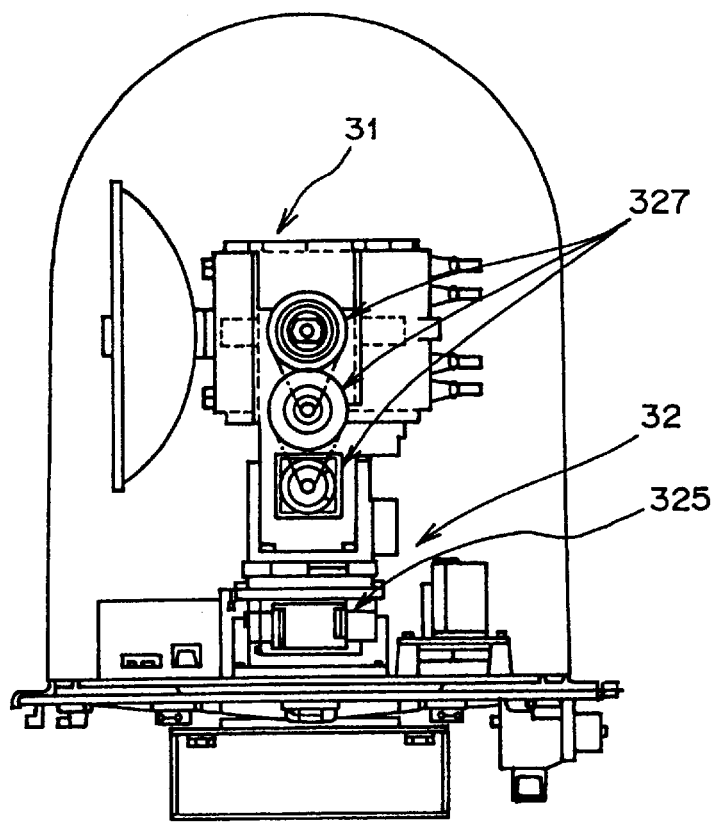
FIGS. 3(a) and 3(b) are side elevational views showing an example of a 50 GHz simple radio unit in the first embodiment.
Figure 3B:
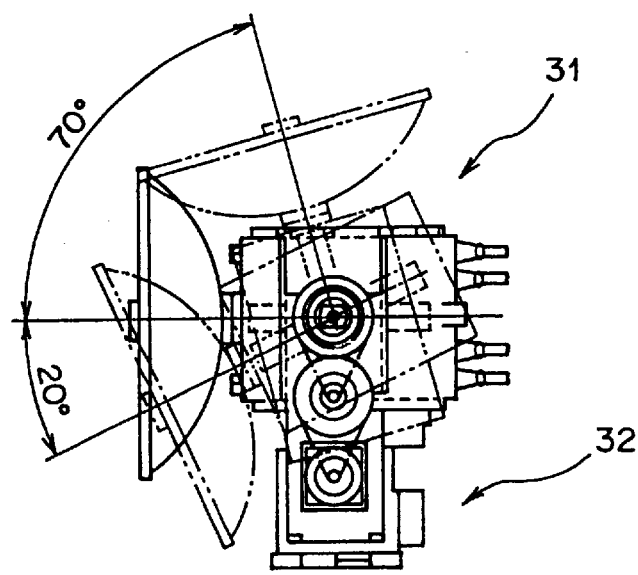

However, in the present embodiment, a repeater car (movable repeater station) 7 for repeating radio signals (construction machine control signals for remotely controlling the construction machines 1 to 3, images imaged by the construction machines 1 to 3 side and so forth) to be communicated between the unmanned construction machines (hereinafter referred to simply as "construction machine") 1 to 3 and the remote control apparatus 6A and supervising the entire working site 4 is disposed (interposed) between the working site 4 and the site office 5, and the construction machines 1 to 3 are remotely controlled from the remote control apparatus. 6A of the site office 5 through the repeater car 7.

It is to be noted that, in the present embodiment, a number of (5) such remote control apparatus 6A equal to the number of the construction machines 1 to 3 which are objects of control are provided such that they can control the hydraulic excavators 1 to 3 of the objects of remote control, which they individually take charge of, in a one-by-one relationship.

In the following, constructions of the construction machines 1 to 3, remote control apparatus 6A and repeater car 7 which compose the present system are described in detail. It is to be noted however, that, in the following description, a case wherein the present system is used in the territory of Japan is presumed, and the description proceeds on the assumption that frequencies of radio waves which can be used for remote control conform to the Radio Law of Japan.

FIG. 2 is a view schematically showing a construction of the hydraulic excavators 1 according to the present embodiment. As shown in FIG. 2, the hydraulic excavator 1 according to the present embodiment includes, on a lower traveling unit 500 which has caterpillar members 500A on the left and right thereof with respect to an advancing direction, an upper revolving unit (construction machine body) 100 with a cabin (originally an operator cab in which an operator sits to perform controlling operation) 600 for revolving movement in a horizontal plane.

A boom (arm member) 200 having one end connected for swingable motion is provided on the upper revolving unit 100, and a stick (arm member) 300 connected at one end thereof for swingable motion by a joint part is provided on the boom 200.

Further, a bucket (working member) 400 which is connected at one end thereof for swingable motion by a joint part and can excavate the ground with a tip thereof and accommodate earth and sand therein is provided on the stick 300.

In this manner, a joint type arm mechanism which is mounted at one end portion thereof for swingable motion on the upper revolving unit 100 and has the bucket 400 on the other end side thereof and further has at least the boom 200 and stick 300 as a pair of arm members connected to each other by the joint part is composed of the boom 200 and stick 300.

Further, a boom hydraulic cylinder 120, a stick hydraulic cylinder 121 and a bucket hydraulic cylinder 122 (in the following description, the boom hydraulic cylinder 120 may be referred to as boom cylinder 120 or simply as cylinder 120, the stick hydraulic cylinder 121 may be referred to as stick cylinder 121 or simply as cylinder 121, and the bucket hydraulic cylinder 122 may be referred to as bucket cylinder 122 or simply as cylinder 122) as cylinder type actuators are provided.

Here, the boom cylinder 120 is connected at one end thereof for swingable motion to the upper revolving unit 100 and is connected at the other end thereof for swingable motion to the boom 200. In other words, the boom cylinder 120 is interposed between the upper revolving unit 100 and the boom 200, such that, as the distance between the opposite end portions is expanded or contracted, the boom 200 can be pivoted with respect to the upper revolving unit 100.

The stick cylinder 121 is connected at one end thereof for swingable motion to the boom 200 and connected at the other end thereof for swingable motion to the stick 300. In other words, the stick cylinder 121 is interposed between the boom 200 and the stick 300, such that, as the distance between the opposite end portions is expanded or contracted, the stick 300 can be pivoted with respect to the boom 200.

The bucket cylinder 122 is connected at one end thereof for swingable motion to the stick 300 and connected at the other end thereof for swingable motion to the bucket 400. In other words, the bucket cylinder 122 is interposed between the stick 300 and the bucket 400, such that, as the distance between the opposite end portions thereof is expanded or contracted, the bucket 400 can be pivoted with respect to the stick 300. It is to be noted that a linkage 130 is provided at a free end portion of the bucket hydraulic cylinder 122.

In this manner, a cylinder type actuator mechanism having a plurality of cylinder type actuators for driving the arm mechanism by performing extending and contracting operations is composed of the cylinders 120 to 122 described above.

It is to be noted that, though not shown in the figure, also hydraulic motors for driving the left and right caterpillar members 500A and a revolving motor for driving the upper revolving unit 100 to revolve are provided.

Further, as shown in FIG. 2, in the hydraulic excavators 1 according to the present embodiment, a control apparatus 30 for controlling the cylinders 120 to 122, the hydraulic motors and the revolving motor described above to control the operation (posture) of the hydraulic excavator 1 is provided in the upper revolving unit 100, and a 50 giga hertz (GHz) simple radio unit 31 with a universal head (automatic tracking apparatus) 32 is placed on the upper revolving unit 100. Besides, a 429 MHz reception antenna 33, a GPS (Global Positioning System) reception antenna 34 and revolving lights (patrol lights) 35 are placed on the top face of the cabin 600, and a television camera 36 with a universal head 37, fixed television cameras 38, a microphone 39 and a light 40 with a universal head 41 are mounted on a front face of the cabin 600.

Here, the television cameras 36 and 38 image a working condition of the hydraulic excavator 1, and images (image information) imaged by the cameras 36 and 38 are transmitted from the 50 giga hertz simple radio unit (which may sometimes be referred to simply as "simple radio unit" or as 50 GHz antenna) 31 to the corresponding remote control apparatus 6A via the repeater car 7 and displayed on a display unit 67 (which will be hereinafter described with reference to FIG. 6) of the remote control apparatus 6A.

However, the camera 36 described above is mounted on the cabin 600 for revolving motion in a horizontal plane [azimuth (revolving) system] and for swinging motion in a vertical plane (elevation angle system) by the universal head 37, and the universal head 37 is controlled based on a camera control signal received from the remote control apparatus 6A by the 50 giga hertz simple radio unit 31 through the repeater car 7 so that the imaging direction can be suitably varied from the remote control apparatus 6A. The cameras 38 are fixed to the cabin 600 and always image fixed places (principally a working situation by the bucket 400).

The microphone 39 collects sound such as operation sound and working sound of the hydraulic excavator 1, and also sound information collected by the microphone 39 is transmitted from the 50 giga hertz simple radio unit 31 to the remote control apparatus 6A through the repeater car 7 and outputted from a speaker 68 (which will be hereinafter described with reference to FIG. 6) of the remote control apparatus 6A. Further, the light (illumination apparatus) 40 illuminates the front face of the hydraulic excavators 1 (imaging ranges of the cameras 36 and 38) so that working by remote control can be performed smoothly even in a site wherein the range of vision is narrow or at night.

It is to be noted that also this light 40 is mounted on the cabin 600 for revolving movement in the azimuth system/ swinging movement in the elevation angle system by the universal head 41, and the universal head 41 is controlled based on a light control signal received from the remote control apparatus 6A by the 50 giga hertz simple radio unit 31 through the repeater car 7 so that the illumination direction of it can be suitably varied from the remote control apparatus 6A.

Further, the 50 giga hertz simple radio unit (high radio wave directionality bidirectional transmission/reception section) 31 is provided to perform very long distance (longer than 1 km) bidirectional communication with the repeater car 7 using a radio wave of a 50 GHz band having a high radio wave directionality, and receives a control signal (construction machine control signal: including control target value information for "semiautomatic control" which will be hereinafter described) to the hydraulic excavator 1 sent thereto from the remote control apparatus 6A through the repeater car 7. On the other hand, images (image information) imaged by the television cameras 36 and 38, sound information such as operation sound and working sound of the hydraulic excavator 1 collected by the microphone 39, vehicle monitor information (for example, an engine rotational speed, a discharge of a hydraulic pump, an operating oil temperature, and a cooling oil temperature), and so forth are transmitted from the 50 giga hertz simple radio unit 31 to the remote control apparatus 6A through the repeater car 7.

However, the 50 GHz simple radio unit 31 used in the present embodiment has one channel for a video line and two channels for an audio line, and images imaged by the television cameras 36 and 38 are transmitted using the image line whereas sound collected by the microphone 39 is transmitted using one of the two channels of the video line to the remote control apparatus 6A side through the repeater car 7 whereas a construction machine control signal is received using the remaining one channel of the audio line.

In short, this 50 GHz simple radio unit 31 forms, together with a 50 GHz simple radio unit 71 (72 to 75: hereinafter described with reference to FIG. 5) mounted on the repeater car 7, first bidirectional communication means having a high radio wave directionality of the 50 GHz band between the corresponding one of the construction machines 1 to 3 and the repeater car 7.

It is to be noted that the reason why a radio wave of the 50 GHz band in this manner is used is that the frequencies of radio waves which can be used for remote radio control for approximately 1 km in the territory of Japan are limited to the 50 GHz band and a 2.4 GHz band, which will be hereinafter described, and with radio waves of the 2.4 GHz band of the two bands, transmission of an image (image information) is impossible.

Then, the 50 GHz simple radio unit 31 of the present embodiment is mounted for revolving motion over 360 degrees in the azimuth system and for swinging motion within a range from approximately −20 degrees to approximately +70 degrees in the elevation angle system with reference to a reference horizontal plane set to 0 degree on the construction machine body 100 by the automatic tracking apparatus 32 and is automatically adjusted so that a radio wave radiation face thereof may oppose a radio wave radiation face of the 50 GHz simple radio unit 71 (or one of 72 to 75: hereinafter described with reference to FIG. 5) mounted on the repeater car 7 in order that, although it uses a radio wave of 50 GHz having a very high directionality, stabilized communication may always be performed with the repeater car 7.

Figure 4:
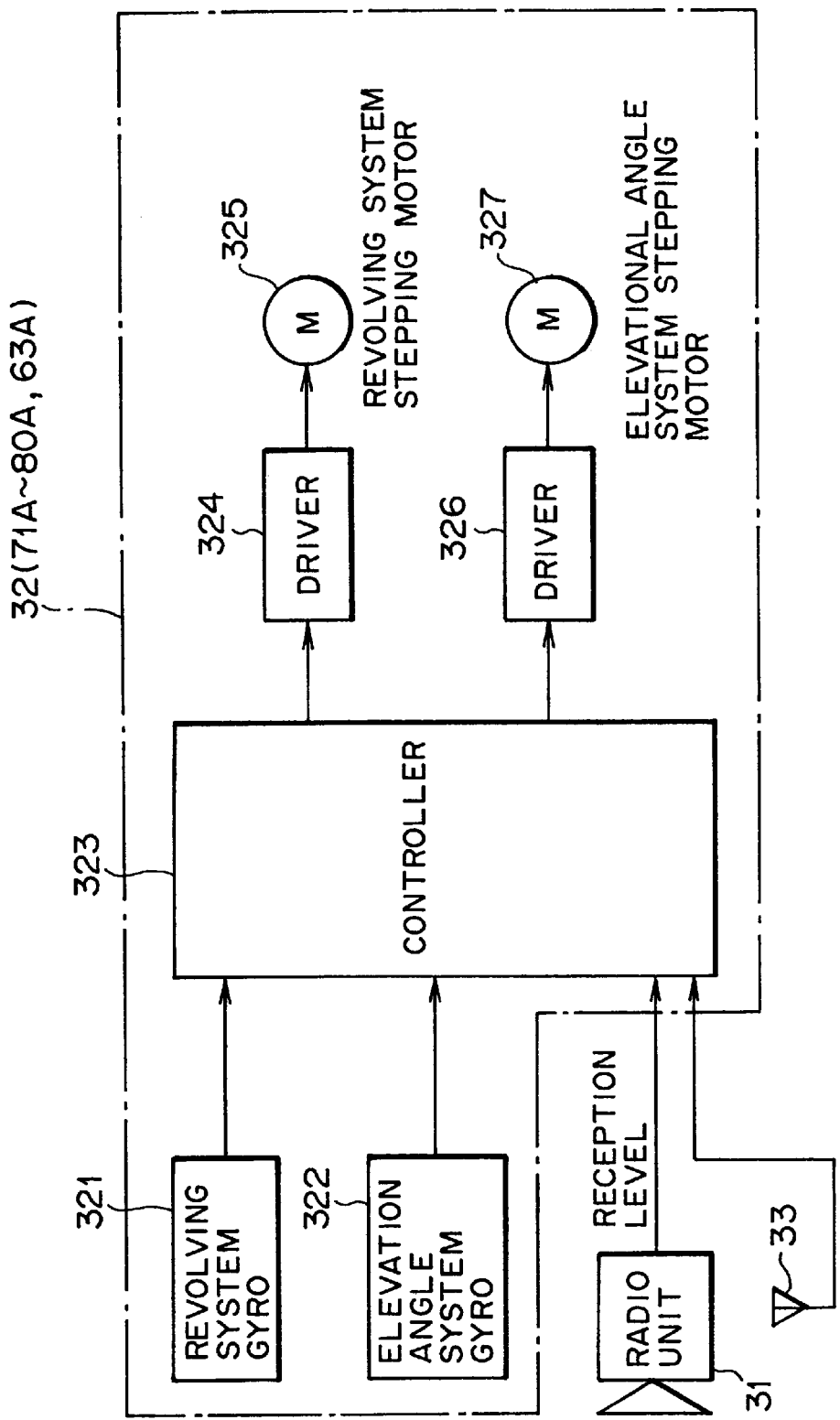
FIG. 4 is a block diagram schematically showing a construction of an automatic tracking apparatus in the first embodiment.

To this end, the automatic tracking apparatus 32 described above includes, in the present embodiment, for example, as shown in FIG. 4, an inertia sensor (gyro) 321 of the azimuth (revolving) system, an inertia sensor (gyro) 322 of the elevation angle system, a controller 323, a driver 324 and a stepping motor 325 for the revolving system, and a driver 326 and a stepping motor 327 for the elevation angle system.

Here, the gyro 321 is provided to detect a direction (azimuth angle) of the hydraulic excavator 1; the gyro 322 is provided to detect an inclination angle of the hydraulic excavator 1; and the controller 323 is provided to determine, by calculation based on an azimuth angle and an inclination angle detected by the gyros 321 and 322 and a signal (radio wave) reception level by the 50 GHz simple radio unit 31, an orientation (an azimuth angle and an elevation angle) of the antenna at which the signal reception level by the 50 GHz antenna 31 exhibits its maximum.

It is to be noted that, a result of the calculation by the controller 323 can be transmitted suitably as vehicle monitor information to the remote control apparatus 6A, and the orientation (azimuth/elevation angles) at present of the 50 GHz antenna 31 can be displayed on the display unit 67 of the remote control apparatus 6A.

The driver 324 drives the stepping motor 325 for the revolving system in response to an azimuth angle obtained by the controller 323 to revolve the 50 GHz antenna 31 by the azimuth angle described above, and the driver 326 drives the stepping motor 327 for the elevation angle system in response to an elevation angle obtained by the controller 323 to swing the 50 GHz antenna 31 by the elevation angle described above similarly.

In short, the automatic tracking apparatus 32 functions as a response section which searches a radio wave of the 50 GHz band transmitted from the 50 GHz antenna 71 (or one of 72 to 75) on the repeater car 7 side so that the signal reception level by the 50 GHz antenna 31 may always be in the maximum (responses to an automatic tracking signal) to automatically track the radio wave radiation face of the 50 GHz antenna 71 (72 to 75) mounted on the repeater car 7. Consequently, even if the relative position to the repeater car 7 varies, communication with the repeater car 7 can always be performed stably.

It is to be noted that, if an intercepting body comes between the hydraulic excavator 1 to 3 and the repeater car 7 and a 50 GHz radio wave from the repeater car 7 is intercepted temporarily by the intercepting body, the automatic tracking apparatus 32 first keeps the orientation of the 50 GHz antenna 31 then for a fixed period of time together with an automatic tracking apparatus 71A (72A to 75A) of the repeater car 7 side which will be hereinafter described and then automatically searches a radio wave from the 50 GHz antenna 71 (72 to 80) of the repeater car 7 side to restore communication with the repeater car 7.

Further, if an antenna control signal from the remote control apparatus 6A is received by the 429 MHz reception antenna 33 which will be hereinafter described, the drivers 324 and 326 of the automatic tracking apparatus 32 are driven in response to the antenna control signal by the controller 323 (in short, the orientation of the simple radio unit 31 can be adjusted manually from the remote control apparatus 6A side).

In particular, the automatic tracking apparatus 32 described above forms, together with the automatic tracking apparatus 71A (72A to 75A: hereinafter described with reference to FIG. 5) of the 50 GHz simple radio unit 71 (72 to 75) mounted on the repeater car 7, first automatic tracking means between the construction machine 1 to 3 and the repeater car 7, and in the present embodiment, five sets of such first bidirectional communication means and first automatic tracking means as described above are provided corresponding to the plural number of construction machines 1 to 3 (five machines).

It is to be noted that the reason why five sets of such first bidirectional communication means as described above are provided is that the number of the construction machines 1 to 3 which can be remotely controlled using radio waves of the 50 GHz band in the same working site 4 in the present situation is five in the maximum. Accordingly, if no restriction by the Radio Law of Japan is applicable and radio waves of some other band than the 50 GHz band can be used, then depending upon the frequency band of radio waves, the number of the first (high radio wave directionality) bidirectional communication means described above can be increased to increase the number of the construction machines 1 to 3 which can be remotely controlled by radio in the same working site 4.

The 429 MHz reception antenna (emergency low radio wave directionality reception section) 33 described above is provided to receive, in normal operation, an antenna control signal mentioned hereinabove from the repeater car 7, but enable, upon emergency such as when communication by the 50 GHz simple radio unit 31 is interrupted, reception of a construction machine control signal sent thereto from the remote control apparatus 6A through the repeater car 7 by a radio wave of the 429 MHz band (radio wave whose distance over which communication is possible is approximately 100 m in diameter: called particular power saving radio wave in Japan).

In short, the 429 MHz reception antenna 33 functions as an emergency reception antenna when main communication of the 50 GHz with the repeater car 7 is disabled, and even if communication of the 50 GHz band described above is interrupted, if the distance to the repeater car 7 is approximately within 100 m, it allows a construction machine control signal described above to be received by the construction machine 1 to 3 to make it possible to perform, from the remote control apparatus 6A side, such minimum required operation control as to recover the construction machine 1 to 3 into the site office 5 or retract it to a safe place.

In particular, the 429 MHz reception antenna 33 forms, together with a 429 MHz transmission antenna 82 (hereinafter described with reference to FIG. 5) mounted on the repeater car 7, emergency low radio wave directionality communication means having a radio wave directionally lower than the radio wave directionality of the first (high radio wave directionality) bidirectional communication means described above for enabling, when communication by the bidirectional communication means is impossible, communication of a construction machine control signal from the repeater car 7 to the construction machine 1 to 3, and upon emergency, communication with the repeater car 7 can be performed simply and conveniently even if the other party of communication is automatically tracked like that with a radio wave of the 50 GHz band.

It is to be noted that the 429 MHz reception antenna 33 described above here has a diversity construction as shown in FIG. 2 such that a reception signal of that one of antennae which exhibits a higher reception sensitivity (signal quality) is adopted and, based on the adopted reception signal, control of the 50 GHz simple radio unit 31 (universal head 32), operation control of the hydraulic excavator 1 upon emergency and so forth are individually performed accurately.

The GPS reception antenna 34 is provided to receive a signal (which may sometimes be hereinafter referred to as satellite signal) from an artificial satellite (not shown) to report a current position of the self apparatus (hydraulic excavator 1) to the remote control apparatus 6A through the repeater car 7, and, on the remote control apparatus 6A side, the movement (current position) of the hydraulic excavator 1 can be managed on the real time basis based on the current position information reported from the hydraulic excavator 1.

The patrol lights 35 are provided to report to the outside by lighting/blinking/rotation of lamps that the hydraulic excavator 1 is operating, that an abnormal condition has occurred with the hydraulic excavator 1 (an alarm), or the like.

The control apparatus (semiautomatic control apparatus) 30 described above controls the universal head 32/36 based on a signal from the remote control apparatus 6A received as a radio wave of the 50 GHz band by the 50 GHz simple radio unit 31 to suitably control the orientation of the simple radio unit 31/television camera 36 and control the cylinders 120 to 122, hydraulic motors, revolving motor and so forth described above to control the operation (posture) of the hydraulic excavator 1 so that the hydraulic excavator 1 may perform a desired operation. In the present embodiment, such semiautomatic control as hereinafter described is performed by a controller (control means) 30B.

However, if communication with the repeater car 7 using a radio wave of the 50 GHz is disabled by some abnormal condition, then since radio communication of the 429 MHz band is performed with the repeater car 7 through the emergency reception antenna 33 if the distance to the repeater car 7 is within 100 m as described above, the control apparatus 30 controls operation of the hydraulic excavator 1 based on a construction machine control signal received by the emergency reception antenna 33. Consequently, upon emergency, it is possible to recover the hydraulic excavator 1 into the site office 5 or retract it to a safe place.

It is to be noted that, while the construction of the hydraulic excavators 1 is described hereinabove as a construction of a representative one of the construction machines 1 to 3, it is assumed that also the bulldozers 2 and the wheel loader 3 have a function for remote radio control similar to that of the hydraulic excavators 1 described above.

FIG. 5 is a view schematically showing a construction of the repeater car 7 described above, and as shown in FIG. 5, the repeater car 7 of the present embodiment is constructed making use of a vehicle of a type same as that of the hydraulic excavators 1 described above and is constructed such that an upper revolving unit 100' is mounted for revolving movement within a horizontal plane on a lower traveling unit 500' which has caterpillar members 500A' on the left and right thereof with respect to an advancing direction.

An extendible/contractable boom 200' which has one end connected for swingable motion is provided on the upper revolving unit 100', and further, a platform (repeater base) 70 which can be revolved relative to the boom 200' around an axis (junction) 201' by a support mechanism 202' is provided on the boom 200'.

Further, a boom hydraulic cylinder 120' and a support mechanism hydraulic cylinder 203' (the boom hydraulic cylinder 120' may be hereinafter referred to as boom cylinder 120' or simply as cylinder 120', and the support mechanism hydraulic cylinder 203' may be hereinafter referred to as support mechanism cylinder 203' or simply as cylinder 203') are provided on the repeater car 7.

Here, the boom cylinder 120' is connected at one end thereof for swingable motion to the upper revolving unit 100' and is connected at the other end thereof for swingable motion to the boom 200'. In other words, the boom cylinder 120' is interposed between the upper revolving unit 100' and the boom 200', such that, as the distance between the opposite end portions is expanded or contracted, the boom 200' can be pivoted within a vertical plane with respect to the upper revolving unit 100'.

The support mechanism hydraulic cylinder 203' is connected at one end thereof for swingable motion to the boom 200' and is connected at the other end thereof for swingable motion to the support mechanism 202'. In other words, the support mechanism hydraulic cylinder 203' is interposed between the boom 200' and the support mechanism 202', such that, as the distance between the opposite end portions is expanded or contracted, the platform 70 can be pivoted with respect to the axis 201'. Here, the support mechanism hydraulic cylinder 203' is expanded or contracted in response to the posture of the boom 200' so that the platform 70 can always be held horizontally.

Figure 5:
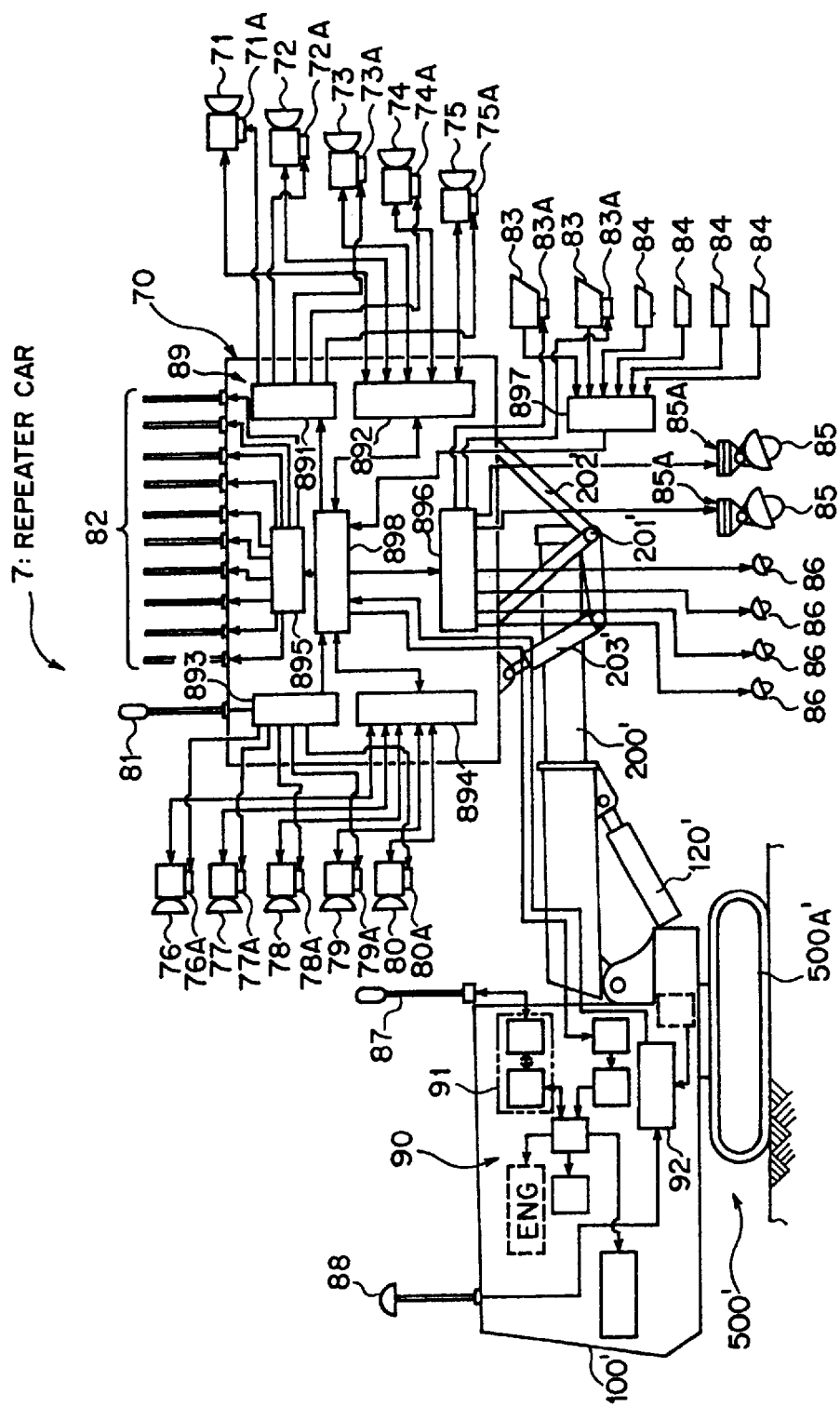
FIG. 5 is a view schematically showing a construction of a repeater car in the first embodiment.

It is to be noted that, though not shown in FIG. 5, also hydraulic motors for driving the left and right caterpillar members 500A' described above and a revolving motor for driving the upper revolving unit 100 to revolve are provided on the present repeater car 7, and all of the cylinders 120' and 203', hydraulic motors, revolving motor and so forth described above can be controlled by a vehicle control apparatus 90 provided in the upper revolving unit 100'.

Further, on the platform 70 described above, 50 GHz simple radio units (antennae) 71 to 80 individually with universal heads (automatic tracking apparatus) 71A to 80A, a 2.4 GHz reception antenna 81, 429 MHz transmission antennae 82, television cameras 83 with a universal head 83A, fixed television cameras 84, lights 85 with a universal head 85A, fixed lights 86, a communication control apparatus 89 and so forth are provided. It is to be noted that a 2.4 GHz transmission/reception antenna 87 and a GPS reception antenna 88 are provided on the top face of the upper revolving unit 100'.

Here, the 50 GHz simple radio unit (first high radio wave directionality bidirectional transmission/reception sections) 71 to 75 can individually perform bidirectional communication over a very long distance by transmitting and receiving radio waves of the 50 GHz band of a high directionality to corresponding ones of the hydraulic excavators 1 to 3 (totaling five construction machines), and they transmit (repeat) construction machine control signals from the remote control apparatus 6A to the construction machines 1 to 3 whereas they receive images imaged by the cameras. 37 and 38 mounted on the construction machines 1 to 3, sound collected by the microphones 39, vehicle monitor information representative of operation conditions of the construction machines 1 to 3 and so forth from the construction machines 1 to 3.

Also the 50 GHz simple radio unit 71 to 75 are mounted on the platform 70 for revolving movement for the revolving system/swinging movement for the elevation angle system by automatic tracking apparatus 71A to 75A, respectively, and the orientations of the radio wave radiation faces are automatically adjusted so that the signal reception levels may always be in the maximum (so that they may oppose the 50 GHz simple radio unit 31 of the construction machines 1 to 3 which are the other parties of communication).

It is to be noted that the automatic tracking apparatus 71A to 75A described above have a construction similar to that of the automatic tracking apparatus 32 shown in FIG. 4, and if an intercepting body enters between any of the construction machines 1 to 3 and a corresponding one of the automatic tracking apparatus and a radio wave from the construction machine 1 to 3 is temporarily interrupted, then the automatic tracking apparatus 71A to 75A keeps, together with the automatic tracking apparatus 32 on the construction machines 1 to 3 side, the orientation of the 50 GHz antenna 71 to 75 then for a fixed time and then automatically searches a radio wave from the construction machine 1 to 3 side to recover communication with the construction machine 1 to 3.

On the other hand, the 50 GHz simple radio units (second high radio wave directionality bidirectional transmission/ reception sections) 76 to 80 can transmit and receive radio waves of a high directionality of the 50 GHz band to and from corresponding ones of the remote control apparatus 6A to perform bidirectional communication over very long distances, and they repeat and transmit images, sound, vehicle monitor information and so forth received through the simple radio units 71 to 75 as described above to the remote control apparatus 6A and receive construction machine control signals for the construction machines 1 to 3, a repeater car control signal for the self apparatus (repeater car 7) and so forth from the remote control apparatus 6A.

In short, each of the 50 GHz simple radio units 76 to 80 forms, together with the simple radio unit 63 mounted on each of the remote control apparatus 6A, second bidirectional communication means having a high radio wave directionality of the 50 GHz band between the remote control apparatus 6A and the repeater car 7.

Also the simple radio units 76 to 80 are mounted on the platform 70 for revolving movement for the revolving system/swinging movement for the elevation angle system by the automatic tracking apparatus 76A to 80A (whose construction is similar to that shown in FIG. 4), and the orientations of the radio wave radiation faces thereof are adjusted automatically so that the signal reception levels thereof may always be in the maximum (so that they may oppose the 50 GHz simple radio units 63 of the remote control apparatus 6A which are the other parties of communication).

Further, if an intercepting body enters between any of the 50 GHz simple radio units 76 to 80 and a corresponding one of the remote control apparatus 6A and a radio wave from the remote control apparatus 6A is temporarily interrupted, then the 50 GHz antenna 76 to 80 keeps, together with the automatic tracking apparatus 63A on the remote control apparatus 6A side which will be hereinafter described, the orientation thereof then for a fixed time and then automatically searches a radio wave from the remote control apparatus 6A side to recover communication with the remote control apparatus 6A.

It is to be noted that, when antenna control signals from the remote control apparatus 6A are received by antenna control signal reception sections 891 and 893 which will be hereinafter described, the orientations of the radio wave radiation faces of the 50 GHz antennae 71 to 75 and 76 to 80 described above are adjusted in response to the antenna control signals (it is also possible to adjust the orientations of the simple radio units 71 to 80 manually from the remote control apparatus 6A side).

The 2.4 GHz reception antenna 81 is provided to receive antenna control signals described above transmitted as SS (Spread Spectrum) radio waves (hereinafter described) of the 2.4 GHz band from the remote control apparatus 6A.

Further, while the 429 MHz transmission antennae 82 described above are provided to transmit antenna control signals for controlling the orientations of the 50 GHz simple radio units 31 individually mounted on the construction machines 1 to 3 and other signals by radio waves of the 429 GHz band, in the present embodiment, when communication by a radio wave of the 50 GHz band with any of the construction machines 1 to 3 is interrupted as described above (upon emergency), the 429 MHz transmission antenna 82 functions as an emergency antenna (emergency low radio wave directionality transmission section) such that a construction machine signal to the construction machine 1 to 3 may be transmitted by a radio wave of the 429 MHz band.

It is to be noted that, in the present embodiment, a number of such 429 MHz transmission antennae 82 equal to the number of the construction machines 1 to 3 (five construction machines) and they have a diversity construction (totaling 10 antenna constructions wherein each two antennae correspond to one of the five construction machines 1 to 3) similarly to the 429 MHz reception antenna 33 of the reception side (construction machines 1 to 3 side) such that signals of the same contents and the same level can be transmitted simultaneously in two systems for each of the construction machines 1 to 3 (on the reception side, a signal of a higher signal quality is adopted).

Further, the television cameras 83 and 84 are provided to supervise around the working site 4 and catch images of the construction machines 1 to 3 during operation in the working site 4, and images (image information) imaged by the cameras 36 to 38 are transmitted to the remote control apparatus 6A through corresponding ones of the 50 GHz simple radio units 76 to 80 and displayed on the display units 67 of the remote control apparatus 6A.

It is to be noted that the television cameras 83 described above are mounted on the platform 70 for revolving movement for the revolving system/swinging movement for the elevation angle system by the universal heads 83A, and the universal heads 83A are controlled from the remote control apparatus 6A so that the imaging directions can be varied suitably. The cameras 84 are fixed to the platform 70 and always image in fixed directions (for example, the entire working site 4).

The lights 85 and 86 are provided to illuminate the working site 4 or illuminate the construction machines 1 to 3 when the working site 4 has a poor field of view, at night or in a like case. It is to be noted that also the lights 85 described above are mounted on the platform 70 for revolving movement for the revolving system/swinging movement for the elevation angle system by the universal heads 85A and the universal heads 85A are controlled from the remote control apparatus 6A so that the illumination directions may be varied suitably. The lights 86 are fixed to the platform 70 and always illuminate in fixed directions.

The communication control apparatus 89 is provided to control such processing as communication by the 50 GHz simple radio units 71 to 80, 2.4 GHz reception antenna 81 and 429 MHz transmission antenna 82 described above, the orientations of the simple radio units 71 to 80, cameras 83 and lights 85 (universal heads 71A to 80A, 83A and 85A), working of images imaged by the cameras 83 and cameras 84 (conversion into image data).

To this end, the present communication control apparatus 89 in the present embodiment includes, as shown in FIG. 5, antenna control signal reception sections 891 and 893, an interface section (I/F) 892 for the 50 GHz simple radio units 71 to 75, another interface section (I/F) 894 for the 50 GHz simple radio units 76 to 80, a transmission section 895 for the 429 MHz transmission antennae 82, a camera/light control apparatus 896, an image editing apparatus 897 and a central control unit (CPU) 898.

Here, the antenna control signal reception section 891 adjusts, when an antenna control signal from any of the remote control apparatus 6A is received by the corresponding 2.4 GHz reception antenna 81, the orientation of the 50 GHz simple radio unit 71 to 75 in response to the antenna control signal. The interface section 892 performs interfacing between the 50 GHz simple radio units 71 to 75 and the CPU 898.

The interface section 894 adjusts, when an antenna control signal from any of the remote control apparatus 6A is received by the 2.4 GHz reception antenna 81, the orientation of the corresponding 50 GHz simple radio unit 76 to 80 in response to the antenna control signal and performs a function as a response section which responds to an automatic tracking signal from an automatic tracking apparatus 63A (hereinafter described with reference to FIG. 6) mounted on the remote control apparatus 6A.

Further, the interface section 894 is provided to perform interfacing between the 50 GHz simple radio units 76 to 80 and the CPU 898. The transmission section 895 transmits antenna control signals for controlling the orientations of the 50 GHz simple radio units 31 on the construction machines 1 to 3 side by radio waves of the 429 MHz band in response to instructions of the CPU 898.

It is to be noted, however, that the transmission section 895 repeats and transmits, upon emergency [when communication by any of the 50 GHz simple radio units 71 to 75 (interface section 892) is impossible], a construction machine control signal received through the corresponding 50 GHz simple radio unit 76 to 80 (upon emergency, the 2.4 GHz transmission/reception antenna 87) from the corresponding remote control apparatus 6A to corresponding ones of the construction machines 1 to 3 by a radio wave of the 429 MHz band from the 429 MHz transmission antenna 82.

The camera/light control apparatus 896 controls, when a camera/light control signal is received from any of the remote control apparatus 6A through the 50 GHz simple radio unit 76 to 80, ON/OFF of the television cameras 83 and 84 and lights 85 and 86, the orientations of a camera 83/light 85 (universal heads 83A/85A) and so forth in response to an instruction from the CPU 898. The image editing apparatus (image composer) 897 edits and works images imaged by the cameras 83 and 84, for example, into image data for one screen of the display unit 67 of each of the remote control apparatus 6A.

The CPU 898 controls operation of the antenna control signal reception sections 891 and 893, transmission section 895, camera/light control apparatus 896 and image editing apparatus 897 described above in a concentrated manner, and here, it operates, upon ordinary operation, principally based on signals transmitted or received by the 50 GHz simple radio units 71 to 80, but operates, upon emergency, based on a signal transmitted or received by the 2.4 GHz transmission/reception antenna 87 for emergency.

It is to be noted that, if a repeater car control signal is received from any of the remote control apparatus 6A through the 50 GHz simple radio unit 76 to 80, then the CPU 898 provides an instruction corresponding to the control signal to the vehicle control apparatus 90 provided in the upper revolving unit 100' so that, for example, the boom cylinder 120' may be expanded or contracted to raise or lower the platform 70, the revolving motor may be rotated to revolve the upper revolving unit 100' or the hydraulic motor may be driven to drive the caterpillar members 500A' to cause the repeater car 7 to travel, by the vehicle control apparatus 90.

Further, the 2.4 GHz transmission/reception antenna 87 (which may be hereinafter referred to as SS radio unit 87) provided on the upper revolving unit 100' is an emergency transmission/reception antenna for enabling bidirectional communication (except images, however) with the corresponding remote control apparatus 6A by an SS radio wave (spread spectrum radio wave) of no directionality of the 2.4 GHz band upon emergency. An emergency transmission/reception antenna for enabling bidirectional communication (except images, however) with the A.

In short, the 2.4 GHz transmission/reception antenna 87 forms, together with a 2.4 GHz transmission/reception antenna 64 (hereinafter described with reference to FIG. 6)

mounted on the corresponding remote control apparatus 6A, emergency spread spectrum bidirectional communication means which enables, when communication by a radio wave of the 50 GHz band (second bidirectional communication means) is impossible, bidirectional communication between the remote control apparatus 6A and the repeater car 7. Consequently, upon emergency, communication with the remote control apparatus 6A can be performed simply and conveniently even if the other party of communication is not tracked automatically as with a radio wave of the 50 GHz band.

The GPS reception antenna 88 used to receive signals from artificial satellites to detect the current position of the present repeater car 7 and report it to the remote control apparatus 6A, and consequently, on the remote control apparatus 6A side, also the current position of the repeater car 7 can be managed on the real time basis together with the current positions of the construction machines 1 to 3.

To this end, the vehicle control apparatus 90 described above further includes a 2.4 GHz transmission/reception section (emergency spread spectrum bidirectional transmission/reception section) 91 for performing transmission and reception of a signal communicated with the remote control apparatus 6A through the 2.4 GHz transmission/reception antenna 87 upon emergency, a GPS reception section 92 for performing desired reception processing for satellite signals received through the GPS reception antenna 88, and so forth. It is to be noted that satellite signals received by the GPS reception section 92 are used to detect the current position of the repeater car 7 and so forth (connected to the CPU 898).

Figure 6:
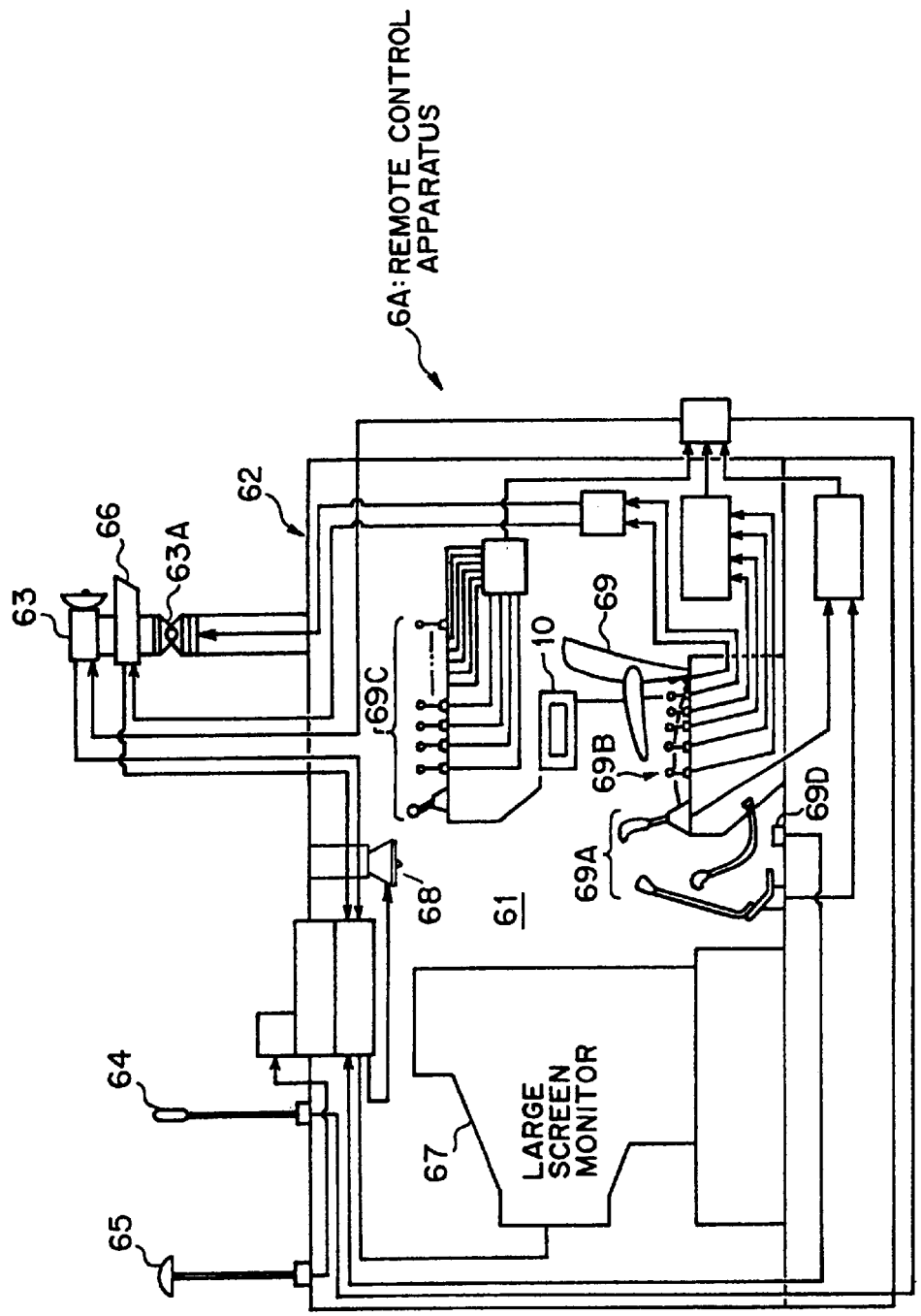
FIG. 6 is a view schematically showing a construction of a remote control apparatus in the first embodiment.

FIG. 6 is a view schematically showing a construction of the remote control apparatus 6A for the construction machines 1 to 3. As shown in FIG. 6, each of the remote control apparatus 6A in the present embodiment basically has a construction wherein a 50 GHz simple radio unit (antenna) 63 with a universal head (automatic tracking apparatus) 63A and a zoom camera 66, a 2.4 GHz transmission/reception antenna 64 and a GPS reception antenna 65 are mounted on an outer wall face 62 which forms a control space (room) 61 and a display unit (large screen monitor) 67, a speaker 68, a seat 69 and so forth are provided in the control room 61.

Here, the 50 GHz simple radio unit (high radio wave directionality bidirectional transmission/reception section) 63 is provided to perform bidirectional communication by a radio wave of a high radio wave directionality of the 50 GHz band with the repeater car 7, and it transmits operation information when any of a control operation lever set 69A and control lever/switch sets 69B and 69C which will be hereinafter described is operated as a construction machine (repeater car) control signal, an antenna control signal, a camera/light control signal or the like toward the repeater car 7 and receives an image, sound, vehicle monitor information and so forth transmitted thereto from the repeater car 7.

Also the 50 GHz simple radio unit 63 is mounted on the remote control apparatus 6A for revolving movement for the revolving system/swinging movement for the elevation angle system by the automatic tracking apparatus 63A (whose construction is similar to that shown in FIG. 4), and the orientation of the radio wave radiation face thereof is automatically adjusted so that the signal reception level thereof may always be in the maximum (so that it may oppose a corresponding one of the 50 GHz simple radio units 76 to 80 of the repeater car 7 which is the other party of communication).

Also in this instance, if an intercepting object enters between the repeater car 7 and the 50 GHz simple radio unit 63 and a radio wave from the repeater car 7 is interrupted temporarily, then the 50 GHz simple radio unit 63 keeps, together with the automatic tracking apparatus 76A (77A to 80A) of the repeater car 7 side, the orientation of the 50 GHz antenna 63 then for a fixed time and then automatically searches a radio wave from the repeater car 7 to recover communication with the repeater car 7.

Consequently, even if the relative position of the remote control apparatus 6A to the repeater car 7 varies, since the remote control apparatus 6A can automatically track the 50 GHz simple radio unit 76 (77 to 80) mounted on the repeater car 7 so that the radio wave radiation face of the 50 GHz simple radio unit 63 and the radio wave radiation face of the 50 GHz simple radio unit 76 (77 to 80) mounted on the repeater car 7 may always oppose each other, stabilized communication can always be performed with the repeater car 7.

It is to be noted that it is possible to manually adjust the orientation of the radio wave radiation face of the 50 GHz simple radio unit 63 described above by operating a "fixed station 50 GHz universal head control lever" of the control lever/switch set 69B which will be hereinafter described.

Further, the 2.4 GHz transmission/reception antenna (emergency spread spectrum bidirectional transmission/reception section) 64 (which may sometimes be hereinafter referred to as SS radio unit 64) is provided to perform, upon emergency such as when bidirectional communication with the repeater car 7 by the 50 GHz simple radio unit 63 described above is interrupted, bidirectional communication with the repeater car 7 (transmission of a construction machine control signal and reception of vehicle monitor information) instead using an SS radio wave (spread spectrum radio wave) of the 2.4 GHz band. It is to be noted that the 2.4 GHz transmission/reception antenna 64 is used also to transmit antenna control signals for controlling the orientations of the 50 GHz simple radio units 76 to 80 mounted on the repeater car 7.

The GPS reception antenna 65 is used to receive signals from artificial satellites to detect the current position of the present remote control apparatus 6A. The zoom (very telescopic) camera (camera apparatus) 66 is provided to catch an image of the repeater car 7 when communication by the 50 GHz simple radio unit 63 described above is impossible. When communication by the 50 GHz simple radio unit 63 is impossible, the operator will operate a "construction machine/repeater car changeover switch" of the control lever/switch set 69B which will be hereinafter described to change over the vehicle of an object of remote control to the repeater car 7 so that it can remotely control (emergency operate) the repeater car 7 while observing an image (displayed on the display unit 67) of the repeater car 7 caught by the camera 66.

It is to be noted that the orientation (imaging direction) of the zoom camera 66 in the present embodiment is controlled in an interlocking relationship with the orientation of the 50 GHz simple radio unit 63 by the automatic tracking apparatus 63A and, even if the repeater car 7 moves, an image of the repeater car 7 can always be caught. However, it is also possible to control the orientation of the zoom camera 66 irrespective and independently of the orientation of the 50 GHz simple radio unit 63.

The display unit 67 is provided to display an image of the repeater car 7 caught by the zoom camera 66 or an image from the construction machines 1 to 3 (or the repeater car 7) received through the 50 GHz simple radio unit 63 described above. The speaker 68 is provided to output sound from the construction machines 1 to 3 received through the 50 GHz simple radio unit 63 similarly.

Further, in the control room 61, the seat 69 is a place to be seated by the operator, who remotely radio controls one of the construction machines 1 to 3 which the operator takes charge of, and in the proximity of the seat 69, a monitor panel (display switch panel) 10 with a target slope face angle setting unit, the control operation lever set 69A, control lever/switch sets 69B and 69C, a screen changeover switch 69D and so forth are provided.

Here, the monitor panel 10 described above can perform a switch operation when a "semiautomatic control mode" which will be hereinafter described is to be started. The control operation lever set 69A is provided to remotely control one of the construction machines 1 to 3 which the control operation lever set 69A takes charge of. If the control operation lever set 69A is provided, for example, for one of the hydraulic excavators 1, at least a boom/bucket operation lever 6 and a stick operation lever 8 are included in the control operation lever set 69A.

The control lever/switch set 69B is provided to control equipments of the remote control apparatus 6A and the construction machine 1 to 3 and includes, for example, levers and switches given in (1) to (10) below.

(1) "Fixed station 50 GHz universal head control lever" for adjusting the orientation of the 50 GHz simple radio unit 63 (universal head 63A)

(2) "Fixed station camera control lever" for adjusting the orientation/magnification of the zoom camera 66

(3) "Construction machine 50 GHz universal head control lever" for adjusting the orientation of the 50 GHz simple radio unit 31 mounted on the construction machine 1 to 3

(4) "Construction machine camera universal head control lever" for controlling the orientation of the television camera 36 (universal head 37) mounted on the construction machine 1 to 3

(5) "Construction machine light universal head control lever" for controlling the orientation of the light 40 (universal head 41) mounted on the construction machine 1 to 3

(6) "Construction machine camera switch" for controlling ON/OFF of the television cameras 36 and 37 mounted on the construction machine 1 to 3

(7) "Construction machine light switch" for controlling ON/OFF of the light 40 mounted on the construction machine 1 to 3

(8) "2.4 GHz wave changeover switch" for changing over bidirectional communication with the repeater car 7 by the 50 GHz simple radio unit 63 to communication in which the 2.4 GHz transmission/reception antenna 64 for emergency is used when the bidirectional communication is interrupted (9) "429 MHz wave changeover switch" for changing over bidirectional communication with the construction machine 1 to 3 by the 50 GHz simple radio unit 71 to 80 to communication in which the 429 MHz transmission antenna 82 for emergency is used when the bidirectional communication is interrupted

(10) "Construction machine/repeater car changeover switch" for changing over the vehicle of an object of remote control between the construction machine 1 to 3 and the repeater car 7

Meanwhile, the control lever/switch set 69C is provided to control equipments of the repeater car 7 and includes, for example, levers and switches given in (1) to (5) below.

(1) "Repeater car 50 GHz universal head control lever" for adjusting the orientation of the 50 GHz simple radio unit 71 to 80 (universal head 71A to 80A) mounted on the repeater car 7

(2) "Repeater car camera universal head control lever" for adjusting the orientation of the television camera 83 (universal head 83A) mounted on the repeater car 7

(3) "Repeater car light universal head control lever" for adjusting the orientation of the light 85 (universal head 85A) mounted on the repeater car 7

(4) "Repeater car camera switch" for controlling ON/OFF of the television cameras 83 and 84 mounted on the repeater car 7

(5) "Repeater car light switch" for controlling ON/OFF of the lights 85 and 86 mounted on the repeater car Further, the screen changeover switch 69D is provided to suitably change over the display screen of the display unit 67 to an imaged image screen of the cameras 36 and 37 (83 and 84) sent from the construction machine 1 to 3 (or the repeater car 7) or a display screen of vehicle monitor information of the construction machine 1 to 3.

In the present remote control apparatus 6A having such a construction as described above, when the operator seated on the seat 69 operates the control operation lever set 69A or the control lever/switch set 69B or 69C described above while observing a working condition of the construction machine 1 to 3 displayed on the display unit 67, information of the operation is transmitted as such a construction machine (repeater car) control signal, an antenna control signal, a camera/light control signal or the like as described above from the 50 GHz simple radio unit 63 to cause the construction machine 1 to 3 (repeater car 7) to perform a desired work.

In short, in the remote control apparatus 6A of the present embodiment, the structure in the control room 61 (arrangement of the control operation lever set 69 and so forth) is formed imitating the structure in the cabin 600 of the actual construction machines 1 to 3 (repeater car 7) so that the operator can control, even from a remote place, the construction machine 1 to 3 (repeater car) in a sense (virtual reality environment) more proximate to an actual driving feeling.

Figure 7:
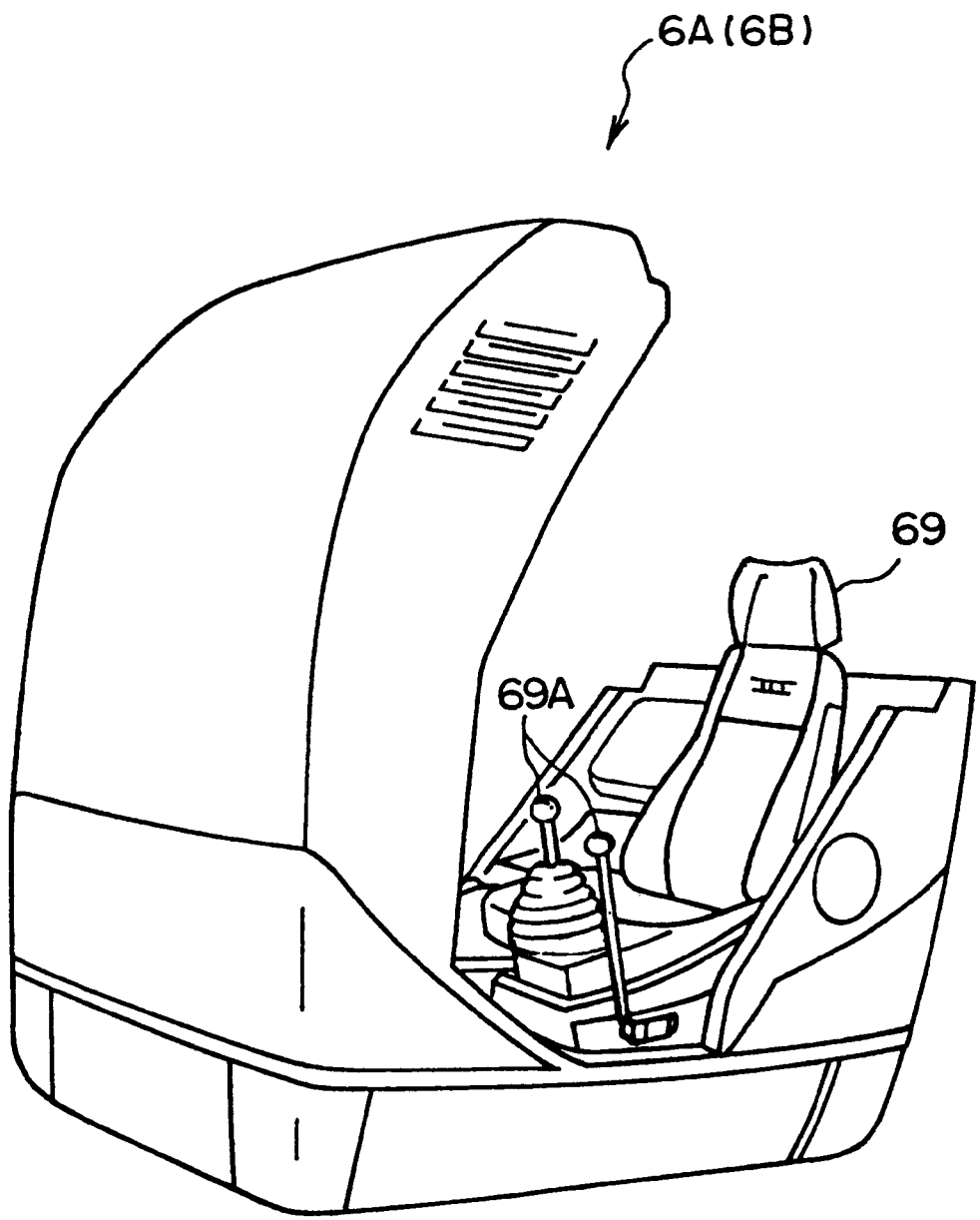
FIG. 7 is a perspective view showing an example of an appearance where the remote control apparatus in the first embodiment is viewed from obliquely forwardly.
Figure 8:
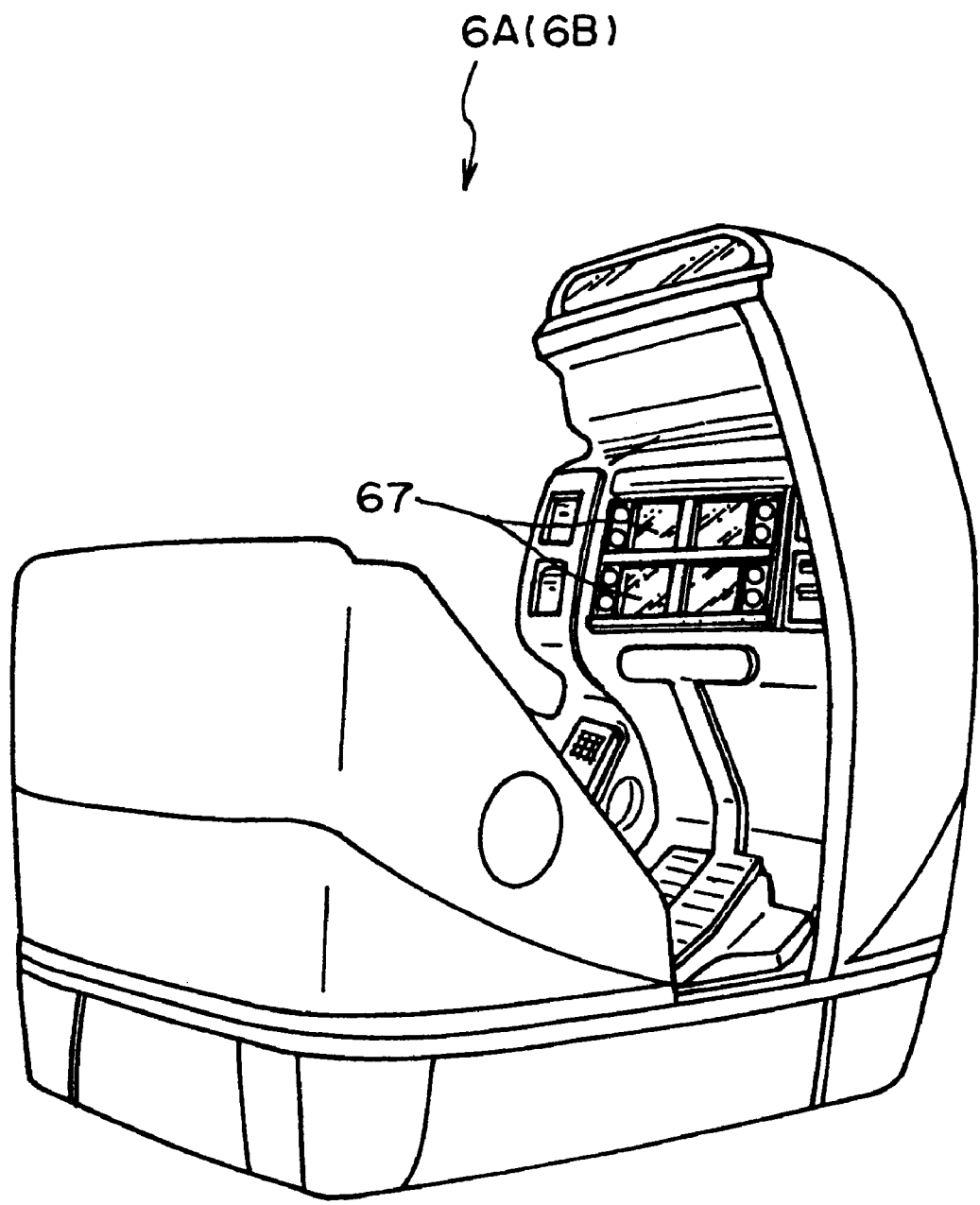
FIG. 8 is a perspective view showing an example of an appearance where the remote control apparatus in the first embodiment is viewed from obliquely rearwardly.

It is to be noted that FIG. 7 is a perspective view showing an example of an appearance when the remote control apparatus 6A is viewed from obliquely forwardly, and FIG. 8 is a perspective view showing an example of an appearance when the same remote control apparatus 6A is viewed from obliquely rearwardly.

Figure 9:
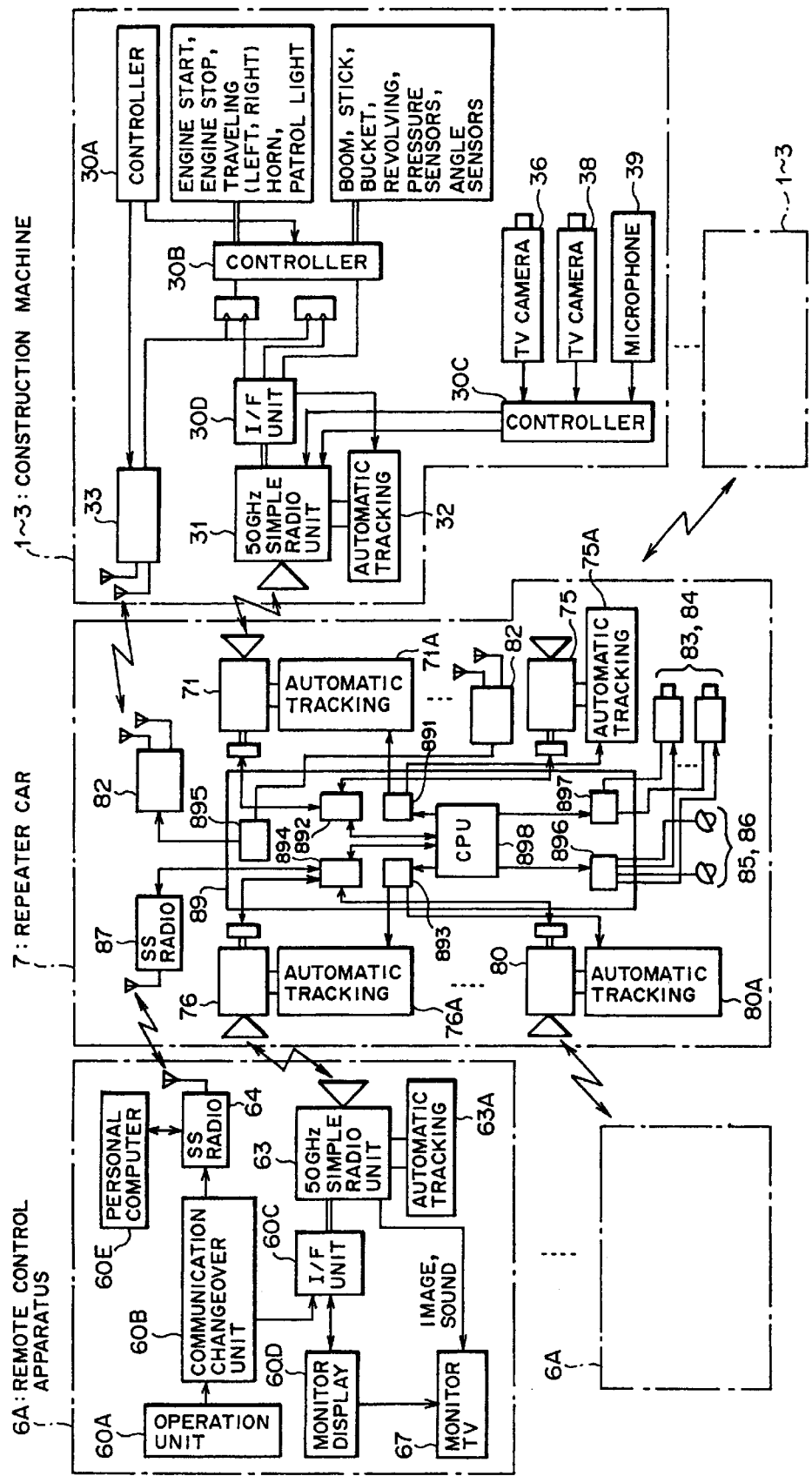
FIG. 9 is a functional block diagram of the remote radio control system composed of construction machines, remote control apparatus and a repeater car in the first embodiment.

FIG. 9 is a functional block diagram of the present remote radio control system which includes the 5 construction machines 1 to 3, remote control apparatus 6A and repeater car 7 described above. Referring to FIG. 9, each of the construction machines 1 to 3 includes controllers 30A to 30C and an interface (I/F) section 30D, and each of the remote control apparatus 6A includes an operation unit 60A, a communication changeover unit 60B, an interface (I/F) section 60C, a monitor display control section 60D and a personal computer (personal computer) 60E. It is to be noted that the other components (elements denoted by like reference symbols to those shown in FIGS. 2, 5 and 6) are similar to those described hereinabove with reference to FIGS. 2, 5 and 6.

In the construction machines 1 to 3, the controller 30A principally controls reception processing (diversity reception processing and so forth) of a radio wave [an antenna control signal for the 50 GHz simple radio unit 31 (universal head 32), a construction machine control signal upon emergency and so forth] of the 429 MHz band by the 429 MHz reception antenna 33. It is to be noted that, when a signal is actually received by the 429 MHz reception antenna 33, the controller 30A gives an instruction to the controller 30B to selectively use the signal received by the 429 MHz reception antenna 33.

The controller 30B is provided to control start/stop of an engine (not shown), travelling (driving of the left and right caterpillar members 500A), posture (semiautomatic) control of the construction machine 1 to 3 [in the case of the hydraulic excavator 1, control of the boom 200 (cylinder 120), stick 300 (cylinder 121), bucket 400 (cylinder 130), the revolving motor and so forth], imaging by the cameras 36 and 38, collection of sound by the microphone 39 and so forth in response to a construction machine control signal received through the 50 GHz simple radio unit 31.

It is to be noted, however, that, if communication by the 50 GHz simple radio unit 31 is interrupted, then the controller 30B selectively uses a construction machine control signal received by the 429 MHz reception antenna 33 in place of the 50 GHz simple radio unit 31 to perform various controls such as start/stop of the engine, travelling, posture control and so forth mentioned above.

Further, the controller 30C is provided for interfacing when images imaged by the cameras 36 and 38 or sound (control sound, working sound of the construction machine 1 to 3) collected by the microphone 39 is to be transmitted as a radio wave of the 50 GHz band from the 50 GHz simple radio unit 31 toward the repeater car 7. The interface section 30D is provided for interfacing between the 50 GHz simple radio unit 31 and the controller 30B.

Meanwhile, in the remote control apparatus 6A, the operation unit 60A produces a signal in response to a controlling operation by the operator and is a unit which corresponds to the control operation lever set 69A and the control lever/switch sets 69B and 69C shown in FIG. 6. The communication changeover unit 60B is provided to change over the frequency band (50 GHz band and 2.4 GHz band) of a radio wave to be used for communication with the repeater car 7, and in ordinary operation, the 50 GHz simple radio unit 63 is used, but upon emergency, the SS radio unit 64 is used as described hereinabove.

Further, the interface section 60C interfaces between the operation unit 60A and monitor display control section 60D and the 50 GHz simple radio unit 63. The monitor display control section 60D is provided to control displaying on the display unit 67 of an image sent thereto from the construction machine 1 to 3 through the repeater car 7. The personal computer 60E is provided to control bidirectional communication by a 2.4 GHz band radio wave upon emergency.

(A2) Description of Operation of the Entire Remote Radio. Control System

In the following, operation of the entire remote radio control system of the present embodiment having such a construction as described above is described in detail.

First, in any of the remote control apparatus 6A, the operator will observe an image from the construction machine 1 to 3 and the repeater car 7 displayed on the display unit 67 and suitably operate the control operation lever set 69A and the control lever/switch sets 69B and 69C to remotely control the construction machine 1 to 3 (repeater car 7) to transport the construction machine 1 to 3 to a predetermined position in the working site 4 and dispose the repeater car 7 to a predetermined position in the proximity of the working site 4.

It is to be noted that, in this instance, the operator will operate the "fixed station 50 GHz universal head control lever" of the control lever/switch set 69B to manually direct the 50 GHz simple radio unit 63 of the remote control apparatus 6A side to the 50 GHz simple radio unit 76 (77 to 80) of the repeater car 7 side and operate the "repeater car 50 GHz universal head control lever" of the control lever/switch set 69C to manually direct the 50 GHz simple radio unit 71 (72 to 75) of the repeater car side 7 to the 50 GHz simple radio unit 31 of the construction machine 1 to 3 so that antenna automatic tracking processing by the automatic tracking apparatus 63A, 71A to 80A and 32 is started between the remote control apparatus 6A—repeater car 7 and between the repeater car 7—construction machine 1 to 3.

In particular, if, for example, the 50 GHz simple radio unit 63 of the remote control apparatus 6A side is directed to the 50 GHz simple radio unit 76 to 80 of the repeater car 7 side, then in the repeater car 7 side, the automatic tracking apparatus 76A (77A to 80A) automatically searches a radio wave from the other party (50 GHz simple radio unit 63 of the remote control apparatus 6A side) based on a signal reception level at the simple radio unit 76 (77 to 80) to start automatic tracking.

After an automatic tracking condition is entered in this manner, the automatic tracking apparatus 76A to 80A of the repeater car 7 side detects a change in direction or rocking motion (inclination) of the repeater car 7 by means of the gyros 321 and 322, and the controller 323 drives, while taking a result of the detection into consideration, the drivers 324 and 326 for the revolving system and the elevation angle system to drive the stepping motors 325 and 327 to adjust the orientations (revolving angle and elevation angle) of the 50 GHz simple radio unit 76 to 80 so that the reception level of a radio wave of the 50 GHz band from the remote control apparatus 6A may be in the maximum.

On the other hand, also the automatic tracking apparatus 63A of the remote control apparatus 6A side drives, similarly to the automatic tracking apparatus 76A to 80A described above, the drivers 324 and 326 for the revolving system and the elevation angle system to drive the stepping motors 325 and 327 to adjust the orientations (revolving angle and elevation angle) of the 50 GHz simple radio unit 63 so that the reception level of a radio wave of the 50 GHz band from the 50 GHz simple radio unit 76 to 80 of the repeater car 7 side.

Also the automatic tracking apparatus 32 of the construction machine 1 to 3 side adjusts, after an automatic tracking condition is entered, the orientation of the 50 GHz simple radio unit 31 so that the reception level of a radio wave of the 50 GHz band from the repeater car 7 may be in the maximum. Simultaneously, also the automatic tracking apparatus 71A (72 to 75A) of the repeater car 7 side adjusts the orientation of the 50 GHz simple radio unit 71A (72 to 75A) so that the reception level of a radio wave of the 50 GHz band from the 50 GHz simple radio unit 31 of the construction machine 1 to 3 side may be in the maximum.

Consequently, in the present remote radio control system, in whatever manners the construction machine 1 to 3 and the repeater car 7 move, the 50 GHz simple radio units 63, 71 to 80 and 31 between the remote control apparatus 6A—repeater car 7 and between the repeater car 7—construction machine 1 to 3 can be controlled to individually oppose each other, the remote control apparatus 6A can always perform very long distance communication with the construction machine 1 to 3 stably.

After the automatic tracking apparatus 63A, 71A to 80A and 32 of the 50 GHz simple radio units 63, 71 to 80 and 31 are put into automatic tracking conditions to dispose the construction machine 1 to 3 and the repeater car 7 to predetermined positions in such a manner as described above, the operator will suitably operate the control operation lever set 69A (in the case of the hydraulic excavator 1, the boom/bucket operation lever 6 and the stick operation lever 8) in order to cause the construction machine 1 to 3 to perform a desired work.

Information of the operation in this instance is transmitted as a construction machine control signal in the form of a radio wave of the 50 GHz band to the repeater car 7 through the 50 GHz simple radio unit 63. When the construction machine control signal from the remote control apparatus 6A is received by the 50 GHz simple radio unit 76 (77 to 80), the repeater car 7 transmits and repeats the construction machine signal to the corresponding construction machine 1 to 3.

In the construction machine 1 to 3, when the construction machine control signal repeated from the repeater car 7 in this manner is received by the 50 GHz simple radio unit 31, the control apparatus 30 of the construction machine 1 to 3 controls, in response to the construction machine control signal, operation of the construction machine 1 to 3 [in the case of the hydraulic excavator 1, the boom 200 (cylinder 120), stick 300 (cylinder 121), bucket 400 (cylinder 122), hydraulic motors, revolving motor and so forth described hereinabove] so that the construction machine 1 to 3 performs a desired work in a semiautomatic control mode (which will be hereinafter described).

Here, a case (emergency) wherein, in the present system, communication by a radio wave of the 50 GHz band between any of the remote control apparatus 6A and the repeater car 7 or between the repeater car 7 and any of the construction machines 1 to 3 is interrupted by some trouble is examined.

For example, if communication by a radio wave of the 50 GHz band between any of the remote control apparatus 6A and the repeater car 7 is interrupted, then the operator will operate the operation unit 60A ("2.4 GHz wave changeover switch" of the control lever/switch set 69B) of the remote control apparatus 6A to change over the radio unit to be used to the SS radio unit (2.4 GHz transmission/reception antenna) 64 through the communication changeover unit 60B.

Consequently, information of the operation of the control operation lever set 69A by the operator in the remote control apparatus 6A is transmitted as a construction machine control signal in the form of an SS radio wave of the 2.4 GHz band having no directivity to the repeater car 7. In the repeater car 7, when the SS radio wave of the 2.4 GHz band from the remote control apparatus 6A is received by the 2.4 GHz transmission/reception antenna 87, the CPU 898 of the communication control apparatus 89 operates based on the received SS radio wave so that the received construction machine control signal is transmitted (repeated) to one of the construction machines 1 to 3 which is an object of remote control through a corresponding one of the 50 GHz simple radio units 71 to 75.

In the construction machine 1 to 3, the construction machine control signal transmitted as a radio wave of the 50 GHz band is received by the 50 GHz simple radio unit 31, and the control apparatus 30 (controllers 30B and 30C) operates based on the construction machine control signal so that the engine, the hydraulic motors, the revolving motor and so forth are suitably controlled to be driven to perform a desired work.

It is to be noted that, in this instance, from the repeater car 7 to the remote control apparatus 6A, at least vehicle monitor information of the construction machine 1 to 3 and sound information collected by the microphone 39 of the construction machine 1 to 3 are transmitted through the 2.4 GHz transmission/reception antenna 87. Although it is difficult, as things stand, to send images imaged by the cameras 36 and 38 of the construction machine 1 to 3 using an SS radio wave of the 2.4 GHz band, there is the possibility that it may become possible to transmit it, for example, depending upon the progress of the image compression technology in the future.

On the other hand, if communication by a radio wave of the 50 GHz band between the repeater car 7 and any of the construction machines 1 to 3 is interrupted, then when the operator operates the "429 MHz wave changeover switch" of the control lever/switch set 69B, the corresponding remote control apparatus 6A transmits to the repeater car 7 through the 50 GHz simple radio unit 63 a changeover signal for changing over the frequency of the radio wave to be used between the repeater car 7 and the construction machine 1 to 3 from the 50 GHz band to the 429 MHz band.

When the changeover signal from the remote control apparatus 6A is received by the 50 GHz simple radio unit 76 to 80, the repeater car 7 changes over the signal transmission line to be used by the CPU 898 from the 50 GHz simple radio unit 71 to 75 to the 429 MHz transmission antenna 82. Consequently, at least a construction machine control signal from the remote control apparatus 6A received by the 50 GHz simple radio unit 76 to 80 is transmitted as a radio wave of the 429 MHz band to the construction machine 1 to 3 through the 429 MHz transmission antenna 82.

If the construction machine 1 to 3 is at a distance within approximately 100 m from the repeater car 7 and can receive the radio wave of the 429 MHz band from the repeater car 7 by means of the 429 MHz reception antenna 33, then the control apparatus 30 (controllers 30A and 30B) operates based on the construction control signal so that the engine, hydraulic motors, revolving motor and so forth are controlled to be driven suitably to perform a desired work.

It is to be noted that, since communication by the radio wave of the 429 MHz band in this instance is single directional communication of the repeater car 7→construction machine 1 to 3, vehicle monitor information of the construction machine 1 to 3, images imaged by the cameras 36 and 38, sound information collected by the microphone 39 and so forth are not transmitted to the remote control apparatus 6A side. Further, if the distance between the construction machine 1 to 3 and the repeater car 7 exceeds 100 m, then the repeater car 7 is remotely controlled to move so that the distance thereto may become within 100 m, whereafter it performs radio communication of the 429 MHz band described above.

It is to be noted that, if communication between any of the remote control apparatus 6A and the repeater car 7 and between the repeater car 7 and a corresponding one of the construction machines 1 to 3 by radio waves of the 50 GHz band is interrupted, by a combination of them, bidirectional communication by an SS radio wave of the 2.4 GHz band is performed between the remote control apparatus 6A and the repeater car 7 as described above, and single directional communication by a radio wave of the 429 MHz band is performed between the repeater car 7 and the construction machine 1 to 3 in such a manner as described above. The following table represents relationships of used radio waves of the present system used upon ordinary operation and upon emergency.

TABLE

Relationships of radio wave frequencies used upon normal operation and upon emergency

| Communication case | Fixed station | Repeater car | | Construction machine |
|---|---|---|---|---|
| Normal operation | 50 GHz | 50 GHz | 50 GHz | 50 GHz |
| Upon emergency | | | | |
| Repeater car | 2.4 GHz | 2.4 GHz | 50 GHz | 50 GHz |
| Construction machine | 50 GHz | 50 GHz | 429 MHz | 429 MHz |
| Repeater car, construction machine | 2.4 GHz | 2.4 GHz | 429 MHz | 429 MHz |

In this manner, with the remote radio control system of the present embodiment, even if such a state of emergency that bidirectional communication by a radio wave of the 50 GHz band (second bidirectional communication means) which is a main communication medium between any of the remote control apparatus 6A and the repeater car 7 is interrupted is caused by some abnormality, since bidirectional communication between the remote control apparatus 6A and the repeater car 7 is enabled by an SS radio wave of the 2.4 GHz band (emergency spread spectrum bidirectional communication means), it is possible, even upon emergency, to cause the construction machines 1 to 3 to continue their working or retract or recover the construction machines 1 to 3 to a safe place, and the working efficiency in the working site 4 can be improved remarkably.

Further, also in a case wherein bidirectional communication by a radio wave of the 50 GHz band (first bidirectional communication means) which is a main communication medium between the repeater car 7 and any of the construction machines 1 to 3 has stopped, since at least a construction machine control signal can be transmitted to the construction machine 1 to 3 by a radio wave of the 429 MHz band (emergency weak radio wave directional communication means), it is possible at least to retract and recover the construction machines 1 to 3 to a safe place, and such a significant loss that the construction machines 1 to 3 must be left in the working site 4 which is so dangerous that a person cannot enter there can be eliminated with certainty.

Furthermore, in the present system, since the 50 GHz simple radio units 31, 63 and 71 to 80 are used for bidirectional communication between any of the remote control apparatus 6A and the repeater car 7 and between the repeater car 7 and any of the construction machines 1 to 3, very long distance communication over more than 1 km is possible between the remote control apparatus 6A—repeater car 7 and also between the repeater car 7—construction machine 1 to 3. Consequently, where the working site 4 is such that a dangerous place into which no person can enter spans a wide range such as, for example, a site for restoration against natural calamities by avalanche by sand and stone, eruption of a volcano or the like, the operator can control the construction machine 1 to 3 to perform working for restoration against the natural calamities safely and with certainty.

Further, with the remote radio control system described above, since any of the 50 GHz simple radio units 31, 63 and 71 to 80 can always be opposed to one of the 50 GHz simple radio units 31, 63 and 71 to 80 which is the other party of communication by means of the automatic tracking apparatus 32, 63A and 71A to 80A, although a radio wave of the 50 GHz band having a high directionality is used, even if the repeater car 7 or the construction machine 1 to 3 moves, normally stable communication can be performed, which contributes very much to improvement in reliability of the present system.

Further, in the present system, since the 50 GHz simple radio units 71 to 75 and 31 are provided on the repeater car 7 side and the construction machines 1 to 3 side, respectively, and the automatic tracking apparatus 71A to 75A and 32 are provided on the repeater car 7 side and the construction machines 1 to 3 side, respectively, to thereby provide 5 sets of bidirectional communication means and automatic tracking means corresponding to the number of the construction machines 1 to 3 (totaling 5 machines), bidirectional communication with the construction machines 1 to 3 can be performed independently of each other for the individual construction machines 1 to 3. Accordingly, it is possible to cause the construction machines 1 to 3 to simultaneously perform different works from one another, and the working efficiency can be improved remarkably and the period for working can be shortened.

Furthermore, in the present system, since five sets of emergency weak radio wave directional communication means which are each formed from the 429 MHz transmission antenna 82 of the repeater car 7 side and the 429 MHz reception antenna 33 of the construction machines 1 to 3 side are provided corresponding to the five construction machines 1 to 3, even if communication by a radio rave of the 50 GHz band between the repeater car 7 and any of the construction machines 1 to 3 is interrupted, the construction machines 1 to 3 can be remotely controlled independently of one another. Accordingly, even upon emergency, all of the construction machines 1 to 3 in the working site 4 can be retracted and recovered to a safe place with certainty.

(A3) Description of "Semiautomatic Control" of the Construction Machines 1 to 3

By the way, each of the construction machines 1 to 3 described above in the present embodiment performs, when the operation (posture) of the construction machine 1 to 3 is controlled to perform a desired work based on a construction machine control signal transmitted thereto from the corresponding remote control apparatus 6A through the repeater car 7, posture control called "semiautomatic control" by means of the controller 30B.

In the following, whereas constructions of the construction machines 1 to 3 with this "semiautomatic control" taken notice of are described, here, for the convenience, description is given by way of an example of the hydraulic excavator 1 described hereinabove.

Figure 10:
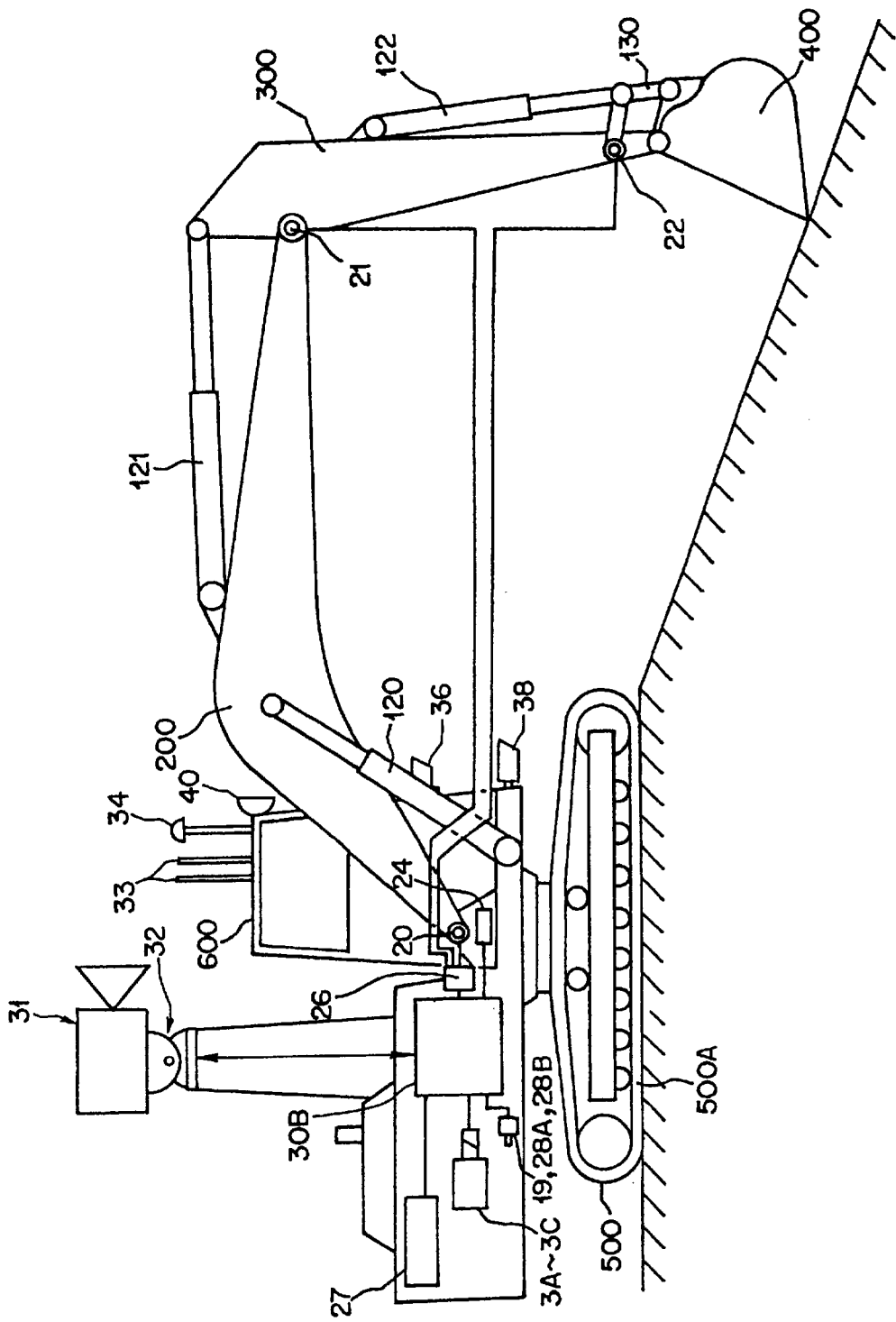
FIG. 10 is a schematic view showing a construction of a hydraulic excavator on which a control apparatus according to the first embodiment is mounted.

FIG. 10 is a view schematically showing a construction of the hydraulic excavator 1. Referring to FIG. 10, those elements to which like reference symbols to those shown in FIG. 2 are applied denote like elements to those described hereinabove with reference to FIG. 2, and the hydraulic excavator 1 shown in FIG. 10 further includes solenoid proportional valves (control valve mechanisms) 3A, 3B and 3C, pressure sensors 19, 28A and 28B, resolvers 20 to 22, a vehicle inclination angle sensor 24, a signal converter 26, an engine pump controller 27 and so forth. Details of the elements are hereinafter described.

Figure 11:
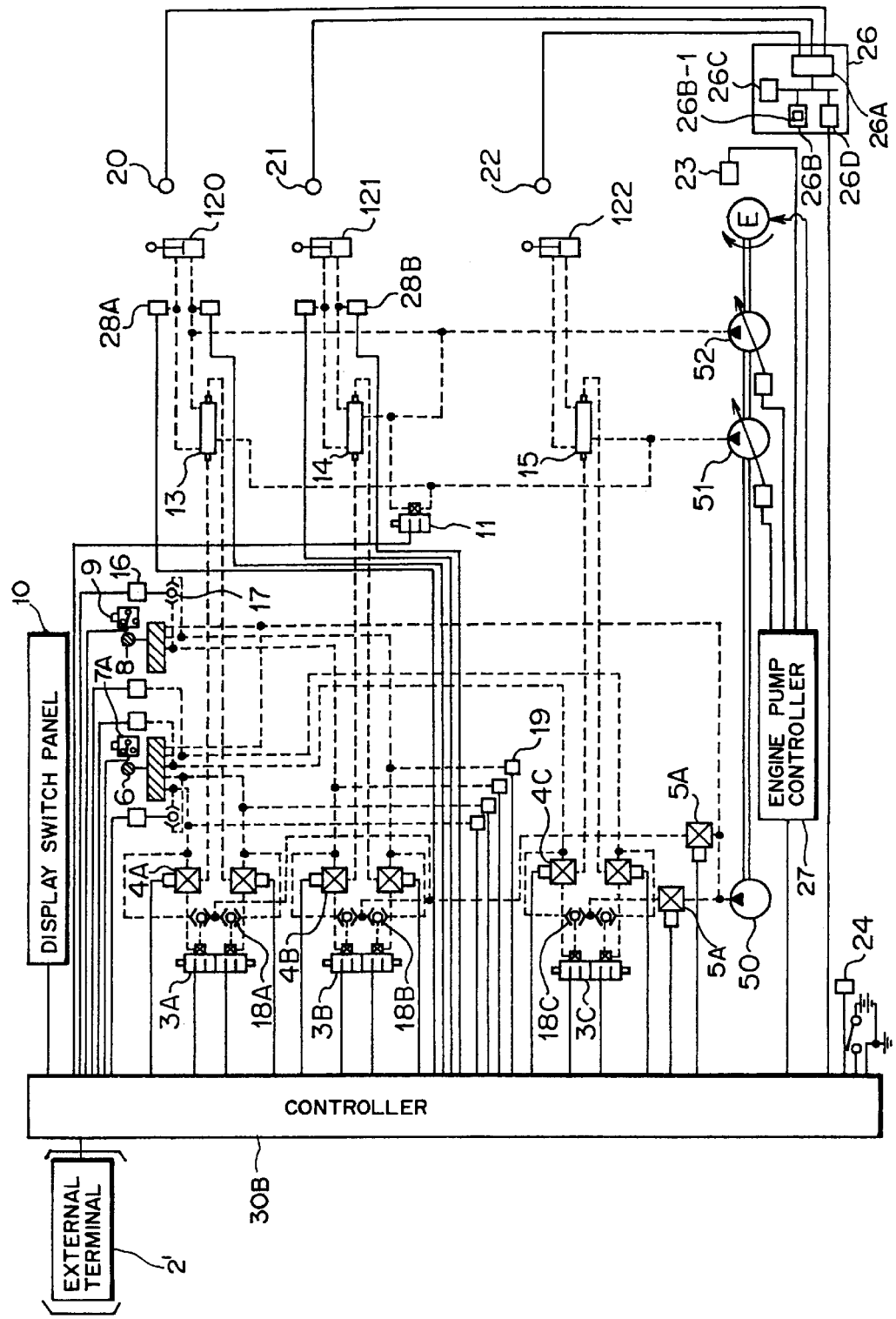
FIG. 11 is a view roughly showing a construction (an electric signal circuit and a hydraulic circuit) of the entire control apparatus according to the first embodiment.

The hydraulic excavator 1 of the present embodiment further includes, for example, as shown in FIG. 11, hydraulic circuits (fluid pressure circuits) for the cylinders 120 to 122 and the hydraulic motors and the revolving motor described above, and in addition to pumps 51 and 52 of the variable discharge type (variable delivery pressure type, variable capacity type) which are driven by an engine E (prime mover of the rotational output type such as a Diesel engine), a boom main control valve (control valve, control valve mechanism) 13, a stick main control valve (control valve, control valve mechanism) 14, a bucket main control valve (control valve, control valve mechanism) 15 and so forth are interposed.

It is to be noted that the pumps 51 and 52 of the variable discharge type is constructed such that they can vary the discharges of working oil to the hydraulic circuits by individually adjusting the tilt angles thereof by means of the engine pump controller 27 which will be hereinafter described. Further, where a line which interconnects different components in FIG. 11 is a solid line, this indicates that the line is an electric circuit, but where a line which interconnects different components is a broken line, this indicates that the line is a hydraulic circuit.

Further, in order to control the main control valves 13, 14 and 15, a pilot hydraulic circuit is provided, and in addition to the pilot pump 50 which is driven by the engine E, the solenoid proportional valves (control valve mechanism) 3A, 3B and 3C, solenoid directional control valves 4A, 4B and 4C, selector valves 18A, 18B and 18C and so forth are interposed in the pilot hydraulic circuit.

Furthermore, the hydraulic excavator 1 of the present embodiment includes the controller (control means) 30B described above in order to control the main control valves 13, 14 and 15 through the solenoid proportional valves 3A, 3B and 3C in response to a construction machine control signal from the remote control apparatus 6A to control the boom 200, stick 300 and bucket 400 so that they may perform desired extension or contraction displacements in accordance with a mode in which they are to be controlled. It is to be noted that the controller 30B is composed of a microprocessor, memories such as a ROM and a RAM, a suitable input/output interface and so forth.

To the controller 30B, detection signals (including setting signals) from various sensors are inputted, and the controller 30B executes the control described above based on a construction machine control signal received from the remote control apparatus 6A and detection signals from the sensors.

Such control by the controller 30B is called "semiautomatic control mode", and also in excavation in the semiautomatic control mode, fine adjustment of a bucket angle, a target slope face height or the like can be performed manually from the remote control apparatus 6A.

Figure 21:
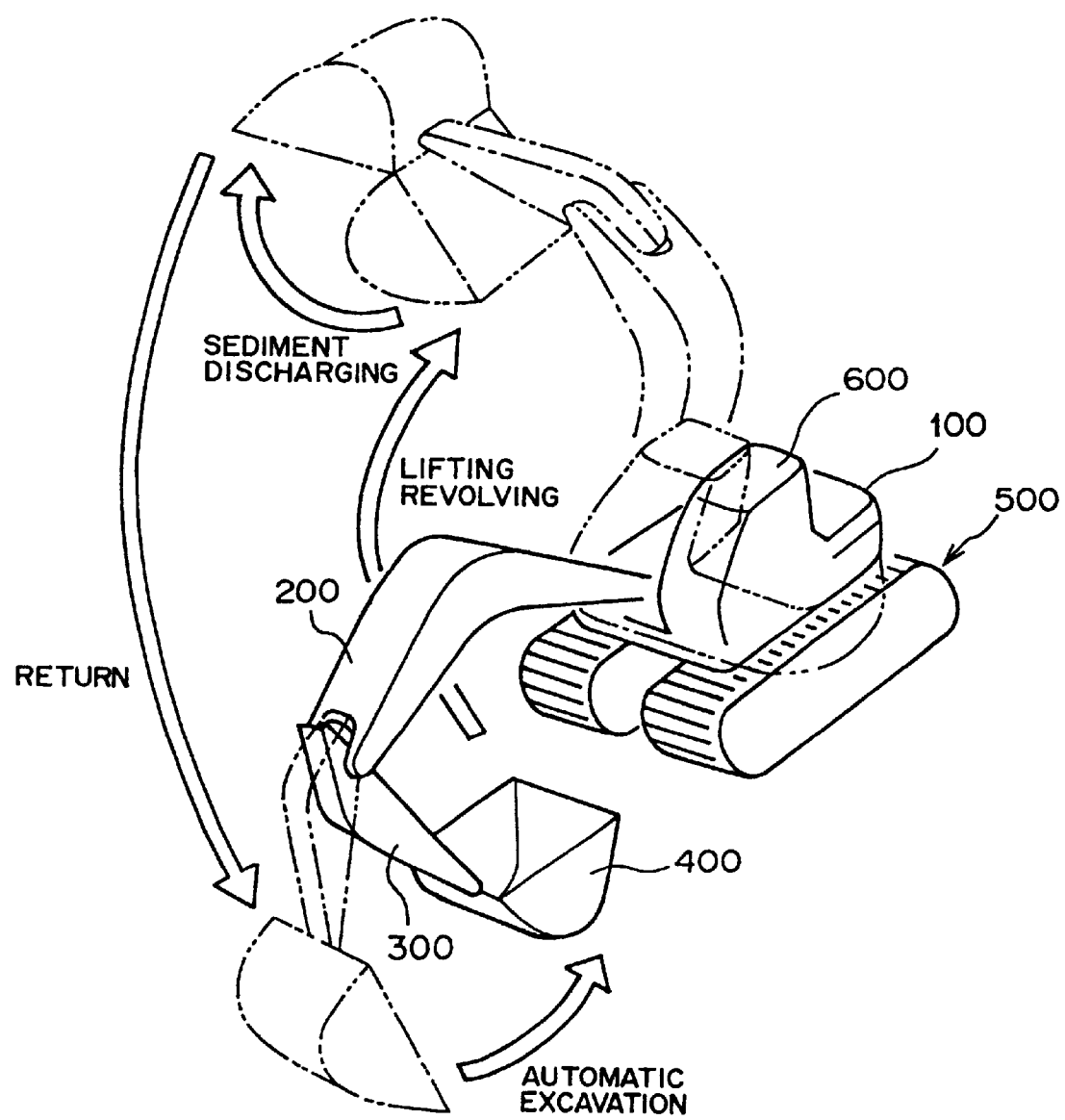
FIG. 21 is a perspective view schematically showing the hydraulic excavator according to the first embodiment for explaining operation of the hydraulic excavator.

As such semiautomatic control modes as described above, a bucket angle control mode (refer to FIG. 16), a slope face excavation mode (bucket tip linear excavation mode or raking mode; refer to FIG. 17), a smoothing mode which is a combination of the slope face excavation mode and the bucket angle control mode (refer to FIG. 18), a bucket angle automatic return mode (automatic return mode; refer to FIG. 19), an automatic excavation loading mode (refer to FIG. 21) and so forth are available.

Figure 16:
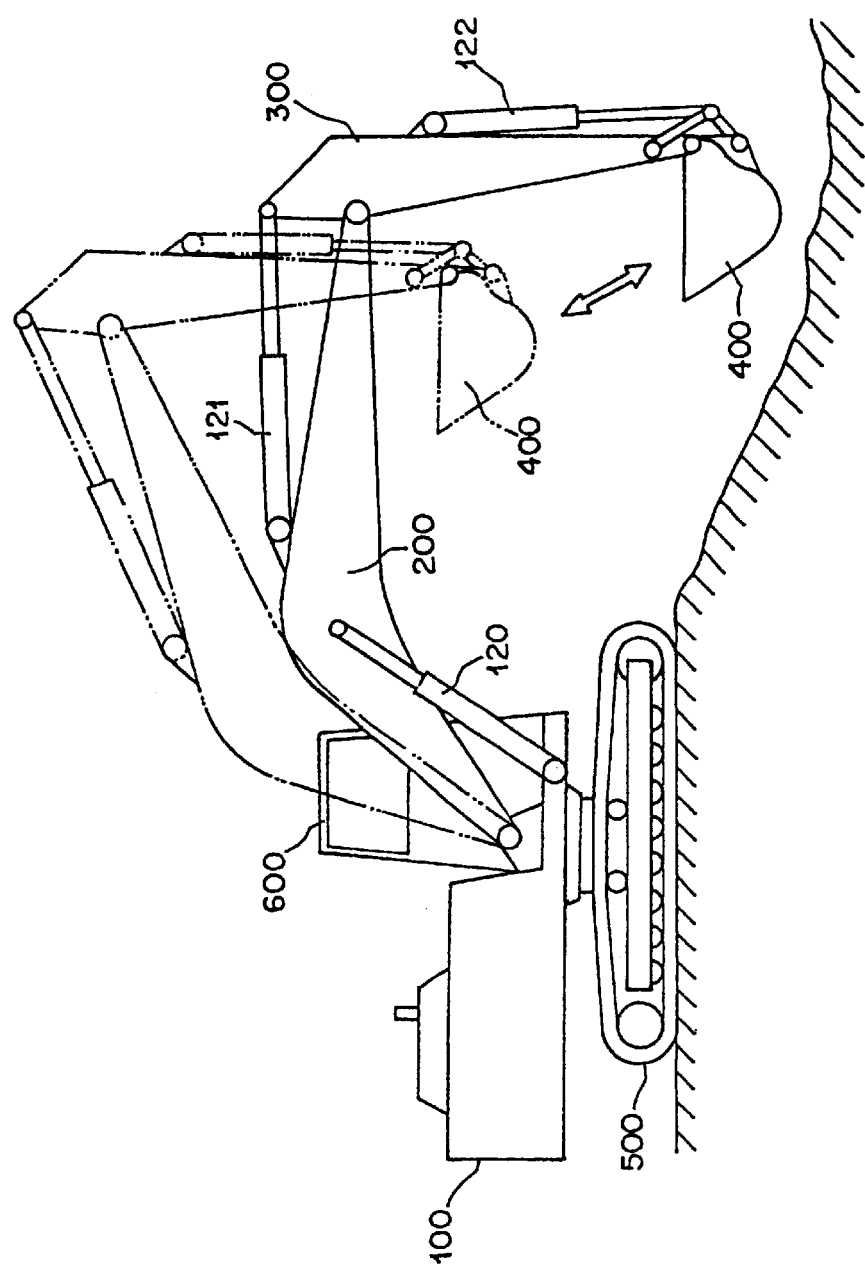
FIG. 16 is a side elevational view schematically showing the hydraulic excavator according to the first embodiment for explaining operation of the hydraulic excavator.

Here, the bucket angle control mode is a mode in which the angle (bucket angle) of the bucket 400 with respect to the horizontal direction (vertical direction) is always kept constant even if the stick 300 and the boom 200 are moved as shown in FIG. 16, and this mode is set if a bucket angle control switch is operated through the monitor panel 10 in the remote control apparatus 6A. It is to be noted that this mode is cancelled when the bucket 400 is moved by remote control (manually) from the remote control apparatus 6A side, and a bucket angle at a point of time when the bucket 400 is stopped is stored as a new bucket holding angle.

Figure 17:
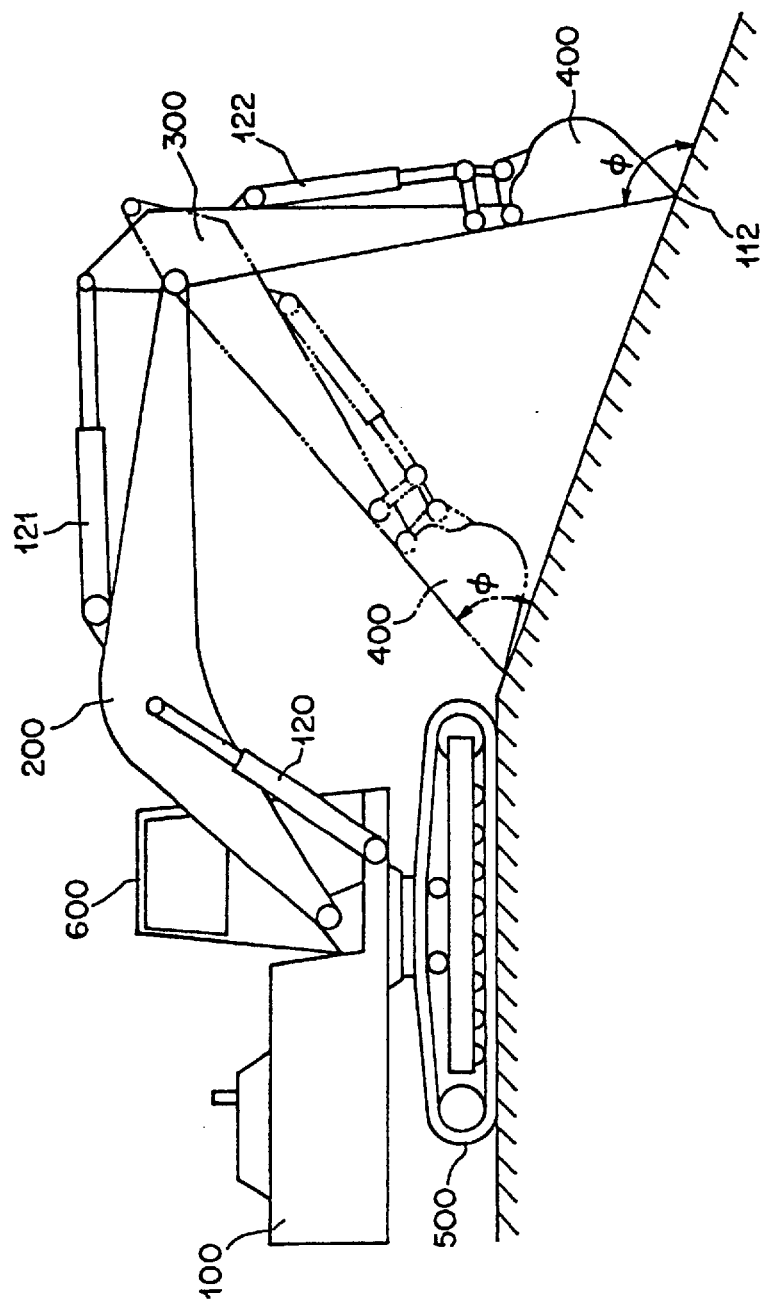
FIG. 17 is a side elevational view schematically showing the hydraulic excavator according to the first embodiment for explaining operation of the hydraulic excavator.

The slope face excavation mode is a mode in which a tip 112 of the bucket 400 moves linearly as shown in FIG. 17. However, in this instance, the bucket hydraulic cylinder 122 does not move. Further, the bucket angle ø varies as the bucket 400 moves.

Figure 18:
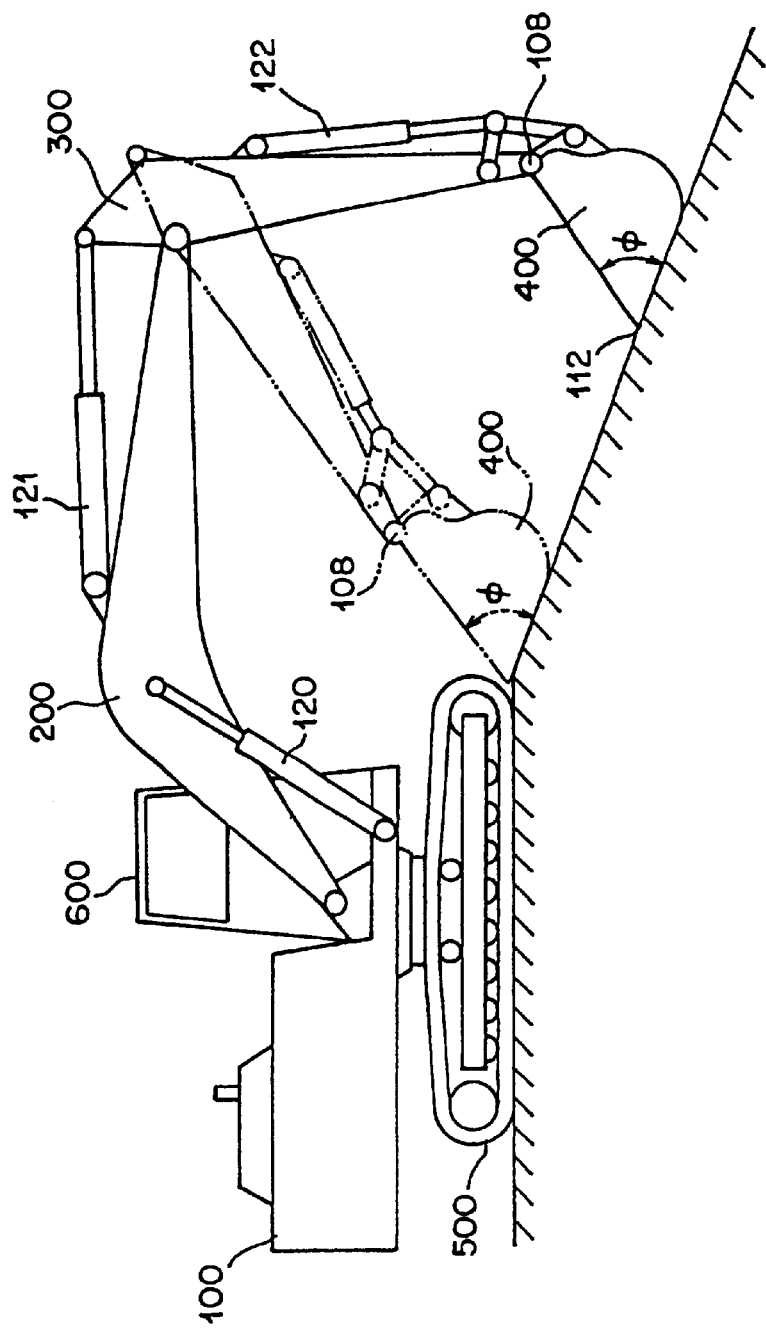
FIG. 18 is a side elevational view schematically showing the hydraulic excavator according to the first embodiment for explaining operation of the hydraulic excavator.

The slope face excavation mode+bucket angle control mode (smoothing mode) is a mode in which the tip 112 of the bucket 400 moves linearly and also the bucket angle ø is kept constant during excavation as shown in FIG. 18.

Figure 19:
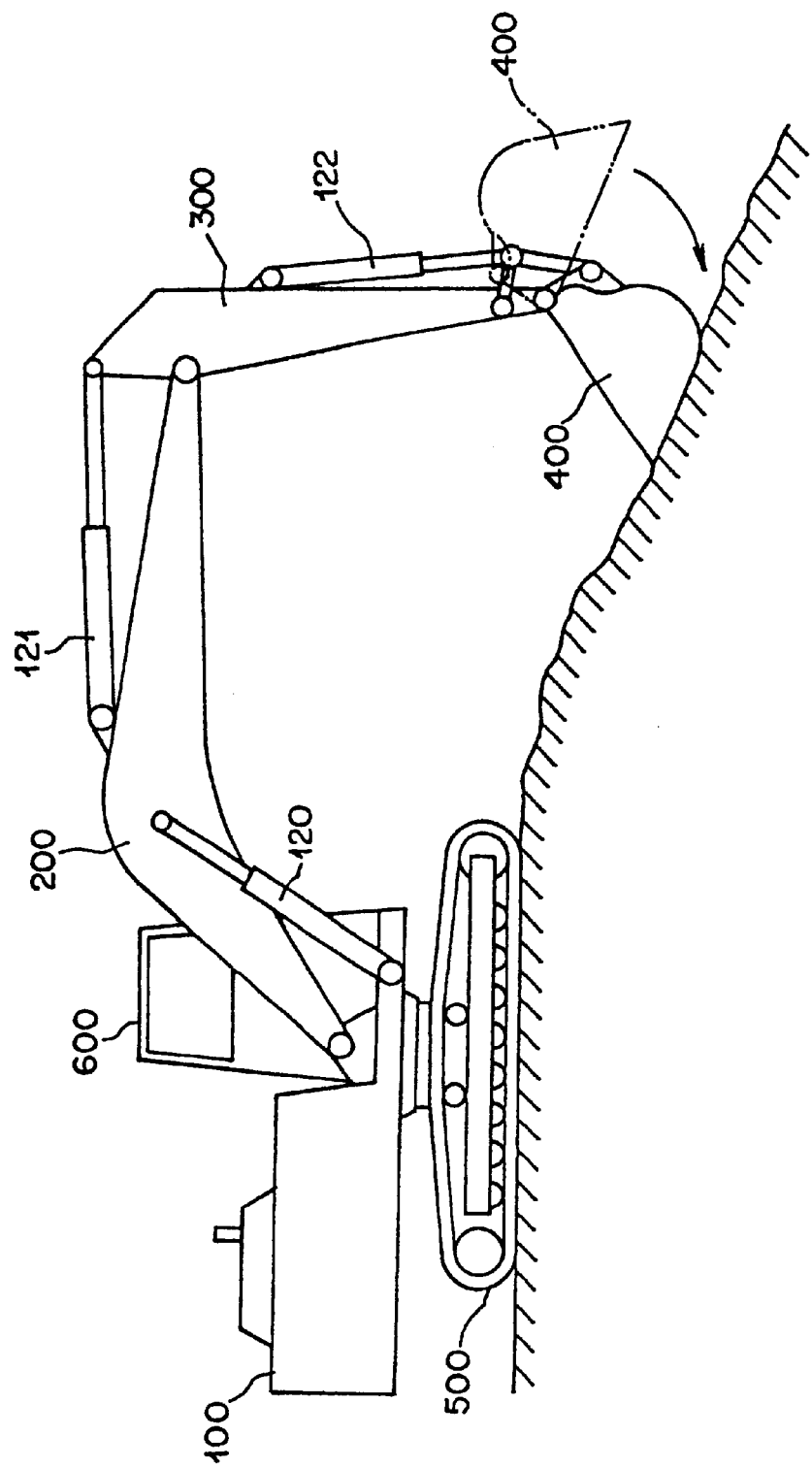
FIG. 19 is a side elevational view schematically showing the hydraulic excavator according to the first embodiment for explaining operation of the hydraulic excavator.

The bucket automatic return mode is a mode in which the bucket angle is automatically returned to an angle set in advance as shown in FIG. 19, and the return bucket angle is set by radio communication from the remote control apparatus 6A side through the monitor panel 10 in the remote control apparatus 6A. This mode is started, for example, when a bucket automatic return start switch 7A on the control operation lever set 69A (boom/bucket lever 6) is switched ON. This mode is cancelled at a point of time when the bucket 400 returns to the angle set in advance.

The slope face excavation mode and the smoothing mode are started by radio communication when, in the remote control apparatus 6A, a semiautomatic control switch is switched ON through the monitor panel 10 and a slope face excavation switch 9 on a stick operation lever 8 is switched ON and besides both or either one of the stick operation lever 8 and the boom/bucket operation lever 6 is moved. It is to be noted that the target slope face angle is set by a switch operation on the monitor panel 10 in the remote control apparatus 6A.

Further, in the slope face excavation mode and the smoothing mode, a bucket tip moving velocity in a parallel direction to the target slope face angle is provided by the operation amount of the stick operation lever 8, and a bucket tip moving velocity in the perpendicular direction to the target slope face angle is provided by the operation amount of the boom/bucket operation lever 6. Accordingly, if the stick operation lever 8 is operated, then the bucket tip 112 starts its linear movement along the target slope face angle, and fine adjustment of the target slope face height by a manual operation can be performed by moving the boom/bucket operation lever 6 during excavation.

Furthermore, in the slope face excavation mode and the smoothing mode, not only the bucket angle during excavation can be adjusted finely by operating the boom/bucket operation lever 6, but also the target slope face height can be changed.

It is to be noted that, in the present system, also a manual mode by remote radio control is possible, and in this manual mode, not only operation equivalent to that of the hydraulic excavator 1 by conventional remote radio control is possible, but also coordinates of the bucket tip 112 can be received as a kind of such vehicle monitor information as described above from the construction machine 1 to 3 and displayed on the monitor panel 10 provided in the remote control apparatus 6A.

The automatic excavation loading mode is a mode for causing a series of operations of ① excavation by the bucket 400, ② a revolving movement of the upper revolving unit 100 while the bucket 400 is lifted in a condition wherein sediment is accommodated in the bucket 400 (lifting revolution), ③ discharging of the sediment accommodated in the bucket 400 (sediment discharge) and ④ returning of the bucket 400 to the excavation position (return) to be automatically performed repetitively, and is started when an "automatic excavation loading start switch" is switched ON through the monitor panel 10 in the remote control apparatus 6A. If the automatic excavation loading start switch is switched ON in this manner, then the hydraulic excavator 1 repetitively performs the series of operations described above until the automatic excavation loading start switch is switched OFF next.

It is to be noted that the excavation position and the sediment discharging position by the bucket 400 can be set and stored by a manual (teaching) operation of an operator (to operate the control operation lever set 69A). Further, also a lifting revolution route and a return route can be stored by a teaching operation. The teaching operation in this instance is performed by setting and storing a lifting revolution starting position, a sediment discharging position and a return end position by a manual operation of an operator. In a teaching operation, also an arbitrary position on the lifting revolution route (or return route) can be set and stored suitably, and, for example, it is possible also to set and store such a route that, for example, upon revolving movement, the bucket 400 moves bypassing an obstacle such as a track vessel.

After a teaching operation is performed in this manner, a route and a velocity along and at which the bucket 400 moves smoothly are automatically determined by the controller 30B, and even if the operator does not particularly perform a controlling operation on the remote control apparatus 6A side, the hydraulic excavator 1 automatically performs the excavation loading work described above repetitively. It is to be noted that the controller 30B automatically controls the excavation operation of the bucket 400 by fuzzy control so that earth and sand may always be loaded fully into the bucket 400, and such a teaching operation as described above is not required for the excavation operation.

Further, in the system of the present embodiment, also a service mode for performing service maintenance of the entire semiautomatic system is prepared, and this service mode is performed by connecting an external terminal 2' to the controller 30B. And, by this service mode, adjustment of control gains, initialization of various sensors and so forth are performed.

By the way, as the various sensors connected to the controller 30B, as shown in FIG. 11, pressure switches 16, pressure sensors 19, 28A and 28B, resolvers (angle sensors, angle detection means) 20 to 22, a vehicle inclination angle sensor 24 and so forth are provided. Further, to the controller 30B, an engine pump controller 27, an ON/OFF switch (bucket automatic return start switch described hereinabove) 7A, another ON/OFF switch (slope face excavation switch described above) 9, the monitor panel (display switch panel) 10 with a target slope face angle setting unit are connected. It is to be noted that the external terminal 2 is connected to the controller 30B upon adjustment of the control gains, initialization of the sensors and so forth.

The engine pump controller 27 receives engine speed information from an engine rotational speed sensor 23 and controls the engine E and the tilt angles of the pumps 51 and 52 of the variable discharge type (variable delivery pressure type, variable capacity type), and can communicate coordination information with the controller 30B.

The pressure sensors 19 are attached to pilot pipes connected from the operation levers 6 and 8 for extension and contraction of the stick 300 and for upward and downward movement of the boom 200 to the main control valves 13, 14 and 15 and detect pilot hydraulic pressures in the pilot pipes. Since the pilot hydraulic pressures in such pilot lines are varied by the operation amounts of the operation levers 6 and 8, by measuring the hydraulic pressures, the controller 1 can estimate the operation amounts of the operation levers 6 and 8 based on the measured hydraulic pressures.

The pressure sensors 28A and 28B detect extension/contraction conditions of the boom cylinder 120 and the stick cylinder 121.

It is to be noted that, upon semiautomatic control described above, the stick operation lever 8 is used to determine the bucket tip moving velocity in a parallel direction to a set excavation inclined face, and the boom/bucket operation lever 6 is used to determine the bucket tip moving velocity in a perpendicular direction to the set inclined face. Accordingly, when the stick operation lever 8 and the boom/bucket operation lever 6 are operated at the same time, the moving direction and the moving velocity of the bucket tip are determined by a composite vector in the parallel and perpendicular directions to the set inclined face.

The pressure switches 16 are attached to the pilot pipes for the operation levers 6 and 8 for the boom 200, stick 300 and bucket 400 with selector valves 17 or the like interposed therebetween and are used to detect whether or not the operation levers 6 and 8 are neutral. In particular, when the operation lever 6 or 8 is in the neutral condition, the output of the pressure switch 16 is OFF, but when the operation lever 6 or 8 is used, the output of the pressure switch 16 changes to ON. It is to be noted that the neutral detecting pressure switches 16 are utilized also for detection of an abnormal condition of the pressure sensors 19 and for switching between the manual/semiautomatic modes.

The resolver 20 is provided at a pivotally mounted portion (joint part) of the boom 200 on the upper revolving unit 100 at which the posture of the boom 200 can be monitored and functions as posture detection means for detecting the posture of the boom 200. The resolver 21 is provided at a pivotally mounted portion (joint part) of the stick 300 on the boom 200 at which the posture of the stick 300 can be monitored and functions as posture detection means for detecting the posture of the stick 300. Further, the resolver 22 is provided at a linkage pivotally mounted portion at which the posture of the bucket 400 can be monitored and functions as posture detection means for detecting the posture of the bucket 400. By those resolvers 20 to 22, angle detection means for detecting the posture of the arm mechanism in angle information is composed.

The signal converter (conversion means) 26 converts angle information obtained by the resolver 20 into extension/contraction displacement information of the boom cylinder 120, converts angle information obtained by the resolver 21 into extension/contraction displacement information of the stick cylinder 121, and converts angle information obtained by the resolver 22 into extension/contraction displacement information of the bucket cylinder 122, that is, converts angle information obtained by the resolvers 20 to 22 into corresponding extension/contraction displacement information of the cylinders 120 to 122.

To this end, the signal converter 26 includes an input interface 26A for receiving signals from the resolvers 20 to 22, a memory 26B including a lookup table 26B-1 for storing extension/contraction displacement information of the cylinders 120 to 122 corresponding to angle information obtained by the resolvers 20 to 22, a main arithmetic unit (CPU) 26C which can calculate the extension/contraction displacement information of the cylinders 120 to 122 corresponding to angle information obtained by the resolvers 20 to 22 and communicate the cylinder extension/contraction displacement information with the controller 1, and an output interface 26D for sending out the cylinder extension/contraction displacement information from the CPU 26C.

Extension/contraction displacement information $\lambda$bm, $\lambda$st and $\lambda$bk of the cylinders 120 to 122 corresponding to angle information $\theta$bm, $\theta$st and $\theta$bk obtained by the resolvers 20 to 22 described above can be calculated using the cosine theorem in accordance with the following expressions.

$$\lambda bm = \left(L_{101/102}{}^2 + L_{101/111}{}^2 - 2L_{101/102} \cdot L_{101/111} \cos(\theta bm + Axbm)\right)^{1/2} \quad (1)$$

$$\lambda st = \left(L_{103/104}{}^2 + L_{104/105}{}^2 - 2L_{103/104} \cdot L_{104/105} \cos\theta st\right)^{1/2} \quad (2)$$

$$\lambda bk = \left(L_{106/107}{}^2 + L_{107/109}{}^2 - 2L_{106/107} \cdot L_{107/109} \cos\theta bk\right)^{1/2} \quad (3)$$

Here, in the expressions above, $L_{i/j}$ represents a fixed length, Axbm represents a fixed angle, and the suffix i/j to L has information between the nodes i and j. For example, $L_{101/102}$ represents the distance between the node 101 and the node 102. It is to be noted that the node 101 is determined as the origin of the xy coordinate system (refer to FIG. 15).

Naturally, each time the angle information θbm, θst and θbk is obtained by the resolvers 20 to 22, the expressions above may be calculated by arithmetic means (for example, the CPU 26C). In this instance, the CPU 26C forms the arithmetic means which calculates, based on the angle information obtained by the resolvers 20 to 22, extension/contraction displacement information of the cylinders 120 to 122 corresponding to the angle information by calculation.

It is to be noted that signals obtained by the conversion by the signal converter 26 are utilized not only for feedback control upon semiautomatic control but also to measure coordinates for measurement/indication of the position of the tip 112 of the bucket 400.

The position of the bucket tip in a semiautomatic system is calculated using a certain one point of the upper revolving unit 100 of the hydraulic excavator as the origin. However, when the upper revolving unit 100 is inclined in the front linkage direction, it is necessary to rotate the coordinate system on control calculation by an angle by which the vehicle is inclined. The vehicle inclination angle sensor 24 is used in order to correct the coordinate system for the angle of rotation.

The solenoid proportional valves 3A to 3C control, in response to electric signals from the controller 30B, the hydraulic pressures supplied from the pilot pump 50, and the controlled hydraulic pressures are passed through the directional control valves 4A to 4C or selector valves 18A to 18C so as to act upon the main control valves 13, 14 and 15 to control the spool positions of the main control valves 13, 14 and 15 so that target cylinder velocities may be obtained. However, if the directional control valves 4A to 4C are changed over to the manual mode side, then the cylinders 120 to 211 can be controlled manually.

It is to be noted that a stick confluence control proportional valve 11 adjusts the confluence ratio of the two pumps 51 and 52 in order to obtain an oil amount corresponding to a target cylinder velocity.

Further, the ON/OFF switch (slope face excavation switch) 9 described hereinabove is mounted on the stick operation lever 8 of the remote control apparatus 6A, and as the operator operates this switch 9, information of the operation is received by the 50 GHz simple radio unit 31 of the hydraulic excavator 1 through the repeater car 7 and selection or no selection of a semiautomatic control mode is performed. Then, if a semiautomatic control mode is selected, then the tip 112 of the bucket 400 can be moved linearly.

Furthermore, the ON/OFF switch (bucket automatic return start switch) 7A described above is mounted on the boom/bucket operation lever 6 of the remote control apparatus 6A, and as the operator switches the switch 7A ON, the bucket 400 can be automatically returned to an angle set in advance.

Safety valves 5A are provided to switch the pilot pressures to be supplied to the solenoid proportional valves 3A to 3C, and only when the safety valves 5 are in an ON state, the pilot pressures are supplied to the solenoid proportional valves 3A to 3C. Accordingly, when some failure occurs in semiautomatic control or in a like case, automatic control of the linkage can be stopped rapidly by switching the safety valves 5 to an OFF state.

Meanwhile, the rotational speed of the engine E is varied by operating the position [set by operating a throttle dial (not shown)] of the engine throttle set by the operator, and further, even if the position of the engine throttle is fixed, the engine rotational speed varies depending upon the load.

Since the pumps 50, 51 and 52 are directly coupled to the engine E, if the engine rotational speed varies, then also the pump discharges (pump delivery pressures) vary, and consequently, even if the spool positions of the main control valves 13, 14 and 15 are fixed, the cylinder velocities are varied by the variation of the engine rotational speed. Thus, in order to correct this, the engine rotational speed sensor 23 is attached. When the engine rotational speed is low, the target moving velocity of the tip 112 of the bucket 400 is set slow.

The monitor panel 10 in the remote control apparatus 6A is not only used as a setting unit for the target slope face angle α (refer to FIGS. 15 and 20) and the bucket return angle, but also used as an indicator for coordinates of the bucket tip 400, the slope face angle measured or the measured distance between coordinates of two points sent thereto as a kind of vehicle monitor information from the construction machine 1 to 3.

In particular, in the system according to the present embodiment, the pressure sensors 19 and the pressure switches 16 are incorporated in conventional pilot hydraulic lines to detect operation amounts of the operation levers 6 and 8 and feedback control is effected using the resolvers 20, 21 and 22, and such control makes it possible to effect multiple freedom degree feedback control independently for each of the cylinders 120, 121 and 122. Consequently, the requirement for addition of an oil unit such as a pressure compensation valve is eliminated.

Further, an influence of inclination of the upper revolving unit 100 is corrected using the vehicle inclination angle sensor 24, and the solenoid proportional valves 3A to 3C are utilized to drive the cylinder 120, 121 and 122 with electric signals from the controller 1. It is to be noted that the operator can select a mode arbitrarily using the manual/semiautomatic mode change-over switch 9 and besides can set a target slope face angle.

In the following, a control algorithm of the semiautomatic system performed by the controller 30B is described. The semiautomatic control mode (except the bucket automatic return mode) effected by the controller 30B is generally such as illustrated in FIG. 13.

In particular, the moving velocity and the moving direction of the tip 122 of the bucket 400 are first calculated based on information of the target slope face set angle, the pilot hydraulic pressures for controlling the stick cylinder 121 and the boom cylinder 120, the vehicle inclination angle and the engine rotational speed. Then, target velocities of the cylinders 120, 121 and 122 are calculated based on the obtained information (the moving velocity and the moving direction of the tip 122 of the bucket 400). In this instance, the information of the engine rotational speed is required to determine an upper limit to the cylinder velocities.

Figure 12:
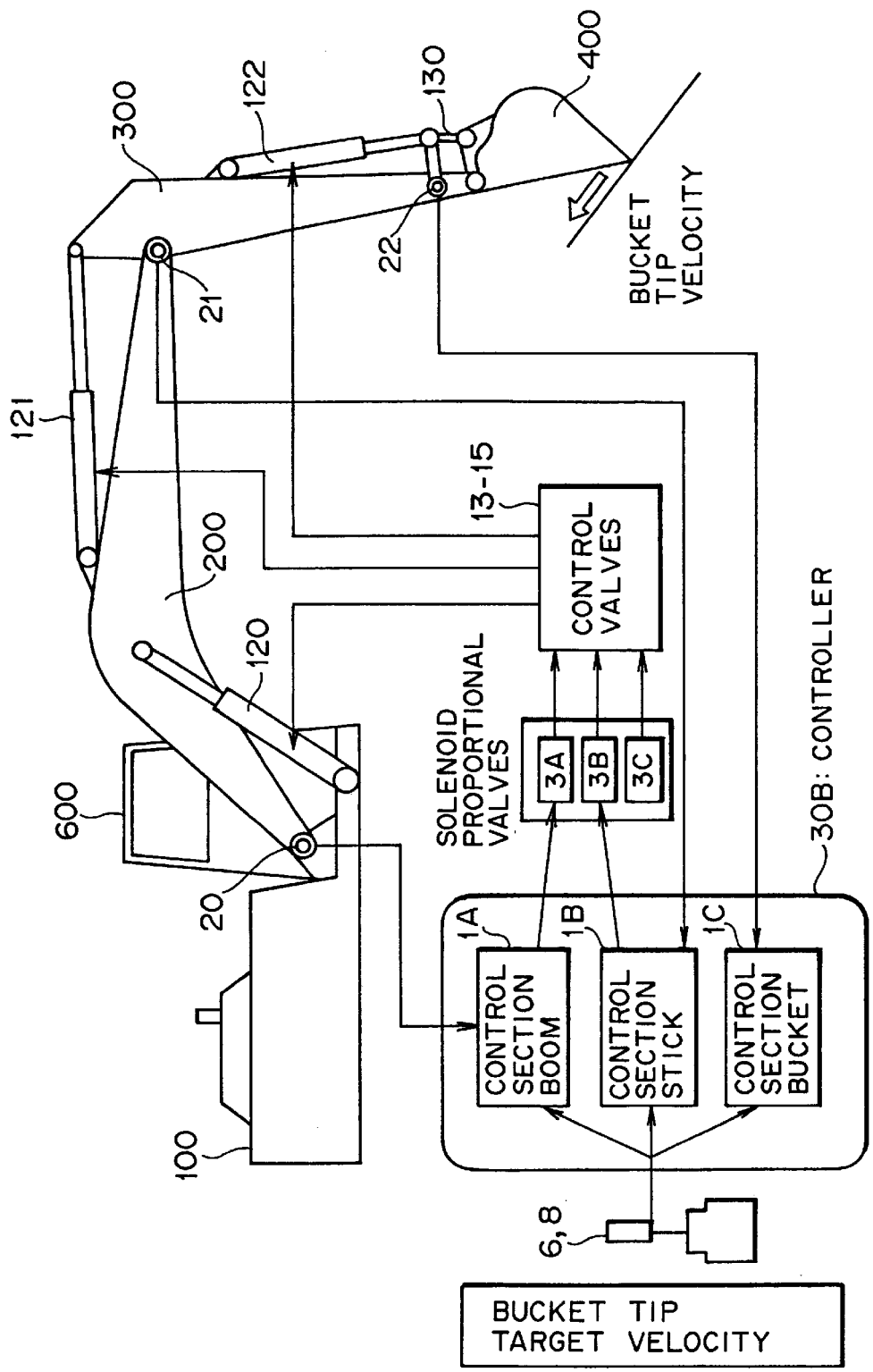
FIG 12 is a block diagram roughly showing the construction of the entire control apparatus according to the first embodiment.
Figure 13:
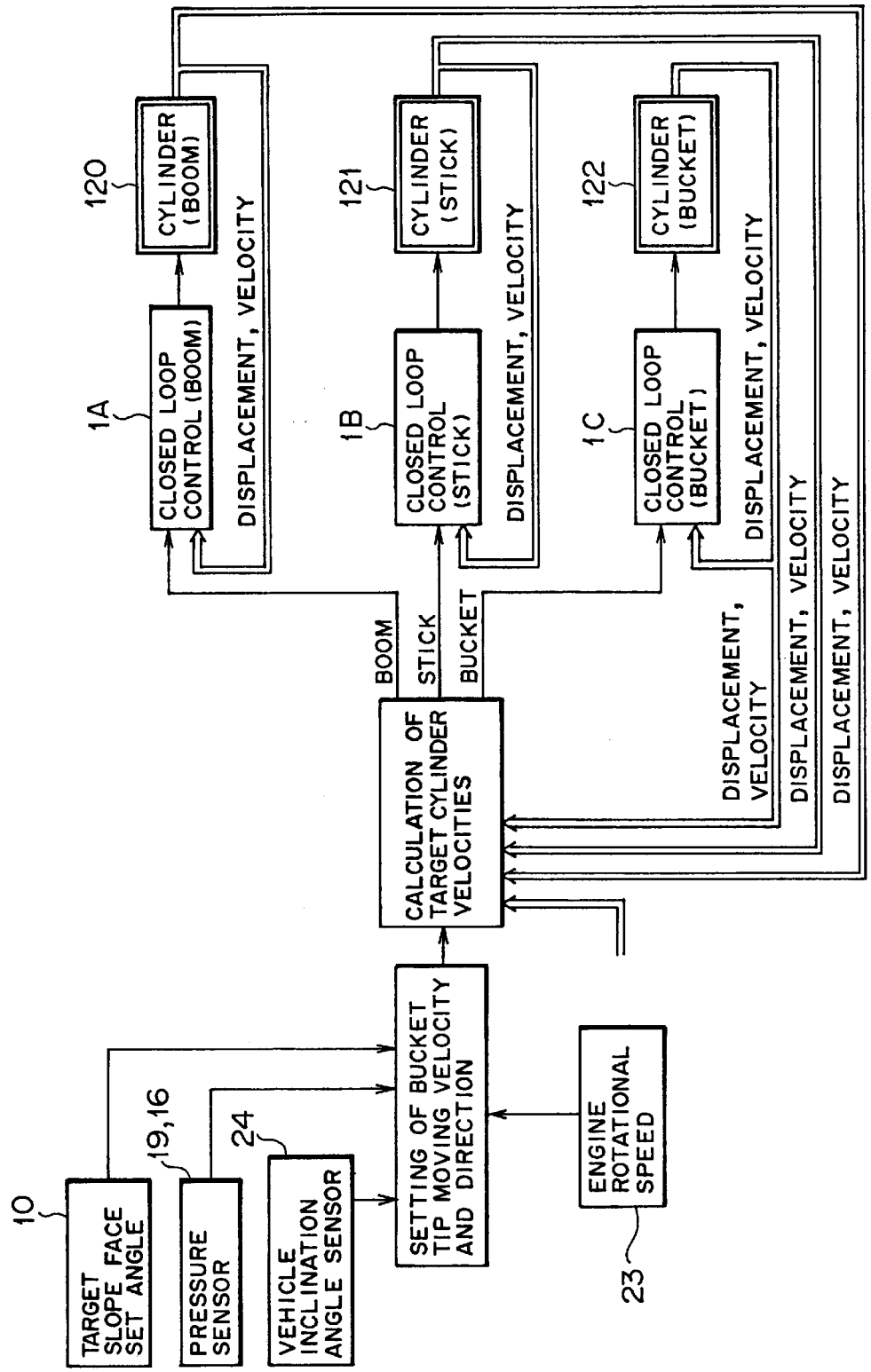
FIG. 13 is a block diagram showing a functional construction of the entire control apparatus according to the first embodiment.

Further, the controller 30B includes, as shown in FIGS. 12 and 13, control sections 1A, 1B and 1C provided independently of one another for the cylinders 120, 121 and 122, and the controls are constructed as independent control feedback loops as shown in FIG. 13 so that they may not interfere with each other.

Figure 14:
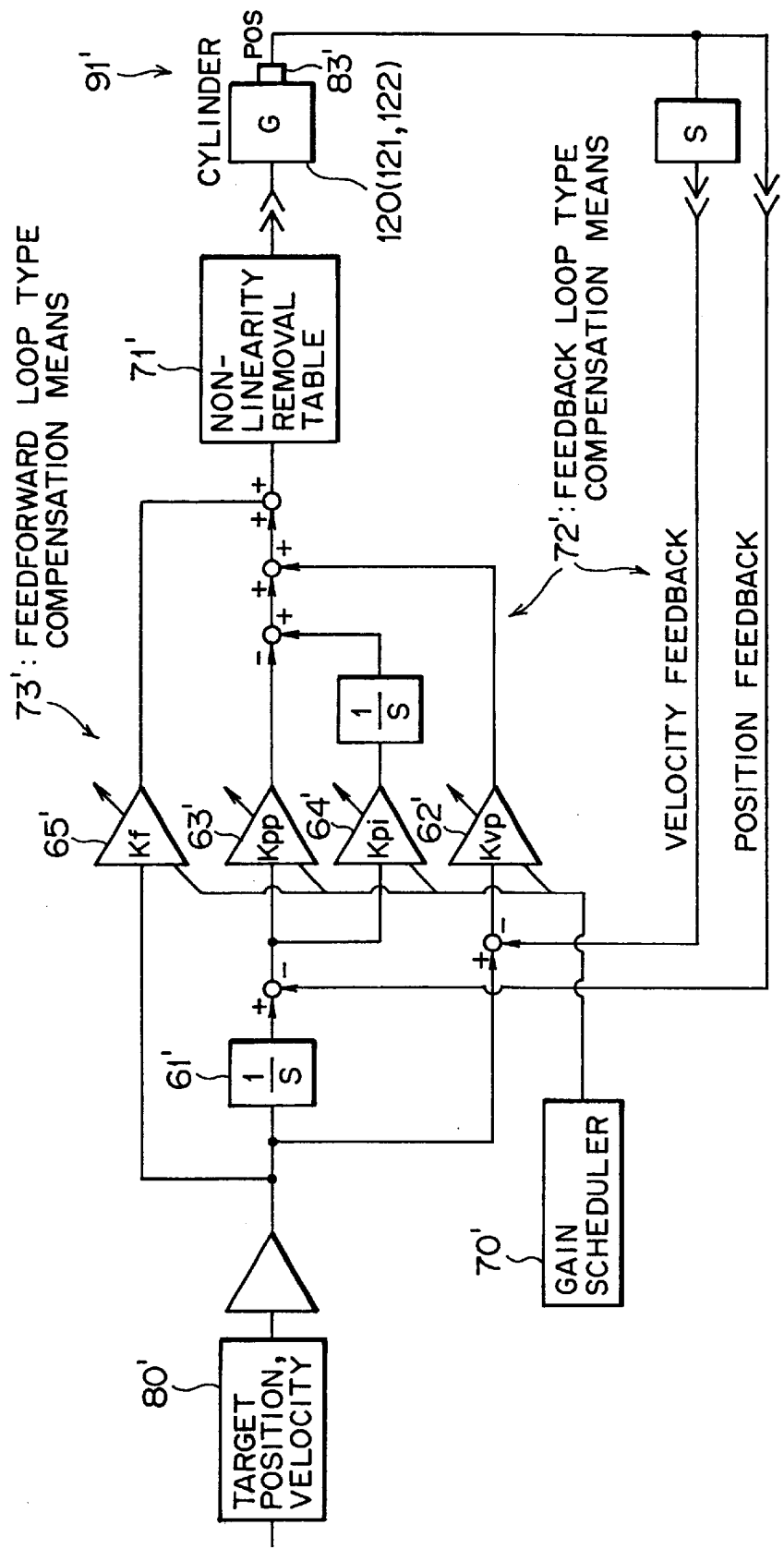
FIG. 14 is a control block diagram showing a construction of essential part of the control apparatus according to the first embodiment.

Here, the compensation construction in the closed loop controls shown in FIG. 13 has, in each of the control sections 1A, 1B and 1C, a multiple freedom degree construction including a feedback loop and a feedforward loop with regard to the displacement and the velocity as shown in FIG. 14 and includes feedback loop type compensation means 72' having a variable control gain (control parameter), and feedforward loop type compensation means 73' having a variable control gain (control parameter).

In particular, if a target velocity is given, then the feedback loop type compensation means 72' performs feedback loop processes according to a route wherein a deviation between the target velocity and velocity feedback information is multiplied by a predetermined gain Kvp (refer to reference symbol 62'), another route wherein the target velocity is integrated once (refer to an integration element 61' of FIG. 14) and a deviation between the target velocity integration information and displacement feedback information is multiplied by a predetermined gain Kpp (refer to reference symbol 63') and a further route wherein the deviation between the target velocity integration information and the displacement feedback information is multiplied by a predetermined gain Kpi (refer to reference symbol 64') and further integrated (refer to reference symbol 66') are performed while the feedforward loop type compensation means 73' performs a feedforward loop process according to a route wherein the target velocity is multiplied by a predetermined gain Kf (refer to reference symbol 65') is performed.

Of the processes mentioned, the feedback loop processes are described in more detail. The present apparatus includes, as shown in FIG. 14, operation information detection means 91' for detecting operation information of the cylinders 120 to 122, and the controller 30B receives the detection information from the operation information detection means 91' and target operation information (for example, target moving velocities set by the target value setting means 80' as input information and sets and outputs control signals so that the arm members such as the boom 200 and the bucket (working member) 400 may exhibit target operation conditions.

It is to be noted that the target value setting means 80' mentioned above receives a construction machine control signal (control target value information) transmitted thereto from the remote control apparatus 6A through the repeater car 7 and sets target operation information in response to the received control target value information. In short, the target value setting means 80' has a function as a reception section for receiving control target value information transmitted thereto from the remote control apparatus 6A through the repeater car 7 together with the 50 GHz simple radio unit 31.

Further, the operation information detection means 91' described above particularly is cylinder position detection means 83' which can detect positions of the cylinders 120 to 122, and in the present embodiment, the cylinder position detection means 83' is composed of the resolvers 20 to 22 and the signal converter 26 described hereinabove.

It is to be noted that the values of the gains Kvp, Kpp, Kpi and Kf mentioned above can individually be varied by a gain scheduler 70', and particularly, the gain scheduler 70' performs automatic gain adjustment on the real time basis based on various information such as, for example, the operating oil temperature, the bucket tip position and the load pressure so that the gains Kvp, Kpp, Kpi and Kf may individually have optimum values.

Further, while a non-linearity removal table 71' is provided to remove non-linear properties of the solenoid proportional valves 3A to 3C, the main control valves 13 to 15 and so forth, a process in which the non-linearity removal table 71' is used is performed at a high speed by a computer using a table lookup technique.

Figure 20:
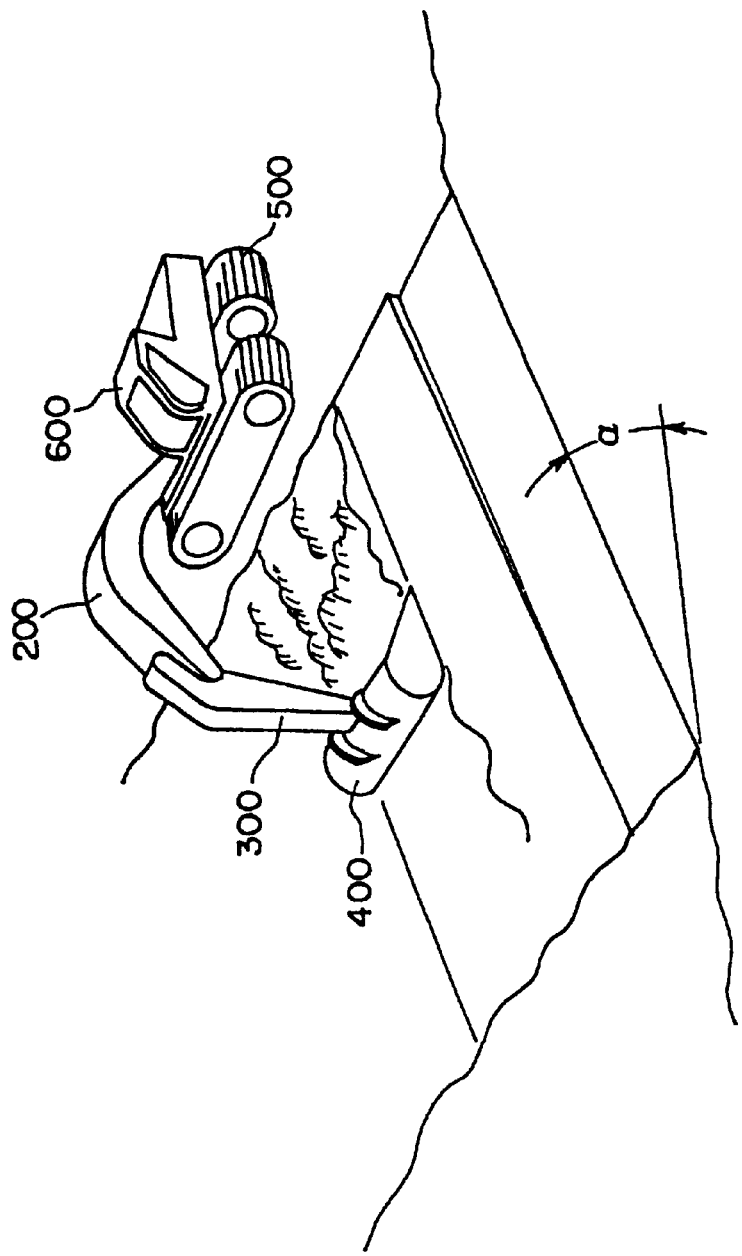
FIG. 20 is a perspective view schematically showing the hydraulic excavator according to the first embodiment for explaining operation of the hydraulic excavator.

By such a construction as described above, where the hydraulic excavator 1 is remotely radio controlled from the remote control apparatus 6A to perform a slope face excavation operation of a target slope face angle $\alpha$ as shown in FIG. 20 semi-automatically, in the system of the present embodiment, when compared with a conventional manually controlled system, such semiautomatic controlling functions as described above can be realized by the electronic hydraulic system which automatically adjusts the composite movement amount of the boom 200 and the stick 300 in accordance with the excavation speed.

In particular, a construction machine control signal including control target value information transmitted from the remote control apparatus 6A and detection signals (including setting information of a target slope face angle) from the various sensors are inputted to the controller 30B mounted on the hydraulic excavator. 1, and the controller 30B controls the main control valves 13, 14 and 15 through the solenoid proportional valves 3A, 3B and 3C based on the control target value information and the detection signals from the sensors (including also detection signals of the resolvers 20 to 22 received through the signal converter 26) to effect such control that the boom 200, stick 300 and bucket 400 may exhibit desired extension/contraction displacements to execute such semiautomatic control in remote radio control as described above.

Then, upon the semiautomatic control, the moving velocity and the moving direction of the tip 112 of the bucket 400 are calculated from information of the target slope face set angle given from the remote control apparatus 6A, and pilot hydraulic pressures which control the stick cylinder 121 and the boom cylinder 120, a vehicle inclination angle and an engine rotational speed which are all detected with the hydraulic excavator and target velocities of the cylinders 120, 121 and 122 are calculated based on the calculated information (moving velocity and moving direction of the tooth 112 of the bucket 400). In this instance, from the information of the engine rotational speed, an upper limit to the cylinder velocities is determined. Further, the controls are formed as feedback loops independent of one another for the cylinder 120, 121 and 122 and do not interference with one another.

It is to be noted that the setting of the target slope face angle in the semiautomatic system can be performed by a method which is based on inputting of a numerical value by switches on the monitor panel 10 in the remote control apparatus 6A, a two point coordinate inputting method, or an inputting method by a bucket angle, and similarly, for the setting of the bucket return angle in the semiautomatic system, a method which is based on inputting of a numerical value by the switches on the monitor panel 10 or a method which is based on bucket movement is performed. For all of them, known techniques are used.

Further, the semiautomatic control modes described above and the controlling methods therein are performed in the following manner based on cylinder extension/contraction displacement information obtained by conversion by the signal converter 26 of the angle information detected by the resolvers 20 to 22.

First, in the bucket angle control mode, the length of the bucket cylinder 122 is controlled so that the angle (bucket angle) ø defined between the bucket 400 and the x axis may be fixed at each arbitrary position. In this instance, the bucket cylinder length λbk can be calculated if the boom cylinder length λbm, the stick cylinder length λst and the angle ø are determined.

In the smoothing mode, since the bucket angle ø is kept fixed, the bucket tip position 112 and a node 108 move in parallel. First, a case wherein the node 108 moves in parallel to the x axis (horizontal excavation) is described below. In particular, in this instance, the coordinates of the node 108 in the linkage posture when excavation is started are represented by $(x_{108}, y_{108})$, and the cylinder lengths of the boom cylinder 120 and the stick cylinder 121 in the linkage posture in this instance are calculated and the velocities of the boom 200 and the stick 300 are calculated so that $x_{108}$ mentioned above may move horizontally. It is to be noted that the moving velocity of the node 108 depends upon the operation amount of the stick operation lever 8 in the remote control apparatus 6A.

On the other hand, where parallel movement of the node 108 is considered, the coordinates of the node 108 after the very short time $\Delta t$ are represented by $(x_{108}+\Delta x, y_{108})$. $\Delta x$ is a very small displacement which depends upon the moving velocity. Accordingly, by taking $\Delta x$ mentioned above into consideration of $x_{108}$, target lengths of the boom and the stick cylinders after $\Delta t$ can be calculated.

Further, in the slope face excavation mode, control may be performed in a similar manner as in the smoothing mode. However, the point which moves is changed from the node 108 to the bucket tip position 112, and further, the control takes it into consideration that the bucket cylinder length is fixed.

Figure 15:
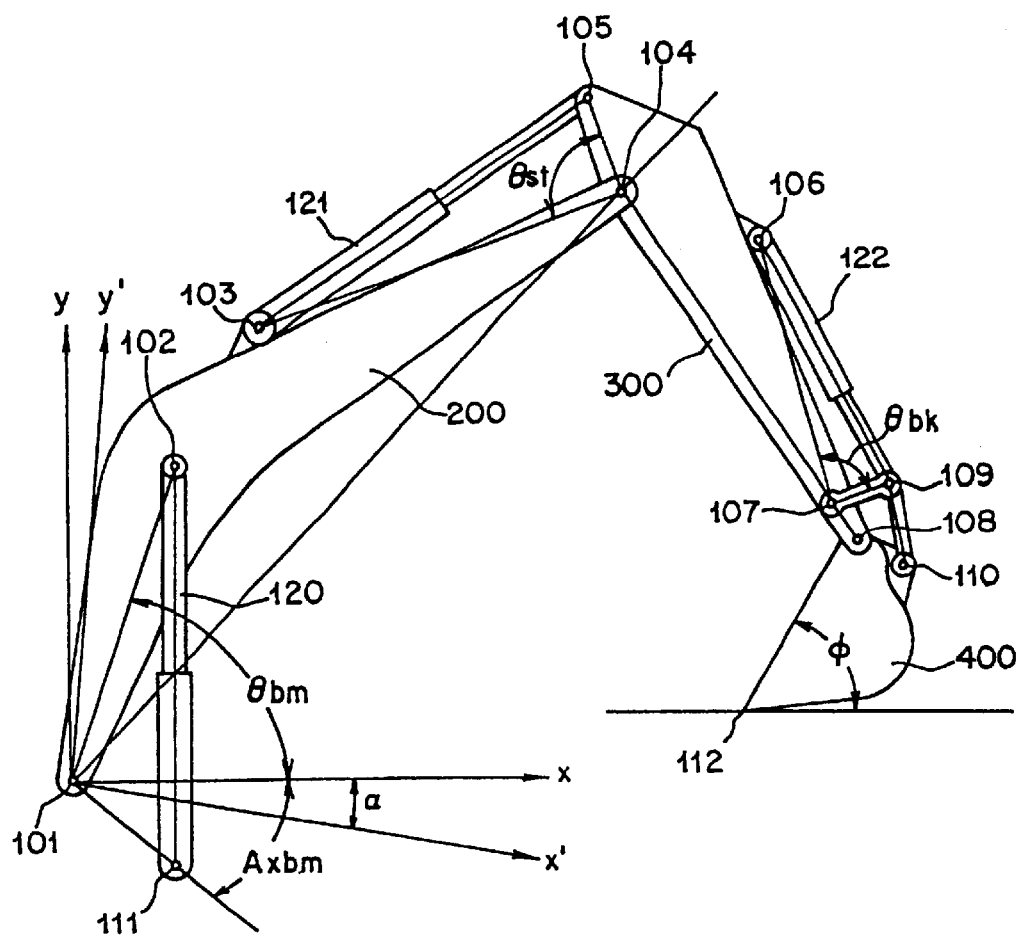
FIG. 15 is a side elevational view showing operating parts (a joint type arm mechanism and a bucket) of the hydraulic excavator according to the first embodiment.

Further, as regards correction of a finish inclination angle by the vehicle inclination angle sensor 24, calculation of the front linkage position is performed on the xy coordinate system whose origin is a node 101 of FIG. 15. Accordingly, if the vehicle body is inclined with respect to the xy plane, then the xy coordinates are rotated and the target inclination angle with respect to the ground surface is varied. In order to correct this, the inclination angle sensor 24 is mounted on the vehicle, and when it is detected by the inclination angle sensor 24 that the vehicle body is inclined by β with respect to the xy plane, the target inclination angle should be corrected by replacing it with a value obtained by adding β to it.

While the various control modes and the controlling methods in the control modes are described above, they all employ a technique wherein they are performed based on cylinder extension/contraction displacement information, and control contents according to this technique are publicly known. In particular, in the system according to the present embodiment, since angle information is detected first by the resolvers 20 to 22 and then the angle information is converted into cylinder extension/contraction displacement information by the signal converter 26, the known controlling technique can be used for later processing.

However, in the automatic excavation loading mode, since the controller 30B calculates extension/contraction displacements of the cylinder 120 to 122 and the driving amount of the revolving motor based on an excavation start position, a lifting revolution route, a sediment discharging position and a return route set and stored by a teaching operation described above and controls the extension/contraction displacements of the cylinder 120 to 122 and the revolving motor in response to a result of the calculation to automatically control the boom 200, stick 300, bucket 400 and upper revolving unit 100 suitably so that they may have respective predetermined postures, angle information detected by the resolvers 20 to 22 is not required particularly.

It is to be noted that, while, in the present embodiment, only the hydraulic excavator 1 is described, also each of the bulldozers 2 and the wheel loader 3 can perform semiautomatic control similar to that described hereinabove.

As described above, with the remote radio control system according to the present embodiment, since each of the construction machines 1 to 3 includes the semiautomatic control apparatus 30 (controller 30B), when any of the construction machines 1 to 3 is remotely controlled from the corresponding remote control apparatus 6A, if any of the various semiautomatic control modes is set from the remote control apparatus 6A side, then the construction machine 1 to 3 can be made perform a desired work with a high degree of accuracy and efficiently.

Accordingly, any other person than those who are skilled in actual controlling operations of the construction machines 1 to 3 can perform remote control of the construction machines 1 to 3 very readily. Particularly in such a system that each of the construction machines 1 to 3 is remotely controlled while a two-dimensional image displayed on the display unit 67 is observed as described above, the burden of a driving operation to an operator can be moderated significantly, and consequently, significant improvement in productivity can be achieved.

Further, in the present system, since, in each of the construction machines 1 to 3, angle information signals detected by the resolvers 20 to 22 are converted into cylinder displacement information by the signal converter 26 and inputted to the controller 30B, even if expensive cylinder stroke sensors for detecting extension/contraction displacements of the cylinder 120 to 122 are not used as in the prior art, control which uses cylinder extension/contraction displacements which are used in conventional control systems can be executed. Consequently, a system which can control the position and the posture of the bucket 400 accurately and stably while suppressing the cost low can be provided. However, it is naturally possible to perform similar control to that of the embodiment described above even if such cylinder stroke sensors as described above are used.

Further, in the embodiment described above, since the feedback control loops are independent of one another for the individual cylinder 120 to 122 and the control algorithm provides multiple freedom degree control of displacements, velocities and feedforward, the control system can be simplified, and besides, since a non-linear property of a hydraulic equipment can be converted into a linear property at a high speed by a table lookup technique, this contributes also to improvement of the control accuracy.

Furthermore, since also maintenance such as a gain adjustment can be performed using the external terminal 2', an advantage that adjustment and so forth are easy can be achieved. Further, since the operation amounts of the operation lever 6 and 8 of the remote control apparatus 6A are calculated from a variation of the pilot pressure using the pressure sensors 19 and so forth and besides a conventional open center valve hydraulic system is used as it is, there is another advantage that addition of a pressure compensating valve or the like is not required. Furthermore, it is also possible to display bucket tip coordinates on the real time basis on the monitor panel 10 of the remote control apparatus 6A. Further, by the construction which employs the safety valves 5A, a system abnormal operation when the system is abnormal can be prevented.

(B) Description of the Second Embodiment

Figure 22:
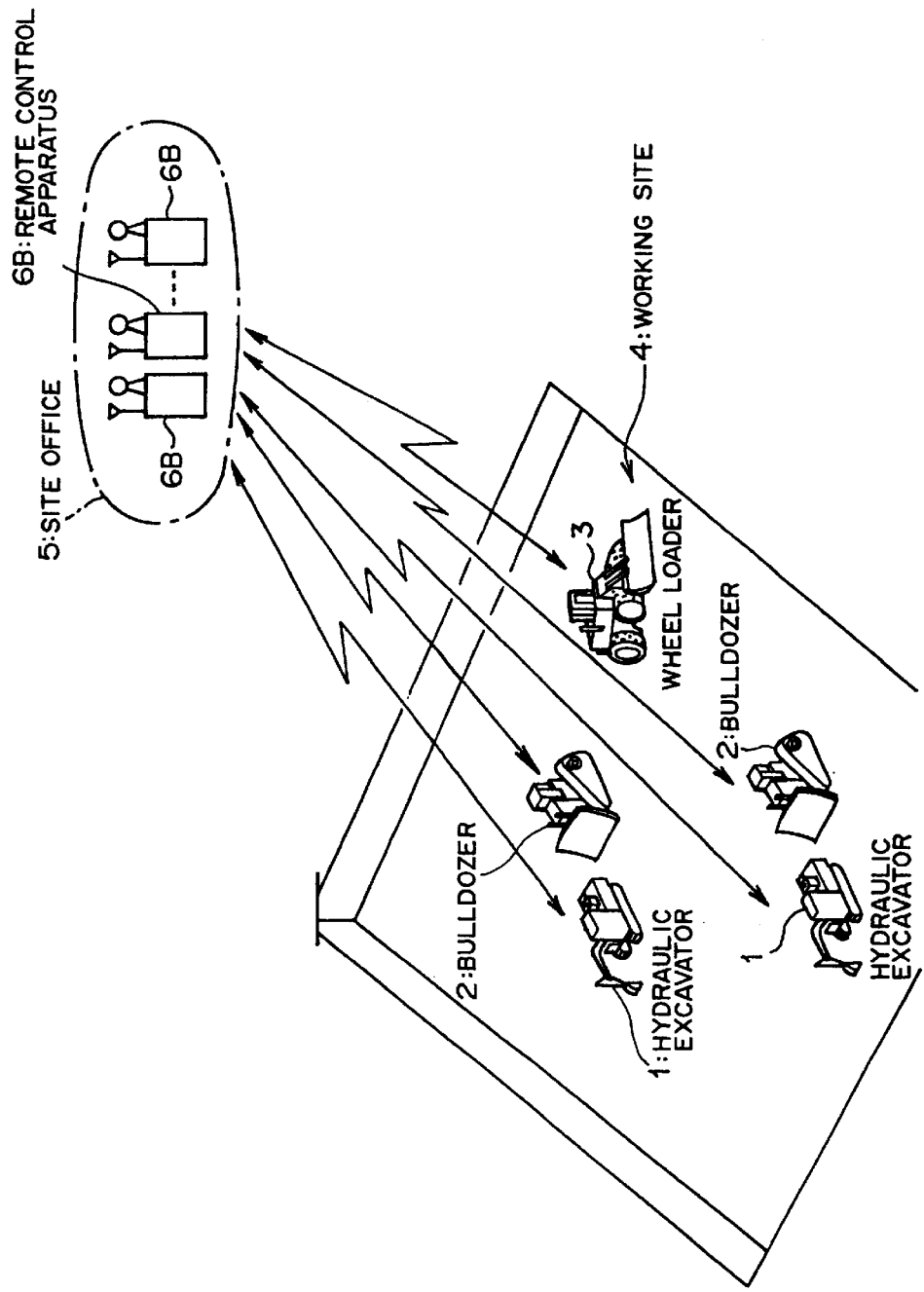
FIG. 22 is a view schematically showing a construction of a remote radio control system as a second embodiment of the present invention.

FIG. 22 is a view schematically showing a construction of a remote radio control system as a second embodiment of the present invention. The system shown in FIG. 22 is constructed such that the repeater car 7 in the first embodiment is not disposed, and each remote control apparatus 6B directly performs communication with one of the construction machines 1 to 3 which is an object of control to remotely control the construction machine 1 to 3.

Figure 23:
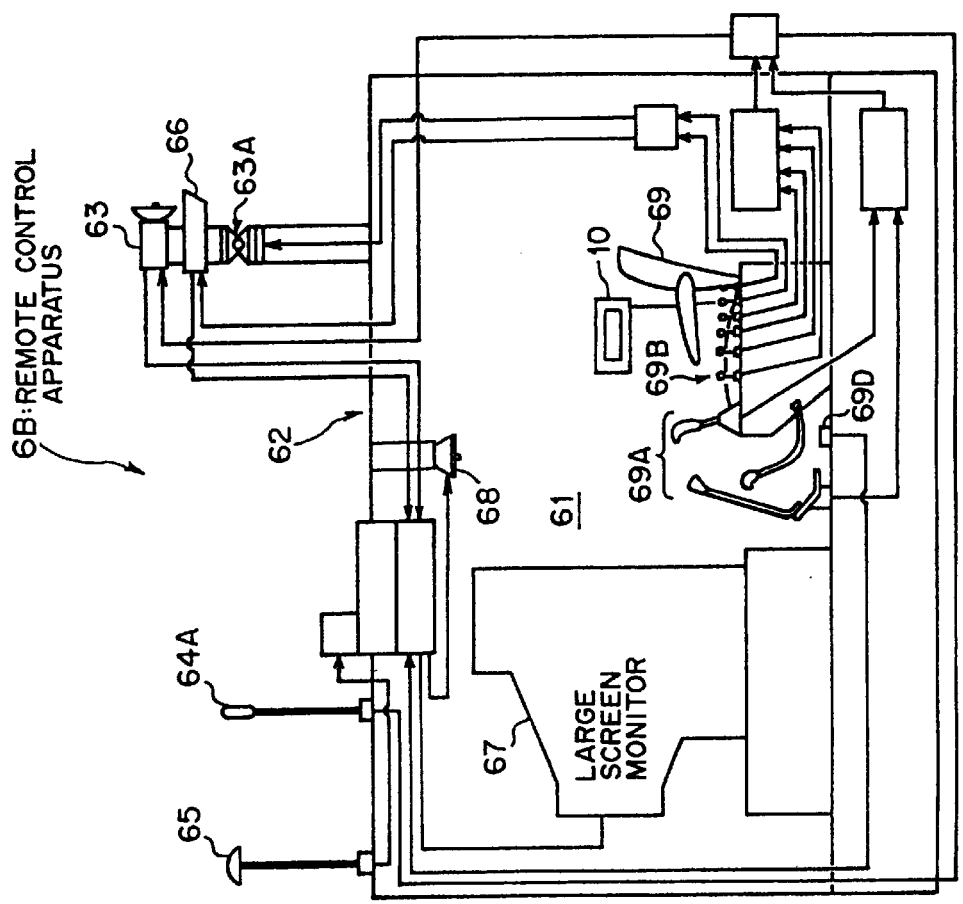
FIG. 23 is a view schematically showing a construction of a remote control apparatus in the second embodiment.
Figure 24:
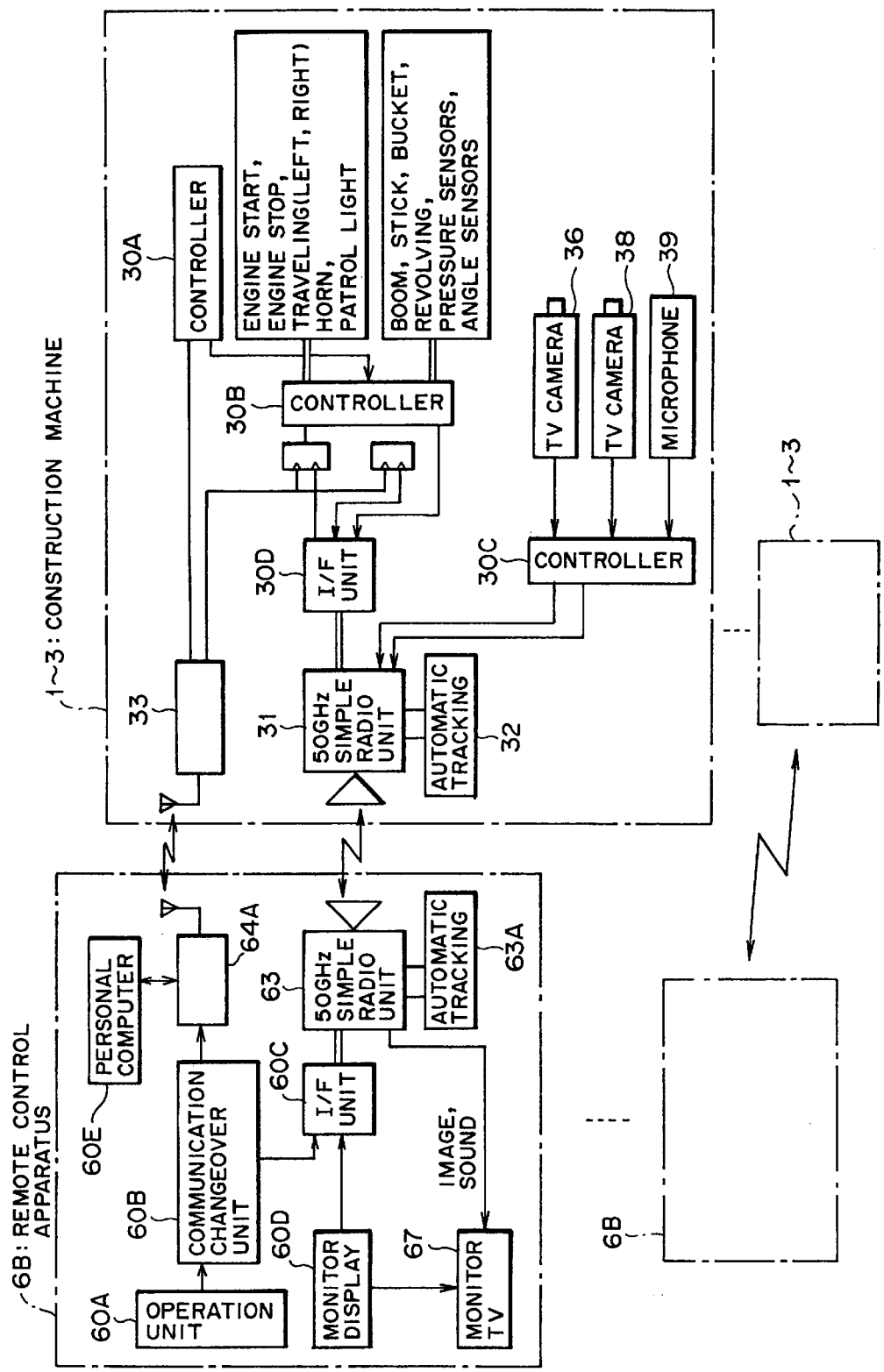
FIG. 24 is a functional block diagram of the remote radio control system composed of construction machines and remote control apparatus in the second embodiment.

To this end, the remote control apparatus 6B according to the present second embodiment directly performs bidirectional communication by a radio wave of the 50 GHz band with the 50 GHz simple radio unit 31 of the construction machine 1 to 3 on which the 50 GHz simple radio unit 63 is mounted. Further, in the present embodiment, a 429 MHz transmission antenna (emergency low radio wave directionality transmission section) 64A for transmitting a construction machine control signal to the construction machine 1 to 3 by a radio wave of the 429 MHz band upon emergency such as when bidirectional communication by the 50 GHz simple radio unit 63 is interrupted is provided as shown in FIGS. 23 and 24. It is to be noted that a construction machine control signal transmitted from the 429 MHz transmission antenna 64A is received by the 429 MHz reception antenna 33 of the construction machine 1 to 3.

Also in the present embodiment, the 50 GHz simple radio unit 63 described above is mounted for revolving movement in the azimuth system/swinging movement in the elevation angle system on the remote control apparatus 6B by the automatic tracking apparatus 63A, and the 50 GHz simple radio unit 31 described above is mounted for revolving movement in the azimuth system/swinging movement in the elevation angle system on the construction machine 1 to 3 by the automatic tracking apparatus 32 and automatically searches a 50 GHz radio wave from the other party of communication so that the signal reception level may be in the maximum. Then, the 50 GHz simple radio units 63 and 31 are adjusted so that the radio wave radiation faces thereof may always oppose each other.

In particular, the remote radio control system according to the present second embodiment includes, between each of the remote control apparatus 6B and a corresponding one of the construction machines 1 to 3, bidirectional communication means (50 GHz antennae 63 and 31) of the 50 GHz band having a high radio wave directionality, automatic tracking means (automatic tracking apparatus 63A and 32), and emergency low radio wave directionality communication means (429 MHz antennae 64A and 33) having a lower radio wave directionality than the radio wave directionality of the 50 GHz antennae 63 and 31 for enabling, when communication by the 50 GHz antennae 63 and 31 described above is disabled, communication of a construction control signal (control signal) from the remote control apparatus 6B to the construction machine 1 to 3.

Also in the present embodiment, five sets of such bidirectional communication means and automatic tracking means as described above are provided corresponding to the five construction machines 1 to 3, and also five such emergency low radio wave directionality communication means as described above are provided corresponding to the five construction machines 1 to 3. Further, also zoom cameras 66 for catching images of the construction machines 1 to 3 when communication by the 50 GHz antennae 63 and 31 is impossible are provided.

It is to be noted that, since the remote control apparatus 6B perform communication directly with the construction machines 1 to 3, the control lever/switch set 69C for the repeater car 7 in the first embodiment is not required. Further, a "429 MHz wave changeover switch" for changing over, upon such emergency as described above, the communication to communication in which the 429 MHz transmission antenna 64A is used is provided in the control lever/switch set 69B in the first embodiment, but the "construction machine/repeater car changeover switch" is not required. Meanwhile, in FIGS. 23 and 24, those elements which are denoted by like reference symbols to those denoted in FIGS. 2, 6 and 9 and are not described particularly are similar to those elements described hereinabove with reference to FIGS. 2, 6 and 9.

In the meantime, also the construction machines 1 to 3 according to the present second embodiment have constructions similar to those of the first embodiment. For convenience, the hydraulic excavator 1 is described. Also the hydraulic excavator 1 of the present second embodiment includes a 50 GHz simple radio unit 31 described above for performing bidirectional communication by a high directionality radio wave of the 50 GHz band with the remote control apparatus 6B, and an automatic tracking apparatus 32 response section described above having a function as a response section for responding to a signal (automatic tracking signal) from the automatic tracking apparatus 63A described above mounted on the remote control apparatus 6B side.

The hydraulic excavator 1 further includes a joint type arm mechanism composed of the boom 200, stick 300 and bucket 400, and cylinders 120 to 122 serving as a cylinder type actuator mechanism which perform extension and contraction operations to drive the arm mechanism. Further, also in the present embodiment, the hydraulic excavator 1 includes angle detection means (resolvers 20 to 22) for detecting the posture of the arm mechanism as angle information, target setting means 80' for receiving a construction machine control signal (control target value information) transmitted thereto from the remote control apparatus 6B, and a semiautomatic control apparatus 30 having a controller 30B for controlling the cylinders 120 to 122 based on control target value information received by the target setting means 80' and angle information detected by the resolvers 20 to 22 so that the cylinders 120 to 122 may exhibit predetermined extension/contraction displacements.

It is to be noted that the semiautomatic control apparatus 30 described above includes, similarly as in the first embodiment, a signal converter 26 for converting angle information obtained by the resolvers 20 to 22 into corresponding extension/contraction displacement information of the cylinder 120 to 122, and the controller 30B controls based on control target value information received by the target setting means 80' and extension/contraction displacement information of the cylinders 120 to 122 obtained by conversion by the signal converter 26 so that the cylinders 120 to 122 may exhibit predetermined extension/contraction displacements.

Also in the system according to the present second embodiment having such a construction as described above, similarly as in the first embodiment, when an operator suitably operates, in the remote control apparatus 6B, the control operation lever set 69A and the control lever/switch set 69B while observing an image from the construction machine 1 to 3 displayed on the display unit 67, information of the operation is transmitted as a construction machine control signal, an antenna control signal, a camera/light control signal or the like to the construction machine 1 to 3 through the 50 GHz simple radio unit 63. The construction machine 1 to 3 performs working and control in accordance with the signal received by the 50 GHz simple radio unit 31.

If communication by a radio wave of the 50 GHz between the remote control apparatus 6B and the construction machine 1 to 3 is interrupted, then when the operator operates the "429 MHz wave changeover switch" of the control lever/switch set 69B, the remote control apparatus 6B changes over the frequency of the radio wave to be used between the remote control apparatus 6B and the construction machine 1 to 3 from that of the 50 GHz band to that of the 429 MHz band.

Consequently, a construction machine control signal is transmitted as a radio wave of the 429 MHz band toward the construction machine 1 to 3 through the 429 MHz antenna 82. Then, when the distance between the construction machine 1 to 3 and the remote control apparatus 6B is approximately within 100 m and the construction machine 1 to 3 receives the radio wave of the 429 MHz band from the remote control apparatus 6B by means of the 429 MHz reception antenna 33, the control apparatus 30 (controllers 30A and 30B) operates based on the construction machine control signal so that the engine, hydraulic motors, revolving motor and so forth are suitably controlled to be driven to perform a desired work.

It is to be noted that, also in this instance, in the construction machine 1 to 3, the semiautomatic control apparatus 30 performs posture control according to a "semiautomatic control mode" as the controller 30B of the semiautomatic control apparatus 30 controls based on control target value information received from the remote control apparatus 6B and extension/contraction displacement information of the cylinder type actuators (in the case of the hydraulic excavator 1, the cylinders 120 to 122) obtained by the signal converter 26 so that the cylinder type actuators may exhibit predetermined extension/contraction displacements, and performs a desired work with a high degree of accuracy and efficiently.

In this manner, also with the remote radio control system of the present second embodiment, even if such an emergency situation that bidirectional communication by a radio wave of the 50 GHz band which is a main communication medium between the remote control apparatus 6B and the construction machine 1 to 3 is interrupted by some trouble occurs, since at least a construction machine control signal can be transmitted to the construction machine 1 to 3 by radio communication of the 429 MHz band, advantages similar to those of the first embodiment are obtained. Further, in the present embodiment, since the remote control apparatus 6B perform communication directly with the construction machines 1 to 3, particularly in the working site 4 which has a comparatively small scale or the like, the repeater car 7 described above need not be disposed, and reduction of the cost of the entire system can be achieved.

Further, also in the present second embodiment, since the 50 GHz simple radio units 31 and 63 can always be opposed to the 50 GHz simple radio units 31 and 63 of the other parties of communication by the automatic tracking apparatus 32 and 63A, although a radio wave of the 50 GHz band having a high directionality is used, even if the construction machine 1 to 3 moves, stabilized control can always be performed, and this contributes very much to improvement of the reliability of the present system.

Furthermore, in the system according to the present second embodiment, since five sets of bidirectional communication means and automatic tracking means are provided corresponding to the number of the construction machines 1 to 3 (totaling five machines) by providing the 50 GHz simple radio units 63 and 31 on the remote control apparatus 6B side and the construction machines 1 to 3 side, respectively, and providing the automatic tracking apparatus 63A and 32 on the remote control apparatus 6B side and the construction machines 1 to 3 side, respectively, bidirectional communication with the construction machines 1 to 3 can be performed independently of one another for the individual construction machines 1 to 3. Accordingly, the construction machines 1 to 3 can be made perform different works from one another at the same time, and the working efficiency can be further improved significantly to shorten the working period.

Further, in the system according to the present second embodiment, since five emergency low radio wave directionality communication means each formed from the 429 MHz transmission antenna 64A of the remote control apparatus 6B side and the 429 MHz reception antenna 33 of the construction machine 1 to 3 side are provided corresponding to the five construction machines 1 to 3, even if communication by a radio wave of the 50 GHz band between any of the remote control apparatus 6B and a corresponding one of the construction machines 1 to 3 becomes impossible, the construction machine 1 to 3 can be remotely controlled independently. Accordingly, even upon emergency, all of the construction machines 1 to 3 in the working site 4 can be retracted and recovered to a safe place with certainty.

And, also with the system according to the present second embodiment, since the control apparatus 30 (controller 30B) are provided for the construction machines 1 to 3, when any of the construction machines 1 to 3 is remotely controlled from the corresponding remote control apparatus 6B, if any of the various semiautomatic control modes described above is set from the remote control apparatus 6B side, then the construction machine 1 to 3 can be made perform a desired work with a high degree of accuracy and efficiently.

Accordingly, any other person than those skilled in actual controlling operation of the construction machines 1 to 3 can perform remote control of any of the construction machines 1 to 3 very readily. Particularly with such a system that each of the construction machines 1 to 3 is remotely controlled while a two-dimensional image displayed on the display unit 67 is observed in the remote control apparatus 6B, the burden of a controlling operation to the operator can be reduced remarkably, and consequently, significant improvement of the productivity can be achieved.

Further, since, also in the present second embodiment, angle information signals detected by the resolvers 20 to 22 any of in the construction machines 1 to 3 is converted into cylinder displacement information by the signal converter 26 and inputted to the controller 30B, even if expensive stroke sensors for detecting extension/contraction displacements of the hydraulic cylinder 120 to 122 are not used as in the prior art, control in which cylinder extension/contraction displacements used in a conventional control system are used can be executed. Consequently, a system which can control the position and the posture of the bucket 400 accurately and stably while the cost is suppressed low can be provided.

(C) Others

It is to be noted that, while the remote radio control system in each of the embodiments described above is a system which includes both of communication means for emergency to be used when communication by a radio wave of the 50 GHz band is disabled and semiautomatic control means for the construction machines 1 to 3, the present invention is not limited to this, and the remote radio control system may be constructed as a system which includes either one of them.

Further, while, in each of the embodiments described above, a case wherein the remote radio control system is used in the territory of Japan is presumed and, from restrictions of the Radio Law of Japan, a radio wave of the 50 GHz band is used as a radio wave having a high directionality, a radio wave of the 2.4 GHz band is used as a spread spectrum radio wave and a radio wave of the 429 MHz band is used as a radio wave having a low radio wave directionality, the present invention is not limited to this, and it is possible to employ radio waves of arbitrary bands other than those specified above.

Particularly with regard to use outside the territory of Japan, it is possible to use radio waves of arbitrary frequency bands other than those specified above suitably in accordance with frequency bands usable in individual countries. Also in this instance, however, it is preferable to use a radio wave of a GHz band (for example, a several tens GHz band) as a radio wave having a high directionality, to use a radio wave of, for example, a severalGHz band as a spread spectrum radio wave, and to use a radio wave of a MHz band (for example, a several hundreds MHz band) as a radio wave of a low radio wave directionality.

Furthermore, while it is described in the embodiments described above that the remote control apparatus 6A (6B) are fixedly installed in the site office 5, also the remote control apparatus 6A (6B) may be carried on a movable vehicle or vehicles so that they can be moved. Further, while it is described in the embodiments described above that the remote control apparatus 6A (6B) can remotely control not only the construction machines 1 to 3 but also the repeater car 7, a remote control apparatus for exclusive use for the repeater car 7 may be provided separately from the remote control apparatus 6A (6B).

Furthermore, while, in the embodiments described above, a case wherein the present invention is applied to the hydraulic excavators 1, bulldozers 2 and wheel loader 3 is described, the present invention is not limited to this and can be applied similarly to any construction machine (movable working machine) such as a tractor or a dump track which has a joint type arm mechanism which is driven by cylinder type actuators, and operation and effects similar to those described above can be achieved with any of such construction machines.

Further, while, in the embodiments described above, a case wherein the fluid pressure circuits for operating the cylinder type actuators are hydraulic circuits is described, the present invention is not limited to this, and a fluid pressure circuit which makes use of a liquid pressure other than a working oil pressure or a pneumatic pressure may be used only if it has at least a pump driven by a prime mover and a control valve mechanism. Also in this instance, effects similar to those described above can be achieved with any of such construction machines.

Furthermore, while, in the embodiments described above, a case wherein the engine E is a prime mover of the rotational output type, for example, a Diesel engine, is described, according to the present invention, it is only required that the prime mover (various internal combustion engines and so forth) can drive a pump for causing a delivery pressure to act upon the fluid pressure circuits, and the prime mover is not limited to a prime mover of the rotational output type such as a Diesel engine.

And, the present invention is not limited to the embodiments described above and can be carried out in various forms without departing from the subject matter of the present invention.

Industrial Applicability of the Invention

Where the present invention is applied as remote radio control technology in a working side such as a construction site or a site for restoration against natural calamities, even if such an emergency situation that bidirectional communication between a remote control apparatus and a repeater car is interrupted occurs, bidirectional communication between the remote control apparatus and the repeater car is enabled by emergency spread spectrum bidirectional communication means, and consequently, even upon emergency, it is possible to cause a construction machine (working machine) to continue its operation or to retract and recover a construction machine to a safe place and the working efficiency at a working site can be improved significantly. Accordingly, the usefulness of the present invention is very high.

What is claimed is:

1. A remote radio control system, comprising:
   a radio movable working machine capable of movably working by radio control in a working site,
   a remote control apparatus for operating said radio movable working machine by radio control, and
   a movable repeater station interposed between said remote control apparatus and said radio movable working machine for repeating a signal,
   wherein, between said radio movable working machine and said movable repeater station, there are provided:
      first bidirectional communication means having a high radio wave directionality for enabling bi-directional communication between a working-machine-side antenna equipped to said radio movable working machine and a first repeater-station-side antenna equipped to said movable repeater station;
      first automatic tracking means for controlling orientation of said working-machine-side antenna and orientation of said first repeater-station-side antenna in an automatic way, so that said working-machine-side antenna and said first repeater-station-side antenna follow movement of each other; and
      emergency low radio wave directionality communication means for transmitting (i) an antenna control signal from said movable repeater station to said radio movable working machine and (ii) a control signal from said movable repeater station to said radio movable working machine when communication by said first bidirectional communication means is impossible, and wherein, between said remote control apparatus and said movable repeater station, there are provided:
      second bidirectional communication means having a high radio wave directionality, for enabling bi-directional communication between a control-apparatus-side antenna equipped to said remote control apparatus and a second repeater-station-side antenna equipped to said movable repeater station;
      second automatic tracking means for controlling orientation of said control-apparatus-side antenna and orientation of said second repeater-station-side antenna automatically, so that said controlapparatus-side antenna and said second repeater-station-side antenna follow movement of each other; and emergency spread spectrum bidirectional communication means for enabling bidirectional communication between said remote control apparatus and said movable repeater station when communication by said second bidirectional communication means is impossible.

2. A remote radio control system as set forth in claim 1, wherein a plurality of sets of the first bidirectional communication means and first automatic tracking means are provided corresponding to a plural number of the radio movable working machines.

3. A remote radio control system as set forth in claim 1, wherein a plurality of the emergency low radio wave directionality communication means are provided corresponding to a plural number of the radio movable working machines.

4. A remote radio control system as set forth in claim 1, wherein each of said first bidirectional communication means and said second bidirectional communication means is simple radio communication means for a giga hertz band.

5. A remote radio control system as set forth in claim 1, wherein said emergency spread spectrum bidirectional communication means is spread spectrum radio communication means for a desired frequency band.

6. A remote radio control system as set forth in claim 1, wherein said emergency low radio wave directionality communication means is radio communication means for a megahertz band.

7. A remote radio control system as set forth in claim 1, wherein said remote control apparatus includes a camera apparatus for catching an image of said movable repeater station when communication by said second bidirectional communication means is impossible.

8. A remote radio control system, comprising:
a radio movable working machine capable of movably working by radio control in a working site,
a remote control apparatus for operating said radio movable working machine by radio control, and
a movable repeater station interposed between said remote control apparatus and said radio movable working machine for repeating a signal,
wherein between said radio movable working machine and said movable repeater station, there are provided:
first bidirectional communication means having a high radio wave directionality for enabling bi-directional communication between a working-machine-side antenna equipped to said radio movable working machine and a first repeater-station-side antenna equipped to said movable repeater station;
first automatic tracking means for controlling orientation of said working-machine-side antenna and orientation of said first repeater-station-side antenna automatically, so that said working-machine-side antenna and said first repeater-station-side antenna follow movement of each other; and
emergency low radio wave directionality communication means for transmitting (i) an antenna control signal from said movable repeater station to said radio movable working machine and (ii) a control signal from said movable repeater station to said radio movable working machine when communication by said first bidirectional communication means is impossible, and wherein, between said remote control apparatus and said movable repeater station, there are provided:

second bidirectional communication means having a high radio wave directionality, for enabling bi-directional communication between a control-apparatus-side antenna equipped to said remote control apparatus and a second repeater-station-side antenna equipped to said movable repeater station; and second automatic tracking means for controlling orientation of said control-apparatus-side antenna and orientation of said second repeater-station-side antenna automatically, so that said control-apparatus-side antenna and said second repeater-station-side antenna follow movement of each other, wherein said radio movable working machine includes:
a joint type arm mechanism connected at one end portion thereof for pivotal motion on a machine body and having a working member at the other end side thereof, said joint type arm mechanism including at least one pair of arm members connected to each other through a joint part,
a cylinder type actuator mechanism including a plurality of cylinder type actuators which perform extension/contraction operations to drive said arm mechanism, and
a semiautomatic control apparatus including angle detection means for detecting a posture of said arm mechanism as angle information, a reception section for receiving control target value information transmitted from said remote control apparatus through said movable repeater station, and control means for controlling said cylinder type actuators based on the control target value information received by said reception section and the angle information detected by said angle detection means so that said cylinder type actuators may exhibit predetermined extension/contraction displacements.

9. A remote control system as set forth in claim 8, further comprising, in addition to said second bidirectional communication means and said second automatic tracking means, emergency spread spectrum bidirectional communication means for enabling bidirectional communication between said remote control apparatus and said movable repeater station when communication by said second bidirectional communication means is impossible.

10. A remote radio control system as set forth in claim 9, wherein said emergency spread spectrum bidirectional communication means is spread spectrum radio communication means for a desired frequency band.

11. A remote radio control system as set forth in claim 9, wherein said remote control apparatus includes a camera apparatus for catching an image of said movable repeater station when communication by said second bidirectional communication means is impossible.

12. A remote radio control system as set forth in claim 8, wherein said semiautomatic control apparatus includes conversion means for converting the angle information obtained by said angle detection means into corresponding extension/contraction displacement information of said cylinder type actuators, and said control means is constructed so as to control said cylinder type actuators based on the control target value information received by said reception section and the extension/contraction displacement information of said cylinder type actuators obtained by the conversion by said conversion means so that said cylinder type actuators may exhibit predetermined extension/contraction displacements.

13. A remote radio control system as set forth in claim 8, wherein in addition to said first bidirectional communication means and said first automatic tracking means, emergency low radio wave directionality communication means having a radio wave directionality lower than the radio wave directionality of said first bidirectional communication means for enabling communication of a control signal from said movable repeater station to said radio movable working machine when communication by said first bidirectional communication means is impossible is provided between said radio movable working machine and said movable repeater station.

14. A remote radio control system as set forth in claim 8, wherein a plurality of sets of the first bidirectional communication means and first automatic tracking means are provided corresponding to a plural number of the radio movable working machines.

15. A remote radio control system as set forth in claim 8, wherein each of said first bidirectional communication means and said second bidirectional communication means is simple radio communication means for a giga hertz band.

16. A remote radio control system as set forth in claim 8, wherein said remote control apparatus includes a camera apparatus for catching an image of said movable repeater station when communication by said second bidirectional communication means is impossible.

17. A remote control apparatus for operating a radio movable working machine, which is capable of movably working in a working site by radio control, by radio control through a movable repeater station which repeats a signal, comprising:
  a high radio wave directionality bidirectional transmission/reception section for performing bidirectional communication having a high radio wave directionality for enabling bi-directional communication between a working-machine-side antenna equipped to said radio movable working machine and a first repeater-station-side antenna equipped to said movable repeater station;
  an automatic tracking apparatus for controlling orientation of said working-machine-side antenna and orientation of said first repeater-station-side antenna automatically, so that said working-machine-side antenna and said first repeater-station-side antenna follow movement of each other;
  emergency low radio wave directionality communication section for transmitting (i) an antenna control signal from said movable repeater station to said radio movable working machine and (ii) a control signal from said movable repeater station to said radio movable working machine when communication by said bidirectional transmission/reception section is impossible; and
  an emergency spread spectrum bidirectional transmission/reception section for enabling bidirectional communication with said movable repeater station when communication by said high radio wave directionality bidirectional transmission/reception section is impossible.

18. A movable repeater station interposed between a radio movable working machine, which is capable of movably working in a working site by radio control, and a remote control apparatus, which operates said radio movable working machine by radio control, for repeating a signal, comprising:
  a first high radio wave directionality bidirectional transmission/reception section for performing bidirectional communication having a high radio wave directionality for enabling bi-directional communication between a working-machine-side antenna equipped to said radio movable working machine and a first repeater-station-side antenna equipped to said movable repeater station;
  a first automatic tracking apparatus for controlling orientation of said working-machine-side antenna and orientation of said first repeater-station-side antenna in an automatic way, so that said working-machine-side antenna and said first repeater-station-side antenna follow movement of each other;
  a second high radio wave directionality bidirectional transmission/reception section, for performing bidirectional communication between a control-apparatus-side antenna equipped to said remote control apparatus and a second repeater-station-side antenna equipped to said movable repeater station;
  a response section for responding to an automatic tracking signal from a second automatic tracking apparatus provided on said remote control apparatus, where the second automatic tracking apparatus controls orientation of said control-apparatus-side antenna and orientation of said second repeater-station-side antenna automatically, so that said control-apparatus-side antenna and said second repeater-station-side antenna follow movement of each other; and
  an emergency spread spectrum bidirectional transmission/reception section for enabling bidirectional communication with said remote control apparatus when communication by said second high radio wave directionality bidirectional transmission/reception section is impossible.

19. A movable repeater station as set forth in claim 18, further comprising an emergency low radio wave directionality communication section for transmitting (i) an antenna control signal from said movable repeater station to said radio movable working machine and (ii) a control signal from said movable repeater station to said radio movable working machine when communication by said bidirectional transmission/reception section is impossible.

20. A radio movable working machine connected to a remote control apparatus through a movable repeater station, which repeats a signal, using bidirectional radio communication means as a communication medium in such a manner that said radio movable working machine is capable of movably working in a working site by radio control, comprising:
  a high radio wave directionality bidirectional transmission/reception section for performing bidirectional communication having a high radio wave directionality for enabling bi-directional communication between a working-machine-side antenna equipped to said radio movable working machine and a first repeater-station-side antenna equipped to said movable repeater station;
  a response section for responding to an automatic tracking signal from an automatic tracking apparatus provided on said movable repeater station, where the automatic tracking apparatus controls orientation of said working-machine-side antenna and orientation of said first repeater-station-side antenna in an automatic way, so that said working-machine-side antenna and said first repeater-station-side antenna follow movement of each other;
  a joint type arm mechanism connected to one end portion thereof to a machine body and having a working member at the other end side thereof, said joint type arm mechanism including at least one pair of arm members connected to each other by a joint part, a cylinder type actuator mechanism including a plurality of cylinder type actuators which perform extension/contraction operations to drive said arm mechanism, and a semiautomatic control apparatus including angle detection means for detecting a posture of said arm mechanism as angle information, and control means for controlling said cylinder type actuators based on control target value information from said remote control apparatus received by said high radio wave directionality bidirectional transmission/reception section and the angle information detected by said angle detection means so that said cylinder type actuators may exhibit predetermined extension/contraction displacements.

21. A radio movable working machine as set forth in claim 20, wherein said semiautomatic control apparatus includes conversion means for converting the angle information obtained by said angle detection means into corresponding extension/contraction information of said cylinder type actuators, and said control means is constructed so as to control said cylinder type actuators based on the control target value information received by said high radio wave directionality bidirectional transmission/reception section and the extension/contraction displacement information of said cylinder type actuators obtained by the conversion by said conversion means so that said cylinder type actuators may exhibit predetermined extension/contraction displacements.

22. A radio movable working machine as set forth in claim 20, wherein it further comprises an emergency low radio wave directionality reception section having a radio wave directionality lower than the radio wave directionality of said high radio wave directionality bidirectional transmission/reception section for transmitting (i) an antenna control signal from said movable repeater station to said radio movable working machine and (ii) a control signal from said movable repeater station to said radio movable working machine when communication by said bidirectional transmission/reception section is impossible.

23. A remote radio control system, comprising:

a radio movable working machine capable of movably working in a working site by radio communication, and a remote control apparatus for operating said radio movable working machine by radio control, wherein, between said remote control apparatus and said radio movable working machine, there are provided:

bidirectional communication means having a high radio wave directionality for enabling bi-directional communication between a working-machine-side antenna equipped to said radio movable working machine and a control-apparatus-side antenna equipped to said remote control apparatus;

automatic tracking means for controlling orientation of said working-machine-side antenna and orientation of said control-apparatus-side antenna in an automatic way, so that said working-machine-side antenna and said control-apparatus-side antenna follow movement of each other; and emergency low radio wave directionality communication means for transmitting (i) an antenna control signal from said remote control apparatus to said radio movable working machine and (ii) a control signal from said remote control apparatus to said radio movable working machine when communication by said bidirectional communication means is impossible.

24. A remote radio control system as set forth in claim 23, wherein a plurality of sets of the bidirectional communication means and automatic tracking means are provided corresponding to a plural number of the radio movable working machines.

25. A remote radio control system as set forth in claim 23, wherein a plurality of the emergency low radio wave directionality communication means are provided corresponding to a plural number of the radio movable working machines.

26. A remote radio control system as set forth in claim 23, wherein said bidirectional communication means is simple radio communication means for a giga hertz band.

27. A remote radio control system as set forth in claim 23, wherein said emergency low radio wave directionality communication means is radio communication means for a megahertz band.

28. A remote radio control system as set forth in claim 23, wherein said remote control apparatus includes a camera apparatus for catching an image of said radio movable working machine when communication by said bidirectional communication means is impossible.

29. A remote radio control system, comprising:

a radio movable working machine capable of movably working in a working site by radio communication, and a remote control apparatus for operating said radio movable working machine by radio control, that bidirectional communication means having a high radio wave directionality for enabling bi-directional communication between a working-machine-side antenna equipped to said radio movable working machine and a first repeater-station-side antenna equipped to said movable repeater station and automatic tracking means for controlling orientation of said working-machine-side antenna and orientation of said first repeater-station-side antenna in an automatic way, so that said working-machine-side antenna and said first repeater-station-side antenna follow movement of each other, where the birectional communication means and the automatic tracking means are provided between said remote control apparatus and said radio movable working machine, and that said radio movable working machine includes a joint type arm mechanism connected at one end portion thereof for pivotal motion on a machine body and having a working member at the other end side thereof, said joint type arm mechanism including at least one pair of arm members connected to each other through a joint part, a cylinder type actuator mechanism including a plurality of cylinder type actuators which perform extension/contraction operations to drive said arm mechanism, and a semiautomatic control apparatus including angle detection means for detecting a posture of said arm mechanism as angle information, a reception section for receiving control target value information transmitted from said remote control apparatus, and control means for controlling said cylinder type actuators based on the control target value information received by said reception section and the angle information detected by said angle detection means so that said cylinder type actuators may exhibit predetermined extension/contraction displacements.

30. A remote radio control system as set forth in claim 29, wherein, in addition to said bidirectional communication means and said automatic tracking means, emergency low radio wave directionality communication means for transmitting (i) an antenna control signal from said movable repeater station to said radio movable working machine and (ii) a control signal from said movable repeater station to said radio movable working machine when communication by said first bidirectional communication means is impossible is provided between said remote control apparatus and said radio movable working machine.

31. A remote radio control system as set forth in claim 30, wherein a plurality of the emergency low radio wave directionality communication means are provided corresponding to a plural number of the radio movable working machines.

32. A remote radio control system as set forth in claim 30, wherein said emergency low radio wave directionality communication means is radio communication means for a megahertz band.

33. A remote radio control system as set forth in claim 30, wherein said remote control apparatus includes a camera apparatus for catching an image of said radio movable working machine when communication by said bidirectional communication means is impossible.

34. A remote radio control system as set forth in claim 29, wherein said semiautomatic control apparatus includes conversion means for converting the angle information obtained by said angle detection means into corresponding extension/contraction displacement information of said cylinder type actuators, and said control means is constructed so as to control said cylinder type actuators based on the control target value information received by said reception section and the extension/contraction displacement information of said cylinder type actuators obtained by the conversion by said conversion means so that said cylinder type actuators may exhibit predetermined extension/contraction displacements.

35. A remote radio control system as set forth in claim 29, wherein a plurality of sets of the bidirectional communication means and automatic tracking means are provided corresponding to a plural number of the radio movable working machines.

36. A remote radio control system as set forth in claim 29, wherein said bidirectional communication means is simple radio communication means for a giga hertz band.

37. A remote radio control system as set forth in claim 29, wherein said remote control apparatus includes a camera apparatus for catching an image of said radio movable working machine when communication by said bidirectional communication means is impossible.

38. A remote control apparatus for operating a radio movable working machine, which is capable of movably working in a working site by radio control, by radio control, comprising:

a high radio wave directionality bidirectional transmission/reception section for performing bidirectional communication having a high radio wave directionality for enabling bi-directional communication between a working-machine-side antenna equipped to said radio movable working machine and a first repeater-station-side antenna equipped to said movable repeater station;

an automatic tracking apparatus for controlling orientation of said working-machine-side antenna and orientation of said first repeater-station-side antenna in an automatic way, so that said working-machine-side antenna and said first repeater-station-side antenna follow movement of each other; and emergency low radio wave directionality communication means for transmitting (i) an antenna control signal from said movable repeater station to said radio movable working machine and (ii) a control signal from said movable repeater station to said radio movable working machine when communication by said first bidirectional communication means is impossible.

39. A radio movable working machine connected to a remote control apparatus using bidirectional radio communication means as a communication medium in such a manner that said radio movable working machine is capable of movably working in a working site by radio control, comprising:

a high radio wave directionality bidirectional transmission/reception section for performing bidirectional communication having a high radio wave directionality for enabling bi-directional communication between a working-machine-side antenna equipped to said radio movable working machine and a first repeater-station-side antenna equipped to said movable repeater station;

a response section for responding to an automatic tracking signal from an automatic tracking apparatus provided on said movable repeater station, where the automatic tracking apparatus controls orientation of said working-machine-side antenna and orientation of said first repeater-station-side antenna in an automatic way, so that said working-machine-side antenna and said first repeater-station-side antenna follow movement of each other;

a joint type arm mechanism connected at one end portion thereof to a machine body and having a working member at the other end side thereof, said joint type arm mechanism including at least one pair of arm members connected to each other by a joint part;

a cylinder type actuator mechanism including a plurality of cylinder type actuators which perform extension/contraction operations to drive said arm mechanism; and a semiautomatic control apparatus including angle detection means for detecting a posture of said arm mechanism as angle information, and control means for controlling said cylinder type actuators based on control target value information from said remote control apparatus received by said high radio wave directionality bidirectional transmission/reception section and the angle information detected by said angle detection means so that said cylinder type actuators may exhibit predetermined extension/contraction displacements.

40. A radio movable working machine as set forth in claim 39, wherein said semiautomatic control apparatus includes conversion means for converting the angle information obtained by said angle detection means into corresponding extension/contraction information of said cylinder type actuators, and said control means is constructed so as to control said cylinder type actuators based on the control target value information received by said high radio wave directionality bidirectional transmission/reception section and the extension/contraction displacement information of said cylinder type actuators obtained by the conversion by said conversion means so that said cylinder type actuators may exhibit predetermined extension/contraction displacements.

41. A radio movable working machine as set for in claim 39, wherein it further comprises emergency low radio wave directionality reception section having a radio wave directionality lower than the radio wave directionality of said high radio wave directionality bidirectional transmission/reception section for enabling reception of a control signal from said remote control apparatus when communication in which said high radio wave directionality bidirectional transmission/reception section is used is impossible.

* * * * *